(12) United States Patent
Takuno et al.

(10) Patent No.: US 9,005,067 B2
(45) Date of Patent: *Apr. 14, 2015

(54) SPEED REDUCTION MECHANISM, AND MOTOR TORQUE TRANSMISSION DEVICE INCLUDING THE SAME

(71) Applicant: JTEKT Corporation, Osaka (JP)

(72) Inventors: Hiroshi Takuno, Nukata-gun (JP); Kunihiko Suzuki, Gamagori (JP); Keita Nomura, Kariya (JP); Tsune Kobayashi, Okazaki (JP); Tohru Onozaki, Nagoya (JP); Masaharu Tagami, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 121 days.

This patent is subject to a terminal disclaimer.

(21) Appl. No.: 13/732,523

(22) Filed: Jan. 2, 2013

(65) Prior Publication Data

US 2013/0178322 A1 Jul. 11, 2013

(30) Foreign Application Priority Data

Jan. 11, 2012 (JP) .................................. 2012-003166
Mar. 6, 2012 (JP) .................................. 2012-049239
Mar. 6, 2012 (JP) .................................. 2012-049240
Nov. 14, 2012 (JP) .................................. 2012-250087

(51) Int. Cl.
  *F16H 1/32* (2006.01)
  *B60K 1/00* (2006.01)

(52) U.S. Cl.
  CPC .................. *F16H 1/321* (2013.01); *F16H 1/32* (2013.01); *F16H 2001/325* (2013.01); *B60K 2001/001* (2013.01)

(58) Field of Classification Search
  USPC .................................. 475/176, 177, 178, 179
  See application file for complete search history.

(56) References Cited

U.S. PATENT DOCUMENTS 7,935,017 B2 * 5/2011 Kurita et al. .................. 475/162
8,540,598 B2 * 9/2013 Wakida et al. ................ 475/163
(Continued)

FOREIGN PATENT DOCUMENTS

| EP | 2 292 946 A1 | 3/2011 |
| JP | 10-51999 | 2/1998 |
| JP | 2007-218407 | 8/2007 |

OTHER PUBLICATIONS

The Extended European Search Report issued May 6, 2013, in Application No. / Patent No. 13150466.4-1752.

(Continued)

*Primary Examiner* — Roger Pang
(74) *Attorney, Agent, or Firm* — Oblon, McClelland, Maier & Neustadt, L.L.P.

(57) ABSTRACT

When an outer ring is fitted to an inner periphery of an input member, which defines a center hole, and an inner ring is fitted to an eccentric portion with clearances in a reduction-transmission mechanism, in a state where tooth tips of the input member contact bottomlands of a rotation force applying member on a line perpendicular to a second axis and a fourth axis, a size between the second axis and a third axis is set to a size that is smaller than or equal to half of a size obtained by adding a diameter difference between an outside diameter of a ball bearing and an inside diameter of the input member, which defines the center hole, a diameter difference between an inside diameter of the ball bearing and an outside diameter of the eccentric portion and an operating clearance of the ball bearing.

3 Claims, 27 Drawing Sheets

(56) References Cited

U.S. PATENT DOCUMENTS

| | | | |
|---|---|---|---|
| 8,734,283 B2 * | 5/2014 | Takuno et al. | 475/177 |
| 2007/0107546 A1 * | 5/2007 | Tanaka et al. | 74/640 |
| 2011/0082000 A1 | 4/2011 | Makino | |
| 2013/0257202 A1 * | 10/2013 | Takuno et al. | 310/83 |

OTHER PUBLICATIONS

U.S. Appl. No. 13/692,130, filed Dec. 3, 2012, Suzuki, et al.

U.S. Appl. No. 13/732,534, filed Jan. 2, 2013, Takuno, et al.

* cited by examiner

SPEED REDUCTION MECHANISM, AND MOTOR TORQUE TRANSMISSION DEVICE INCLUDING THE SAME

INCORPORATION BY REFERENCE

The disclosure of Japanese Patent Applications No. 2012-003166 filed on Jan. 11, 2012 and No. 2012-049240 filed on Mar. 6, 2012 including the specification, drawings and abstract, is incorporated herein by reference in its entirety.

BACKGROUND OF THE INVENTION

1. Field of the Invention

The invention relates to a speed reduction mechanism that is suitably used in, for example, an electric vehicle that has an electric motor as a driving source and a motor torque transmission device that includes the speed reduction mechanism.

2. Description of Related Art

There is a conventional motor torque transmission device that is mounted in an automobile, and that includes an electric motor and a reduction-transmission mechanism (see, for example, Japanese Patent Application Publication No. 2007-218407 (JP 2007-218407 A)). The electric motor generates motor torque. The reduction-transmission mechanism reduces the speed of rotation output from the electric motor and transmits driving force to a differential mechanism.

The reduction-transmission mechanism of the motor torque transmission device of this type have a pair of disc-shaped revolving members, a plurality of outer pins and a plurality of inner pins. The revolving members make revolving motions in accordance with the rotation of the motor shaft of the electric motor. The motor shaft has eccentric portions. The outer pins apply rotation force to the revolving members. The inner pins are arranged radially inward of the outer pins, and output the rotation force of the revolving members to the differential mechanism as torque, and the driving force is transmitted to a rotation member at wheel side.

The revolving members each have a center hole and pin insertion holes. The central axis of each center hole is different from the axis of each eccentric portion of the motor shaft having the eccentric portions. The pin insertion holes are arranged around the central axis of each center hole at equal intervals. The revolving members are respectively rotatably supported by the eccentric portions of the motor shaft, having the eccentric portions, via bearings (cam bearings).

The outer pins are arranged around the axis of the motor shaft, having the eccentric portions, at equal intervals, and are connected to the housing of the reduction-transmission mechanism.

The inner pins are passed through the pin insertion holes of the revolving members. The inner pins are fitted to the differential case. Bearings (pin-side bearings) are fitted to the inner pins. The bearings are used to reduce contact resistance between the inner pins and the inner peripheries which define the pin insertion holes of the revolving members.

In the motor torque transmission device described in JP 2007-218407 A, a plurality of outer pins needs to be prepared, and further, the outer peripheral portions of the revolving members need to be formed into a complex shape, which is uneconomical.

To avoid such a problem, external gears may be employed as revolving members, an internal gear may be employed as a rotation force applying member that applies rotation force to the revolving members, and the number of teeth of the internal gear may be set larger than the number of teeth of each of the external gears.

However, if the reduction-transmission mechanism formed of the above-described external gears and the internal gear is used in a motor torque transmission device for an automobile, the revolving speed of each of the external gears that are the revolving members becomes relatively high. Accordingly, a load due to centrifugal force acts on the cam-side bearings from the revolving members when the torque is output. As a result, it is necessary to use bearings with high durability as the cam-side bearings, resulting in a cost increase. In addition, because a load due to centrifugal force acts on the cam-side bearings, the service life of each of the cam-side bearings is shortened.

SUMMARY OF THE INVENTION

It is an object of the invention to provide a speed reduction mechanism with which cost is reduced and the service life of bearings is extended, and a motor torque transmission device that includes the speed reduction mechanism.

An aspect of the invention relates to a speed reduction mechanism, including: a rotary shaft that rotates about a first axis, and that has an eccentric portion of which a central axis is a second axis that is offset from the first axis; an input member that is arranged radially outward of the rotary shaft, and that is formed of an external gear having a center hole of which a central axis is a third axis and a plurality of through-holes arranged at equal intervals around the third axis, having a pitch circle of which a central axis coincides with the third axis, and provided with a bearing interposed between an inner periphery of the input member, which defines the center hole, and an outer periphery of the eccentric portion; a rotation force applying member that is in mesh with the input member, and that is formed of an internal gear having teeth the number of which is larger than the number of teeth of the external gear and having a pitch circle of which a central axis is a fourth axis; and a plurality of output members that receive rotation force applied to the input member by the rotation force applying member and output the rotation force, and that are passed through the respective through-holes. When the bearing includes an outer ring and an inner ring and the outer ring is fitted to the inner periphery of the input member, which defines the center hole, with a clearance in a radial direction of the rotary shaft and the inner ring is fitted to the eccentric portion with a clearance in the radial direction of the rotary shaft, in any one of a state where tooth tips of the external gear contact bottomlands of the internal gear on a line perpendicular to the second axis and the fourth axis, a state where bottomlands of the external gear contact tooth tips of the internal gear on the line perpendicular to the second axis and the fourth axis, a state where each of at least one of external teeth of the external gear is fitted between adjacent two of a plurality of internal teeth of the internal gear on the line perpendicular to the second axis and the fourth axis, a torque transfer face of the external tooth at one side in a circumferential direction contacts a torque transfer face of one of the two adjacent internal teeth and a torque transfer face of the external tooth at the other side in the circumferential direction contacts a torque transfer face of the other one of the two adjacent internal teeth, and a state where each of at least one of the internal teeth of the internal gear is fitted between adjacent two of the external teeth of the external gear on the line perpendicular to the second axis and the fourth axis, a torque transfer face of the internal tooth at one side in the circumferential direction contacts a torque transfer face of one of the two adjacent external teeth and a torque transfer face of the internal tooth at the other side in the circumferential direction contacts a torque transfer face of the other one of the two adjacent external teeth, a size between the second axis and the third axis is set to a size that is smaller than or equal to half of a size obtained by adding a diameter difference between an outside diameter of the bearing and an inside diameter of the input member, which defines the center hole, a diameter difference between an inside diameter of the bearing and an outside diameter of the eccentric portion and an operating clearance of an internal clearance of the bearing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a motor torque transmission device according to a first embodiment of the invention will be described in detail with reference to the accompanying drawings.

Figure 1:
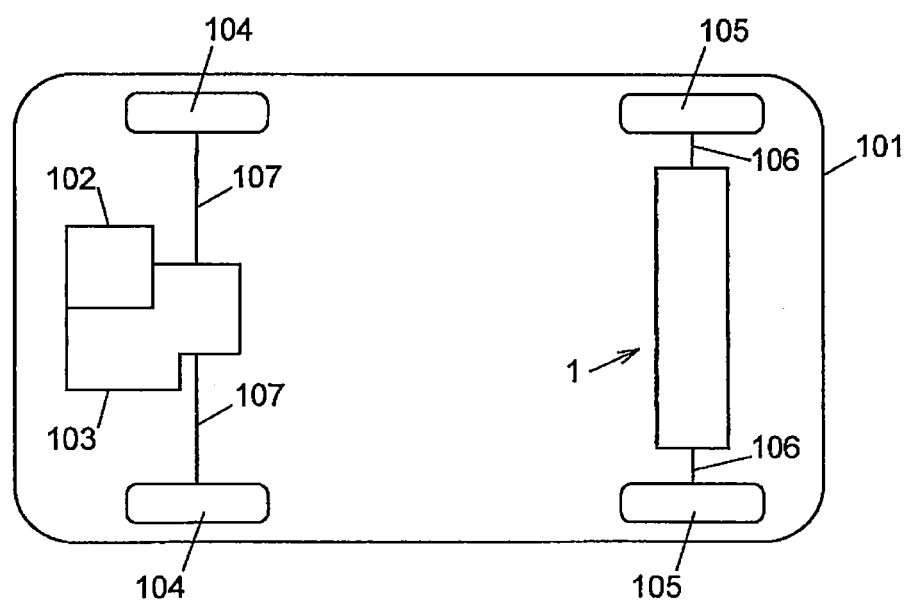
FIG. 1 is a schematic plan view for illustrating a vehicle in which a motor torque transmission device according to a first embodiment of the invention is mounted.

FIG. 1 schematically shows a four-wheel drive vehicle 101. As shown in FIG. 1, the four-wheel drive vehicle 101 includes a front wheel power system and a rear wheel power system, and includes a motor torque transmission device 1, an engine 102, a transaxle 103, a pair of front wheels 104 and a pair of rear wheels 105. The front wheel power system uses the engine as a driving source. The rear wheel power system uses an electric motor 4 (described later) as a driving source.

The motor torque transmission device 1 is arranged in the rear wheel power system of the four-wheel drive vehicle 101, and is supported by a vehicle body (not shown) of the four-wheel drive vehicle 101.

Figure 2:
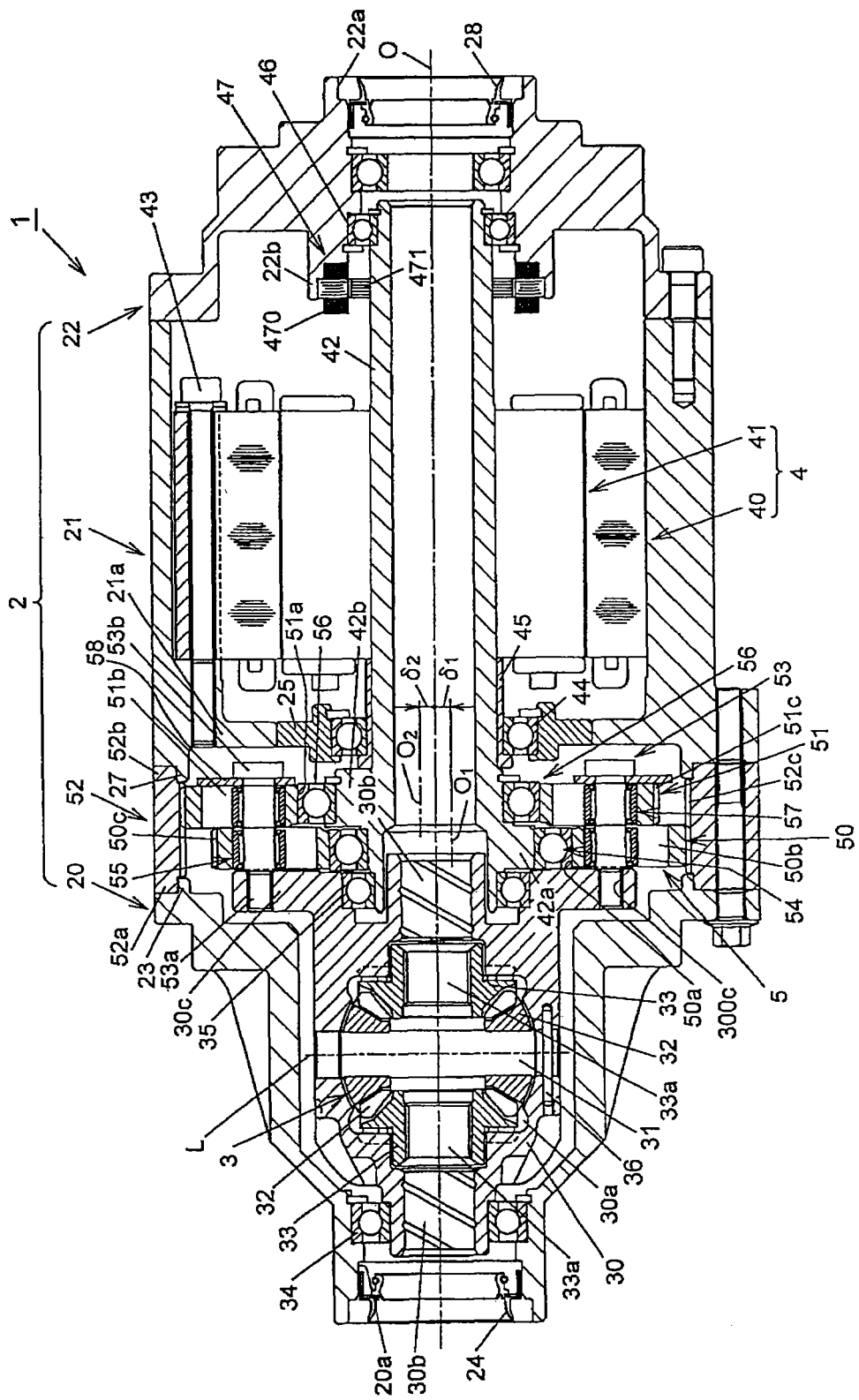
FIG. 2 is a sectional view for illustrating the motor torque transmission device according to the first embodiment of the invention.

The motor torque transmission device 1 is configured to transmit driving force based on the motor torque of the electric motor 4 to the rear wheels 105. Thus, the motor torque of the electric motor 4 is output to rear axle shafts 106 via a reduction-transmission mechanism 5 and a rear differential 3 (both are shown in FIG. 2) to drive the rear wheels 105. The details of the motor torque transmission device 1, and the like, will be described later.

The engine 102 is arranged in the front wheel power system of the four-wheel drive vehicle 101. Thus, the driving force of the engine 102 is output to front axle shafts 107 via the transaxle 103 to drive the front wheels 104.

FIG. 2 is an overall view of the motor torque transmission device. As shown in FIG. 2, the motor torque transmission device 1 is formed mainly of a housing 2, the rear differential 3, the electric motor 4 and the reduction-transmission mechanism 5. The central axis of the housing 2 is an axis (a rotation axis O) of each rear axle shaft 106 (shown in FIG. 1). The rear differential 3 distributes driving force to the rear wheels 105 (shown in FIG. 1). The electric motor 4 generates motor torque to actuate the rear differential 3. The reduction-transmission mechanism 5 reduces the speed of rotation output from the electric motor 4 and transmits driving force to the rear differential 3.

The housing 2 has a rotation force applying member 52 (described later), a first housing element 20, a second housing element 21 and a third housing element 22. The housing 2 is arranged on the vehicle body. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)).

The first housing element 20 is arranged at a second side (left side in FIG. 2) of the housing 2. The entirety of the first housing element 20 is formed of a stepped closed-end cylindrical member that is open toward the second housing element 21. The bottom of the first housing element 20 has a shaft insertion hole 20a through which one of the rear axle shafts 106 (shown in FIG. 1) is passed. An annular protrusion 23 that protrudes toward the second housing element 21 is formed integrally on the open end face of the first housing element 20. The outer periphery of the protrusion 23 has an outside diameter smaller than the maximum outside diameter of the first housing element 20, and is formed of a cylindrical surface of which the central axis coincides with the rotation axis O. A seal member 24 is interposed between the inner periphery of the first housing element 20 and the outer periphery of the rear axle shaft 106. The seal member 24 seals the shaft insertion hole 20a.

The second housing element 21 is arranged at the middle of the housing 2 in the axial direction. The entirety of the second housing element 21 is formed of an open-end cylindrical member that is open toward both sides in the direction of the rotation axis O. A stepped inward flange 21a, which is interposed between the electric motor 4 and the reduction-transmission mechanism 5, is formed integrally with the second opening portion of the second housing element 21 (the opening portion on the first housing element 20-side). An annular member 25, to which a race is fitted, is fitted to the inner periphery of the inward flange 21a. An annular protrusion 27, which protrudes toward the first housing element 20, is formed integrally on the second open end face of the second housing element 21 (the open end face on the first housing element 20-side). The outer periphery of the protrusion 27 has an outside diameter smaller than the maximum outside diameter of the second housing element 21. The protrusion 27 has substantially the same outside diameter as the outside diameter of the protrusion 23. The outer periphery of the protrusion 27 is formed of a cylindrical surface of which the central axis coincides with the rotation axis O.

The third housing element 22 is arranged at the first side (right side in FIG. 2) of the housing 2. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member 28 that seals the shaft insertion hole 22a is interposed between the inner periphery of the third housing element 22 and the outer periphery of the rear axle shaft 106.

The rear differential 3 is formed of a differential case 30, a pinion gear shaft 31, and a bevel gear differential mechanism that includes a pair of pinion gears 32 and a pair of side gears 33. The rear differential 3 is arranged at the second side of the motor torque transmission device 1.

With this configuration, the torque of the differential case 30 is distributed from the pinion gear shaft 31 to the side gears 33 via the pinion gears 32. The torque of the differential case 30 is further transmitted from the side gears 33 to the right and left rear wheels 105 (shown in FIG. 1) via the rear axle shafts 106 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on a rotation axis (sixth axis) O. The differential case 30 is rotatably supported by the first housing element 20 via a ball bearing 34, and is rotatably supported by a motor shaft (rotary shaft) 42 of the electric motor 4 via a ball bearing 35. The differential case 30 is configured to rotate about the rotation axis O upon reception of driving force based on the motor torque of the electric motor 4 from the reduction-transmission mechanism 5.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

An annular flange 30c that faces the reduction-transmission mechanism 5 is formed integrally with the differential case 30. The flange 30c has a plurality of (six in the present embodiment) pin fitting holes 300c that are arranged at equal intervals around the rotation axis O.

The pinion gear shaft 31 is arranged along an axis L that is perpendicular to the rotation axis O in the accommodation space 30a of the differential case 30. The rotation of the pinion gear shaft 31 about the axis L and the movement of the pinion gear shaft 31 in the direction of the axis L are restricted by a pin 36.

The pinion gears 32 are rotatably supported by the pinion gear shaft 31, and are accommodated in the accommodation space 30a of the differential case 30.

The side gears 33 each have a shaft coupling hole 33a. The side gears 33 are accommodated in the accommodation space 30a of the differential case 30. Each of the shaft coupling holes 33a is coupled to a corresponding one of the right and left rear axle shafts 106 (shown in FIG. 1) by spline fitting. The side gears 33 are configured such that the gear axes are perpendicular to the gear axes of the pinion gears 32 and the side gears 33 are in mesh with the pinion gears 32.

The electric motor 4 includes a stator 40, a rotor 41 and the motor shaft 42. The electric motor 4 is coupled to the rear differential 3 via the reduction-transmission mechanism 5 on the rotation axis O. The stator 40 of the electric motor 4 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4, and is fitted to the inward flange 21a of the second housing element 21 with a fitting bolt 43.

The rotor 41 is arranged at the inner peripheral side of the electric motor 4, and is fitted to the outer periphery of the motor shaft 42.

The motor shaft 42 is arranged on the rotation axis O. In addition, the second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via a ball bearing 46. The entirety of the motor shaft 42 is formed of a cylindrical shaft member through which the rear axle shafts 106 (shown in FIG. 1) are passed.

An eccentric portion 42a and an eccentric portion 42b, both of which are circular in planar view, are formed integrally with the second end portion of the motor shaft 42. The central axis of the eccentric portion 42a is an axis $O_1$ (second axis) that is offset from the rotation axis O (first axis) of the motor shaft 42 by an eccentric amount $\delta_1$. The central axis of the eccentric portion 42b is an axis (second axis) $O_2$ that is offset from the rotation axis O by an eccentric amount $\delta_2$ ($\delta_1=\delta_2=\delta$). The eccentric portion 42a and the eccentric portion 42b are arranged so as to be next to each other along the rotation axis O and apart from each other in the circumferential direction around the rotation axis O at equal intervals (180°). That is, the eccentric portion 42a and the eccentric portion 42b are arranged on the outer periphery of the motor shaft 42 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_1$ and the axis $O_2$ in the other circumferential direction around the rotation axis O are equal to each other.

A resolver 47 is arranged at the first end portion of the motor shaft 42. The resolver 47 serves as a rotation angle detector, and is interposed between the outer periphery of the motor shaft 42 and the inner periphery of the cylindrical portion 22b. The resolver 47 has a stator 470 and a rotor 471, and is accommodated inside the third housing element 22. The stator 470 is fitted to the inner periphery of the cylindrical portion 22b. The rotor 471 is fitted to the outer periphery of the motor shaft 42.

Figure 3:
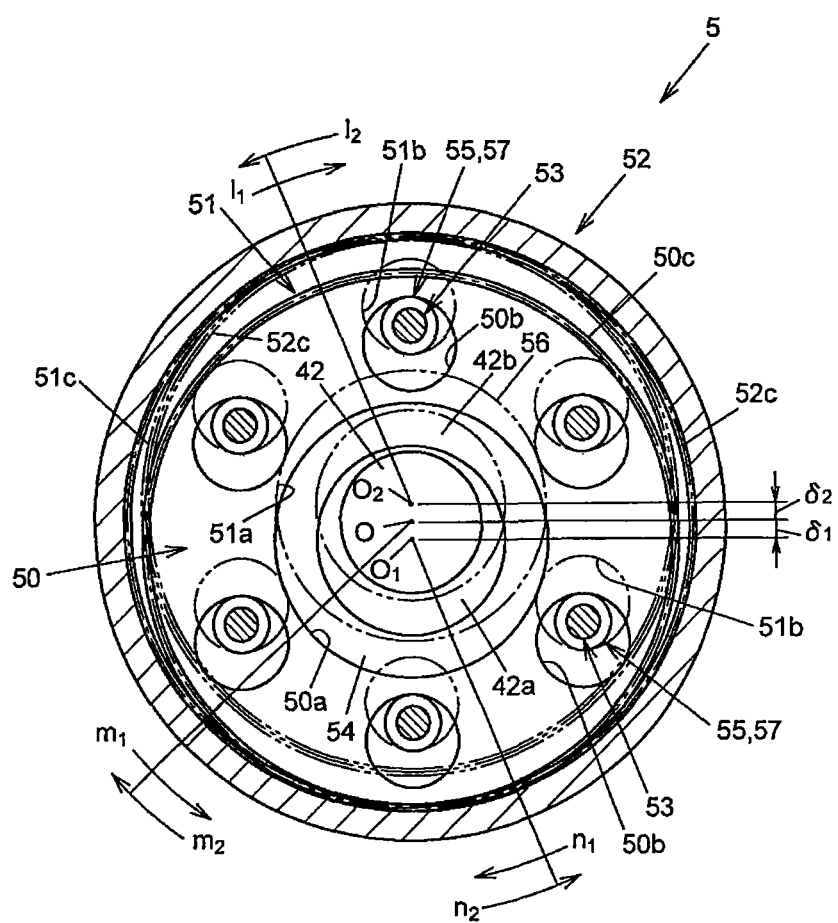
FIG. 3 is a schematic sectional view for illustrating a reduction-transmission mechanism of the motor torque transmission device according to the first embodiment of the invention.
Figure 4:
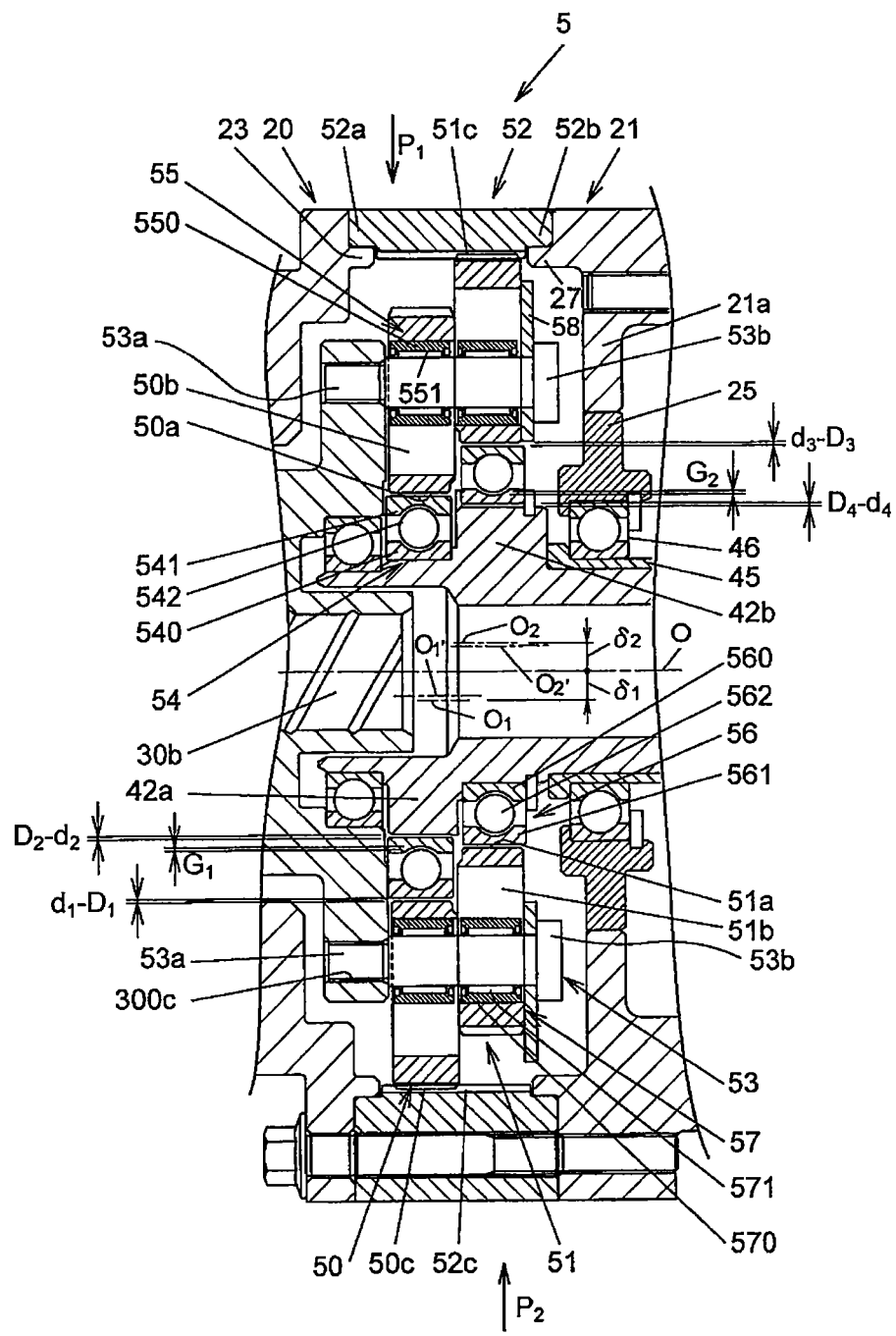
FIG. 4 is a schematic sectional view for illustrating main portions of the reduction-transmission mechanism of the motor torque transmission device according to the first embodiment of the invention.
Figure 5:
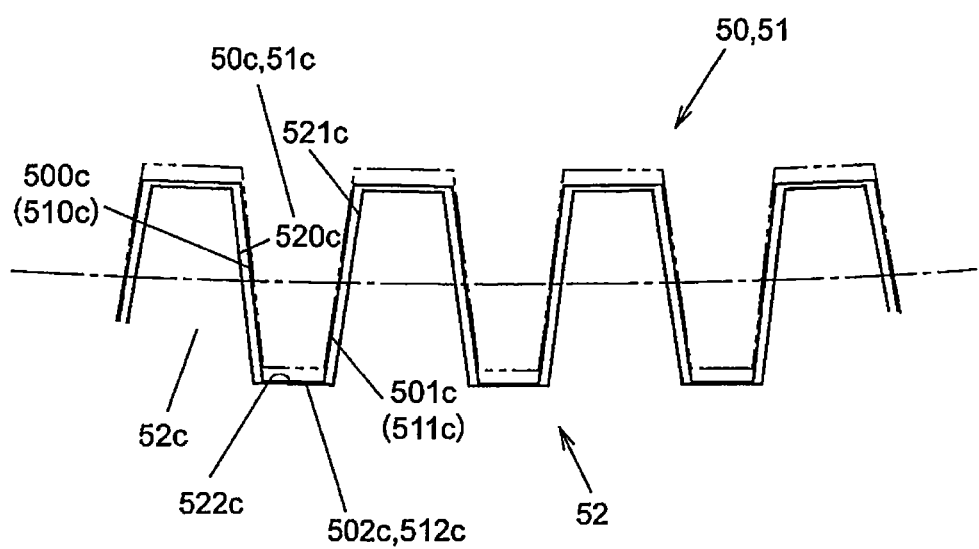
FIG. 5 is a sectional view that shows a state where one of input members is in contact with a rotation force applying member of the reduction-transmission mechanism of the motor torque transmission device according to the first embodiment of the invention.
Figure 6:
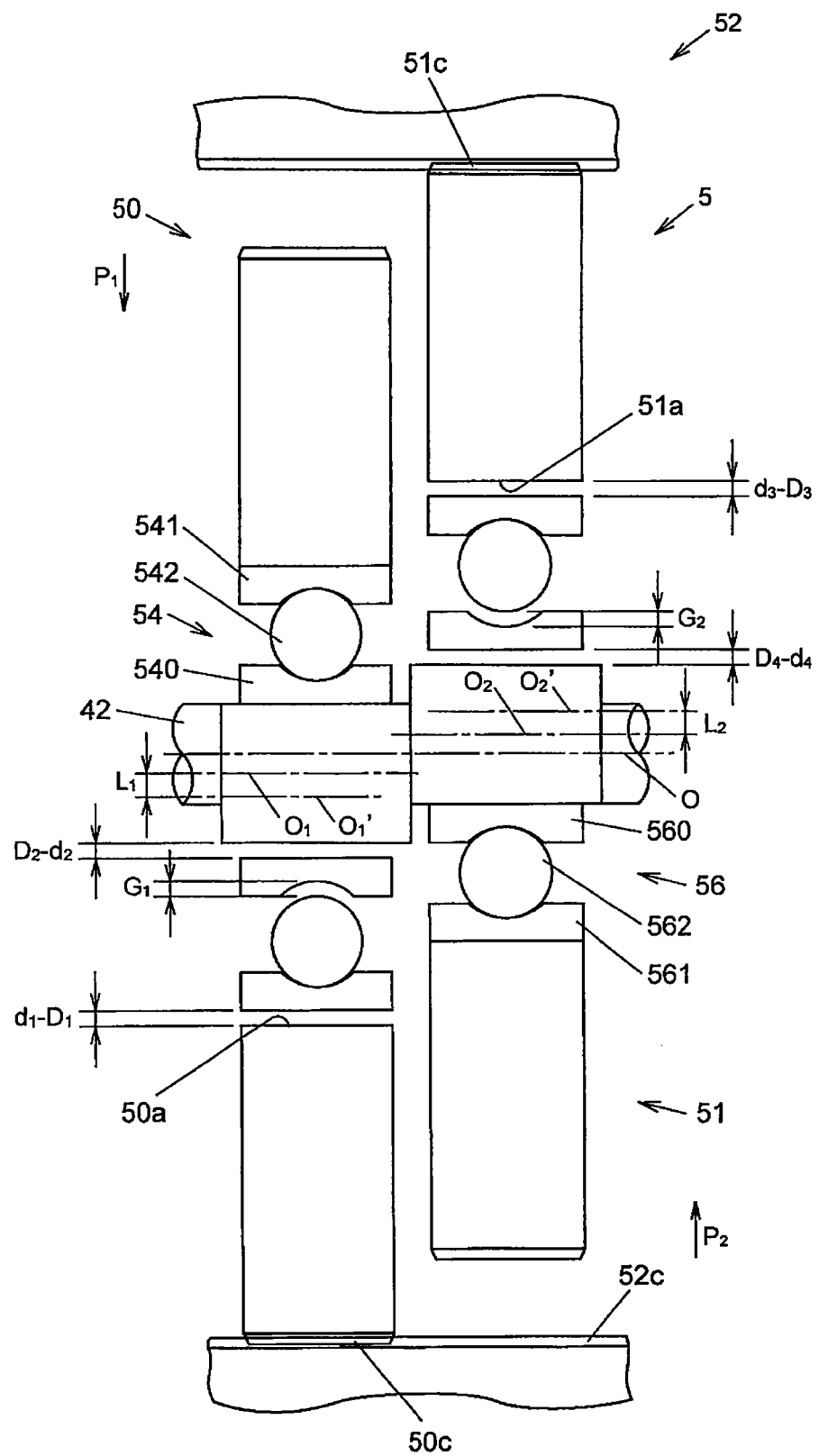
FIG. 6 is a simplified sectional view that shows a state where the input members of the reduction-transmission mechanism are supported in the motor torque transmission device according to the first embodiment of the invention.

FIG. 3 shows the reduction-transmission mechanism. FIG. 4 shows a clearance between each input member and a corresponding first bearing. FIG. 5 shows a state where one of the input members is in contact with a rotation force applying member. FIG. 6 shows a state where the input members are supported. As shown in FIG. 3 and FIG. 4, the reduction-transmission mechanism 5 has a pair of input members 50, 51, the rotation force applying member 52 and a plurality of output members 53. The reduction-transmission mechanism 5 is interposed between the rear differential 3 and the electric motor 4 (both are shown in FIG. 2). As described above, the reduction-transmission mechanism 5 is configured to reduce the speed of rotation output from the electric motor 4 and then transmit the driving force to the rear differential 3.

As shown in FIG. 4, the input member 50 is formed of an external gear that has a center hole 50a of which the central axis coincides with an axis (third axis) $O_1{'}$. The input member 50 is arranged so as to be closer to the rear differential 3 than the input member 51. In addition, the input member 50 is rotatably supported by the motor shaft 42 via a ball bearing 54. The ball bearing 54 may function as a first bearing, and is interposed between the inner periphery of the input member 50, which defines the center hole 50a, and the eccentric portion 42a. The input member 50 is configured to make circular motion (revolving motion about the rotation axis O) in the directions of the arrows $m_1$, $m_2$ (shown in FIG. 3) with the eccentric amount $\delta$, upon reception of motor torque from the electric motor 4. The ball bearing 54 includes two races (an inner ring 540 and an outer ring 541) and rolling elements 542. The inner ring 540 is arranged radially inward of the outer ring 541. The rolling elements 542 roll between the inner ring 540 and the outer ring 541. The inner ring 540 is fitted to the eccentric portion 42a with a clearance (gap) in the radial direction of the motor shaft 42. The outer ring 541 is fitted to the inner periphery of the input member 50, which defines the center hole 50a, with a clearance (gap) in the radial direction of the motor shaft 42. That is, the inner ring 540 is fitted to the outer periphery of the eccentric portion 42a by clearance fit, and the outer ring 541 is fitted to the inner periphery of the input member 50, which defines the center hole 50a, by clearance fit. Note that FIG. 4 shows a state where a centrifugal force $P_1$ acts on the input member 50, the inner ring 540, the outer ring 541 and the rolling elements 542.

The input member 50 has a plurality of (six in the present embodiment) pin insertion holes (through-holes) 50b that are arranged at equal intervals around the axis $O_1{'}$. The hole diameter of each pin insertion hole 50b is set to a size that is larger than a size obtained by adding the outside diameter of a needle roller bearing 55, which may function as a second bearing, to the outside diameter of each output member 53. The outside diameter of each needle roller bearing 55 is set to a value that is smaller than the outside diameter of the ball bearing 54. External teeth 50c having an involute tooth profile are formed on the outer periphery of the input member 50.

As shown in FIG. 5, the external teeth 50c are configured such that both tooth flanks 500c, 501c (both tooth flanks of the input member 50 in the circumferential direction) of each external tooth 50c function as revolving force applying faces and rotation force receiving faces with respect to both tooth flanks 520c, 521c (both tooth flanks of the rotation force applying member 52 in the circumferential direction) of each internal tooth 52c of the rotation force applying member 52. The number $Z_1$ of the external teeth 50c is set to 195 ($Z_1$=195), for example.

As shown in FIG. 6, in a state where tooth tips 502c (shown in FIG. 5) of the external teeth 50c are in contact with bottomlands 522c (shown in FIG. 5) of the internal teeth 52c on a line perpendicular to the rotation axis O and the axis $O_1$, the outer ring 541 is fitted to the inner periphery of the input member 50, which defines the center hole 50a, with a clearance in the radial direction of the motor shaft 42, and the inner ring 540 is fitted to the eccentric portion 42a with a clearance in the radial direction of the motor shaft 42. Therefore, a size $L_1$ between the axis $O_1$ and the axis $O_{1'}$ is set to a size that is smaller than or equal to half of the size $\{(d_1-D_1)+(D_2-d_2)+G_1\}$ obtained by adding a diameter difference $d_1-D_1$ between an outside diameter $D_1$ of the ball bearing 54 and an inside diameter $d_1$ of the input member 50, which defines the center hole 50a, a diameter difference $D_2-d_2$ between an inside diameter $D_2$ of the ball bearing 54 and an outside diameter $d_2$ of the eccentric portion 42a, and an operating clearance $G_1$ of a radial internal clearance of the ball bearing 54, that is, $\{(d_1-D_1)+(D_2-d_2)+G_1\}/2 \geq L_1$. That is, the size $L_1$ is set to such a size that the tooth tips 502c of the external teeth 50c contact the bottomlands 522c of the internal teeth 52c as indicated by the continuous line in FIG. 5 before the input member 50 moves from its initial state over a distance corresponding to the size that is smaller than or equal to half of the size obtained by adding the diameter difference $d_1-D_1$ between the outside diameter $D_1$ of the ball bearing 54 and the inside diameter $d_1$ of the input member 50, which defines the center hole 50a, the diameter difference $D_2-d_2$ between the inside diameter $D_2$ of the ball bearing 54 and the outside diameter $d_2$ of the eccentric portion 42a, and the operating clearance $G_1$ of the radial internal clearance of the ball bearing 54.

Therefore, as the input member 50 moves in the direction in which the centrifugal force $P_1$ acts, upon reception of a load due to the centrifugal force $P_1$ that is generated on the basis of the circular motion of the input member 50, the tooth tips 502c of the external teeth 50c contact the bottomlands 522c of the internal teeth 52c of the rotation force applying member 52. At the contact positions, the rotation force applying member 52 receives a radial load from the input member 50. Thus, the bottomlands 522c of the internal teeth 52c of the rotation force applying member 52 intensively receive a load due to the centrifugal force $P_1$ from the input member 50. Therefore, application of the load due to the centrifugal force $P_1$ to the ball bearing 54 (to the points of contact between the outer ring 541 and the rolling elements 542 and the points of contact between the rolling elements 542 and the inner ring 540) is suppressed.

As shown in FIG. 4, the input member 51 is formed of an external gear that has a center hole 51a of which the central axis coincides with the axis (third axis) $O_{2'}$. The input member 51 is arranged so as to be closer to the electric motor 4 than the input member 50. In addition, the input member 51 is rotatably supported by the motor shaft 42 via a ball bearing 56. The ball bearing 56 may function as a first bearing, and arranged between the inner periphery of the input member 51, which defines the center hole 51a, and the eccentric portion 42b. The input member 51 is configured to make circular motion (revolving motion about the rotation axis O) in the directions of the arrows $m_1$, $m_2$ (shown in FIG. 3) with the eccentric amount δ, upon reception of motor torque from the electric motor 4. The ball bearing 56 includes two races (an inner ring 560 and an outer ring 561) and rolling elements 562. The inner ring 560 is arranged radially inward of the outer ring 561. The rolling elements 562 roll between the inner ring 560 and the outer ring 561. The inner ring 560 is fitted to the eccentric portion 42b with a clearance (gap) in the radial direction of the motor shaft 42. The outer ring 561 is fitted to the inner periphery of the input member 51, which defines the center hole 51a, with a clearance (gap) in the radial direction of the motor shaft 42. That is, the inner ring 560 is fitted to the outer periphery of the eccentric portion 42b by clearance fit, and the outer ring 561 is fitted to the inner periphery of the input member 51, which defines the center hole 51a, by clearance fit. Note that FIG. 4 shows a state where a centrifugal force $P_2$ acts on the input member 51, the inner ring 560, the outer ring 561 and the rolling elements 562.

The input member 51 has a plurality of (six in the present embodiment) pin insertion holes (through-holes) 51b that are arranged at equal intervals around the axis $O_{2'}$. The hole diameter of each pin insertion hole 51b is set to a size that is larger than a size obtained by adding the outside diameter of a needle roller bearing 57, which may function as a second bearing, to the outside diameter of each output member 53. The outside diameter of each needle roller bearing 57 is set to a size that is smaller than the outside diameter of the ball bearing 56. External teeth 51c having an involute tooth profile are formed on the outer periphery of the input member 51.

As shown in FIG. 5, the external teeth 51c are configured such that both tooth flanks (both tooth flanks in the circumferential direction of the input member 51) of each external tooth 51c function as a revolving force applying face and a rotation force receiving face with respect to both tooth flanks (both tooth flanks in the circumferential direction of the rotation force applying member 52) of each internal tooth 52c of the rotation force applying member 52. The number $Z_2$ of the external teeth 51c is set to 195, for example.

As shown in FIG. 6, in a state where tooth tips 512c of the external teeth 51c are in contact with bottomlands 522c of the internal teeth 52c on a line perpendicular to the rotation axis O and the axis $O_2$, the outer ring 561 is fitted to the inner periphery of the input member 51, which defines the center hole 51a, with a clearance in the radial direction of the motor shaft 42, and the inner ring 560 is fitted to the eccentric portion 42b with a clearance in the radial direction of the motor shaft 42. Therefore, a size $L_2$ between the axis $O_1$ and the axis $O_{2'}$ is set to a size that is smaller than or equal to half of the size $\{(d_3-D_3)+(D_4-d_4)+G_2\}$ obtained by adding a diameter difference $d_3-D_3$ between an outside diameter $D_3$ of the ball bearing 56 and an inside diameter $d_3$ of the input member 51, which defines the center hole 51a, a diameter difference $D_4-d_4$ between an inside diameter $D_4$ of the ball bearing 56 and an outside diameter $d_4$ of the eccentric portion 42b, and an operating clearance $G_2$ of a radial internal clearance of the ball bearing 56, that is, $\{(d_3-D_3)+(D_4-d_4)+G_2\} \geq L_2$. That is, the size $L_2$ is set to such a size that the tooth tips 512c of the external teeth 51c contact the bottomlands 522c of the internal teeth 52c as indicated by the continuous line in FIG. 5 before the input member 51 moves from its initial state over a distance corresponding to the size that is smaller than or equal to half of the size obtained by adding the diameter difference $d_3-D_3$ between the outside diameter $D_3$ of the ball bearing 56 and the inside diameter $d_3$ of the input member 51, which defines the center hole 51a, the diameter difference $D_4-d_4$ between the inside diameter $D_4$ of the ball bearing 56 and the outside diameter $d_4$ of the eccentric portion 42b, and the operating clearance $G_2$ of the radial internal clearance of the ball bearing 56.

Therefore, as the input member 51 moves in the direction in which the centrifugal force $P_2$ acts, upon reception of a load due to the centrifugal force $P_2$ that is generated on the basis of the circular motion of the input member 51, the tooth tips 512c of the external teeth 51c contact the bottomlands 522c of the internal teeth 52c of the rotation force applying member 52. At the contact positions, the rotation force applying member 52 receives a radial load from the input member 51. Thus, the bottomlands 522c of the internal teeth 52c of the rotation force applying member 52 intensively receive a load due to the centrifugal force $P_2$ from the input member 50. Therefore, application of the load due to the centrifugal force $P_2$ to the ball bearing 56 (to the points of contact between the outer ring 561 and the rolling elements 562 and the points of contact between the rolling elements 562 and the inner ring 560) is suppressed.

The rotation force applying member 52 is formed of an internal gear of which the central axis coincides with a fourth axis (in the present embodiment, the fourth axis coincides with the rotation axis O). The rotation force applying member 52 is interposed between the first housing element 20 and the second housing element 21. The entirety of the rotation force applying member 52 is formed of an open-end cylindrical member that constitutes part of the housing 2 and that is open toward both sides in the direction of the rotation axis O. The rotation force applying member 52 is in mesh with the input members 50, 51. The rotation force applying member 52 is configured to apply rotation force in the directions of the arrows $n_1$, $n_2$ to the input member 50 that makes revolving motion upon reception of motor torque from the electric motor 4, and to apply rotation force in the directions of the arrows $l_1$, $l_2$ to the input member 51 that makes revolving motion upon reception of motor torque from the electric motor 4.

The inner periphery of the rotation force applying member 52 has a first fitting portion 52a and a second fitting portion 52b that are located at a predetermined distance in the direction of the rotation axis O. The first fitting portion 52a is fitted to the outer periphery of the protrusion 23. The second fitting portion 52b is fitted to the outer periphery of the protrusion 27. In addition, the inner periphery of the rotation force applying member 52 has internal teeth 52c having an involute tooth profile. The internal teeth 52c are located between the first fitting portion 52a and the second fitting portion 52b, and are in mesh with the external teeth 50c of the input member 50 and the external teeth 51c of the input member 51. The number $Z_3$ of the internal teeth 52c is set to 208 ($Z_3$=208), for example. Thus, the reduction gear ratio α of the reduction-transmission mechanism 5 is calculated according to an equation, $\alpha = Z_2/(Z_3-Z_2)$.

The output members 53 are multiple (six, in the present embodiment) bolts each having a threaded portion 53a at one end and a head 53b at the other end. The threaded portions 53a of the output members 53 are passed through the pin insertion holes 50b of the input member 50 and the pin insertion holes 51b of the input member 51 and then fitted in the pin fitting holes 300c of the differential case 30. In addition, the output members 53 are arranged so as to be passed through an annular spacer 58 that is interposed between each head 53b and the input member 51. The output members 53 are configured to receive rotation force, applied by the rotation force applying member 52, from the input members 50, 51, and then output the rotation force to the differential case 30 as the torque of the differential case 30.

The needle roller bearing 55 is fitted to the outer periphery of each output member 53 at a portion between the threaded portion 53a and the head 53b. The needle roller bearing 55 is used to reduce contact resistance between each output member 53 and the inner periphery of the input member 50, which defines the corresponding pin insertion hole 50b. In addition, the needle roller bearing 57 is fitted to the outer periphery of each output member 53 at a portion between the threaded portion 53a and the head 53b. The needle roller bearing 57 is used to reduce contact resistance between each output member 53 and the inner periphery of the input member 51, which defines the corresponding pin insertion hole 51b.

The needle roller bearings 55 each have the race 550 and needle rollers 551. The race 550 is able to contact the inner periphery of the input member 50, which defines a corresponding one of the pin insertion holes 50b. The needle rollers 551 roll between the inner periphery of the race 550 and the inner ring raceway surface of a corresponding one of the output members 53. The needle roller bearings 57 each have the race 570 and needle rollers 571. The race 570 is able to contact the inner periphery of the input member 51, which defines a corresponding one of the pin insertion holes 51b. The needle rollers 571 roll between the inner periphery of the race 570 and the inner ring raceway surface of a corresponding one of the output members 53.

Next, the operation of the motor torque transmission device according to the present embodiment will be described with reference to FIG. 1 to FIG. 6. In FIG. 2, when electric power is supplied to the electric motor 4 of the motor torque transmission device 1 to drive the electric motor 4, the motor torque is applied to the reduction-transmission mechanism 5 via the motor shaft 42. Thus, the reduction-transmission mechanism 5 is actuated.

Therefore, in the reduction-transmission mechanism 5, the input members 50, 51 each make circular motion with the eccentric amount δ, for example, in the direction of the arrow $m_1$ shown in FIG. 3.

Accordingly, the input member 50 rotates about the axis $O_1$ (the direction of the arrow $n_1$ shown in FIG. 3) while the external teeth 50c are meshed with the internal teeth 52c of the rotation force applying member 52. In addition, the input member 51 rotates about the axis $O_2$ (the arrow $l_1$ direction shown in FIG. 3) while the external teeth 51c are meshed with the internal teeth 52c of the rotation force applying member 52. In this case, due to the rotation of the input members 50, 51, the inner peripheries of the input member 50, which define the pin insertion holes 50b, contact the races 550 of the needle roller bearings 55, and the inner peripheries of the input member 51, which define the pin insertion holes 51b, contact the races 570 of the needle roller bearings 57.

Therefore, the revolving motions of the input members 50, 51 are not transmitted to the output members 53 and only the rotating motions of the input members 50, 51 are transmitted to the output members 53. Rotation force resulting from the rotating motions is output from the input members 50, 51 to the differential case 30 as the torque of the differential case 30.

In this way, the rear differential 3 is actuated, and driving force based on the motor torque of the electric motor 4 is distributed to the rear axle shafts 106 shown in FIG. 1, and transmitted to the right and left rear wheels 105.

As the motor torque transmission device 1 operates, the centrifugal force $P_1$ acts on the input member 50 on the basis of the circular motion of the input member 50, and the centrifugal force $P_2$ acts on the input member 51 on the basis of the circular motion of the input member 51.

Accordingly, the input member 50 moves in a direction in which the centrifugal force $P_1$ acts (for example, downward in FIG. 6), and the input member 51 moves in a direction in which the centrifugal force $P_2$ acts (for example, upward in FIG. 6).

In this case, as shown in FIG. 4 to FIG. 6, when the input member 50 moves in the direction in which the centrifugal force $P_1$ acts, upon reception of a load due to the centrifugal force $P_1$ that is generated on the basis of the circular motion of the input member 50, the tooth tips 502c of the external teeth 50c contact the bottomlands 522c of the internal teeth 52c as indicated by the continuous line in FIG. 5 before the input member 50 moves over a distance corresponding to the size that is smaller than or equal to half of the size obtained by adding the diameter difference $(d_1-D_1)$ between the outside diameter $D_1$ of the ball bearing 54 and the inside diameter d1 of the input member 50, which defines the center hole 50a, the diameter difference $(D_2-d_2)$ between the inside diameter $D_2$ of the ball bearing 54 and the outside diameter $d_2$ of the eccentric portion 42a, and the operating clearance $G_1$ of the radial internal clearance of the ball bearing 54.

Therefore, the bottomlands 522c of the internal teeth 52c intensively receive a load due to the centrifugal force $P_1$ from the input member 50. Therefore, application of the load due to the centrifugal force $P_1$ to the ball bearing 54 is suppressed.

Similarly, when the input member 51 moves in the direction in which the centrifugal force $P_2$ acts, upon reception of a load due to the centrifugal force $P_2$ that is generated on the basis of the circular motion of the input member 51, the tooth tips 512c of the external teeth 51c contact the bottomlands 522c of the internal teeth 52c as indicated by the continuous line in FIG. 5 before the input member 51 moves over a distance corresponding to the size that is smaller than or equal to half of the size obtained by adding the diameter difference $(d_3-D_3)$ between the outside diameter $D_3$ of the ball bearing 56 and the inside diameter d3 of the input member 51, which defines the center hole 51a, the diameter difference $(D_4-d_4)$ between the inside diameter $D_4$ of the ball bearing 56 and the outside diameter $d_4$ of the eccentric portion 42b, and the operating clearance $G_2$ of the radial internal clearance of the ball bearing 56.

Therefore, the bottomlands 522c of the internal teeth 52c intensively receive a load due to the centrifugal force $P_2$ from the input member 51. Therefore, application of the load due to the centrifugal force $P_2$ to the ball bearing 56 is suppressed.

Therefore, according to the present embodiment, it is no longer necessary to employ bearings having high durability as the ball bearings 54, 56.

In the above-described embodiment, the description is made on the case where the motor torque transmission device 1 is actuated by causing the input members 50, 51 to make circular motion in the direction of the arrow $m_1$. However, the motor torque transmission device 1 may be actuated in the same manner as that in the above-described embodiment even when the input members 50, 51 are caused to make circular motion in the direction of the arrow $m_2$. In this case, the rotating motion of the input member 50 is made in the direction of the arrow $n_2$, and the rotating motion of the input member 51 is made in the direction of the arrow $l_2$.

According to the above-described first embodiment, the following advantageous effects are obtained.

(1) It is no longer necessary to employ bearings having high durability as the ball bearings 54, 56. Therefore, it is possible to reduce cost.

(2) The loads due to the centrifugal forces P1, P2 are not applied to the ball bearings 54, 56. Therefore, it is possible to extend the service life of each of the ball bearings 54, 56.

Figure 7:
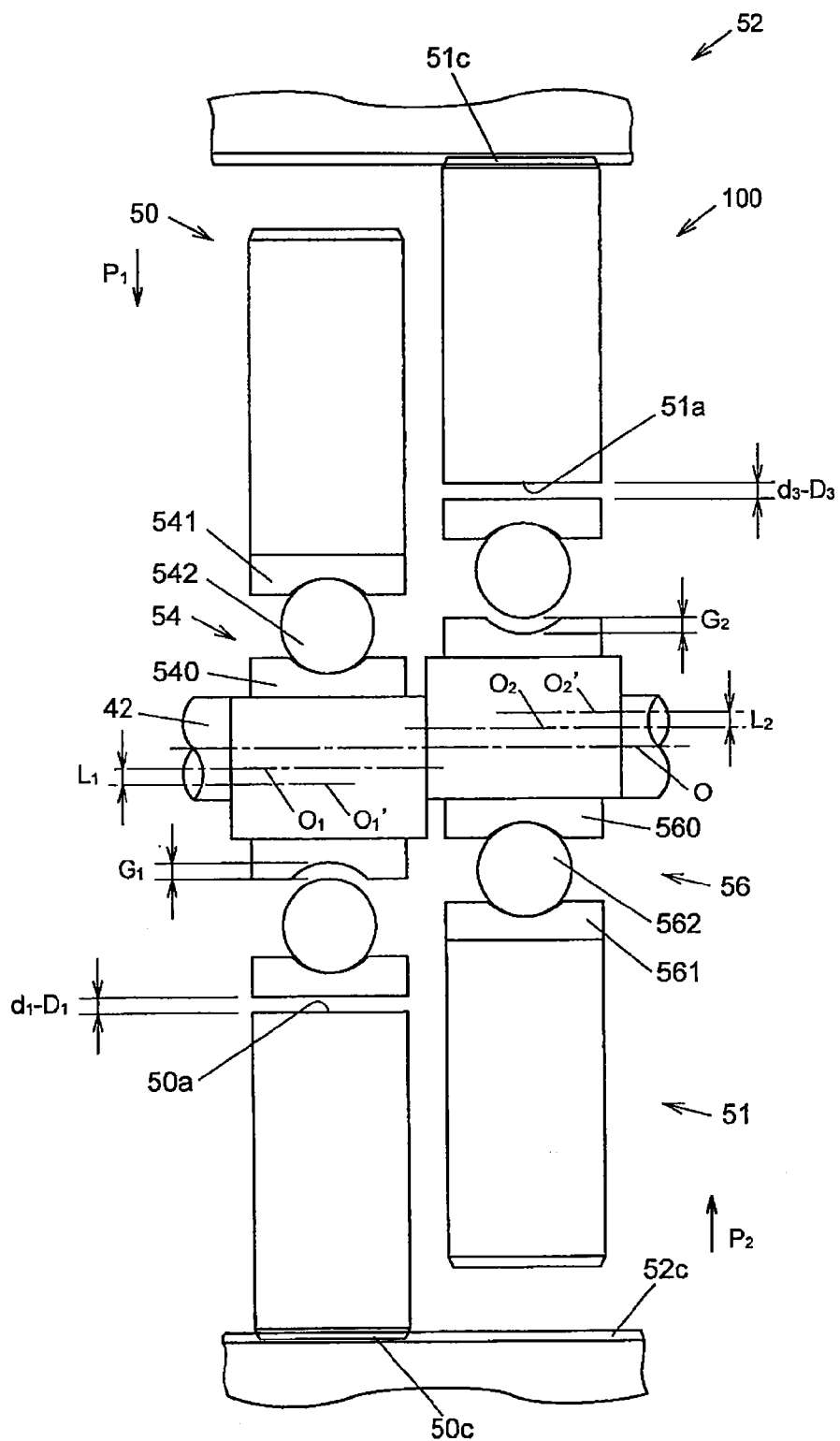
FIG. 7 is a simplified sectional view that shows a state where input members of a reduction-transmission mechanism are supported in a motor torque transmission device according to a second embodiment of the invention.

Next, a reduction-transmission mechanism in a motor torque transmission device according to a second embodiment of the invention will be described with reference to FIG. 5 and FIG. 7. FIG. 7 shows a state where input members are supported. In FIG. 7, the components that are identical or equivalent to those in FIG. 6 are denoted by the same reference numerals as those in FIG. 6, and the detailed description is omitted.

As shown in FIG. 7, a reduction-transmission mechanism 100 (partially shown) according to the second embodiment of the invention is characterized in that the inner rings 540, 560 of the ball bearings 54, 56 are fitted to the outer peripheries of the eccentric portions 42a, 42b by interference fit, and the outer rings 541, 561 are fitted to the inner peripheries of the input members 50, 51, which define the center holes 50a, 51a, by clearance fit.

In a state where the tooth tips 502c (shown in FIG. 5) of the external teeth 50c are in contact with the bottomlands 522c (shown in FIG. 5) of the internal teeth 52c on the line perpendicular to the rotation axis O and the axis $O_1$, the outer ring 541 is fitted in the center hole 50a with a clearance in the radial direction of the motor shaft 42. Therefore, the size $L_1$ between the axis $O_1$ and the axis $O_{1'}$ is set to a size that is smaller than or equal to half of the size $\{(d_1-D_1)+G_1\}$ obtained by adding the diameter difference $d_1-D_1$ between the outside diameter $D_1$ of the ball bearing 54 and the inside diameter $d_1$ of the input member 50, which defines the center hole 50a, and the operating clearance $G_1$ of the radial internal clearance of the ball bearing 54, that is, $\{(d_1-D_1)+G_1\}/2 \geq L_1$. That is, the size $L_1$ is set to such a size that the tooth tips 502c of the external teeth 50c contact the bottomlands 522c of the internal teeth 52c as indicated by the continuous line in FIG. 5 before the input member 50 moves from its initial state over a distance corresponding to the size that is smaller than or equal to half of the size obtained by adding the diameter difference $d_1-D_1$ between the outside diameter $D_1$ of the ball bearing 54 and the inside diameter $d_1$ of the input member 50, which defines the center hole 50a, and the operating clearance $G_1$ of the radial internal clearance of the ball bearing 54.

Therefore, as the input member 50 moves in the direction in which the centrifugal force $P_1$ acts, upon reception of a load due to the centrifugal force $P_1$ that is generated on the basis of the circular motion of the input member 50, the tooth tips 502c of the external teeth 50c contact the bottomlands 522c of the internal teeth 52c of the rotation force applying member 52. At this contact position, the rotation force applying member 52 receives a radial load from the input member 50. Therefore, the bottomlands 522c of the internal teeth 52c of the rotation force applying member 52 intensively receive a load due to the centrifugal force $P_1$ from the input member 50. As a result, application of the load due to the centrifugal force $P_1$ to the ball bearing 54 (to the points of contact between the outer ring 541 and the rolling elements 542 and the points of contact between the rolling elements 542 and the inner ring 540) is suppressed.

In a state where the tooth tips 512c (shown in FIG. 5) of the external teeth 51c are in contact with the bottomlands 522c of the internal teeth 52c on the line perpendicular to the rotation axis O and the axis $O_2$, the outer ring 561 is fitted in the center hole 51a with a clearance in the radial direction of the motor shaft 42. Therefore, the size $L_2$ between the axis $O_2$ and the axis $O_{2'}$ is set to a size that is smaller than or equal to half of the size $\{(d_3-D_3)+G_2\}$ obtained by adding the diameter difference $d_3-D_3$ between the outside diameter $D_3$ of the ball bearing 56 and the inside diameter $d_3$ of the input member 51, which defines the center hole 51*a*, and the operating clearance $G_2$ of the radial internal clearance of the ball bearing 56, that is, $\{(d_3-D_3)+G_3\}/2 \geq L_2$. That is, the size $L_2$ is set to such a size that the tooth tips 512*c* of the external teeth 51*c* contact the bottomlands 522*c* of the internal teeth 52*c* as indicated by the continuous line in FIG. 5 before the input member 51 moves from its initial state over a distance corresponding to the size that is smaller than or equal to half of the size obtained by adding the diameter difference $d_3-D_3$ between the outside diameter $D_3$ of the ball bearing 56 and the inside diameter $d_3$ of the input member 51, which defines the center hole 51*a*, and the operating clearance $G_2$ of the radial internal clearance of the ball bearing 56.

Therefore, as the input member 51 moves in the direction in which the centrifugal force $P_2$ acts, upon reception of a load due to the centrifugal force $P_2$ that is generated on the basis of the circular motion of the input member 51, the tooth tips 512*c* of the external teeth 51*c* contact the bottomlands 522*c* of the internal teeth 52*c* of the rotation force applying member 52. At this contact position, the rotation force applying member 52 receives a radial load from the input member 51. Therefore, the bottomlands 522*c* of the internal teeth 52*c* of the rotation force applying member 52 intensively receive a load due to the centrifugal force $P_2$ from the input member 51. As a result, application of the load due to the centrifugal force $P_2$ to the ball bearing 56 (to the points of contact between the outer ring 561 and the rolling elements 562 and the points of contact between the rolling elements 562 and the inner ring 560) is suppressed.

According to the above-described second embodiment, similar advantageous effects to those of the first embodiment are obtained.

Figure 8:
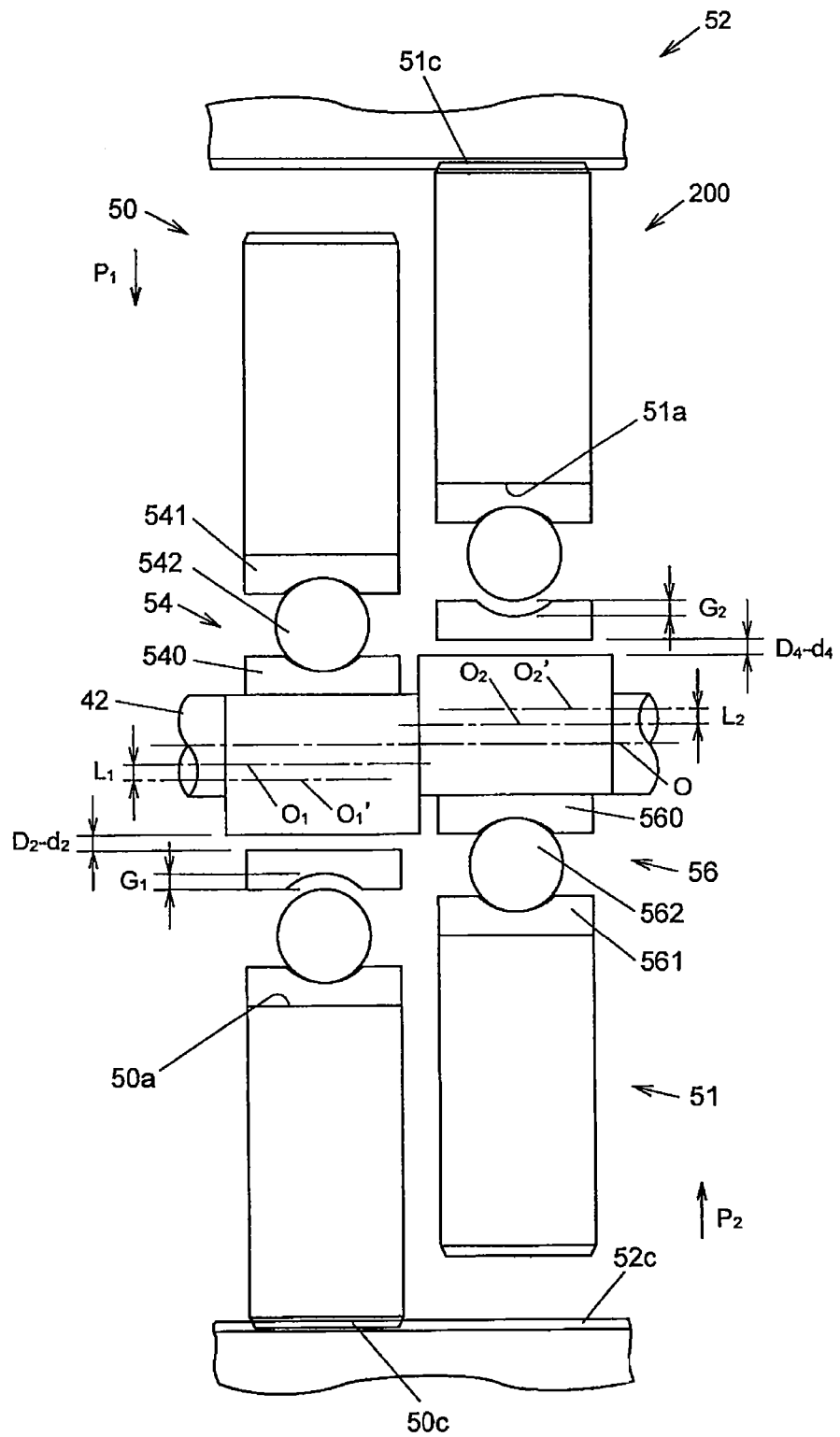
FIG. 8 is a simplified sectional view that shows a state where input members of a reduction-transmission mechanism are supported in a motor torque transmission device according to a third embodiment of the invention.

Next, a reduction-transmission mechanism in a motor torque transmission device according to a third embodiment of the invention will be described with reference to FIG. 5 and FIG. 8. FIG. 8 shows a state where input members are supported. In FIG. 8, the components that are identical or equivalent to those in FIG. 6 are denoted by the same reference numerals as those in FIG. 6, and the detailed description is omitted.

As shown in FIG. 8, a reduction-transmission mechanism 200 (partially shown) according to the third embodiment of the invention is characterized in that the inner rings 540, 560 of the ball bearings 54, 56 are fitted to the outer peripheries of the eccentric portions 42*a*, 42*b* by clearance fit. In addition, the reduction-transmission mechanism 200 is characterized in that the outer rings 541, 561 are fitted to the inner peripheries of the input members 50, 51, which define the center holes 50*a*, 51*a*, by interference fit.

In a state where the tooth tips 502*c* (shown in FIG. 5) of the external teeth 50*c* are in contact with the bottomlands 522*c* (shown in FIG. 5) of the internal teeth 52*c* on the line perpendicular to the rotation axis O and the axis $O_1$, the inner ring 540 is fitted to the eccentric portion 42*a* with a clearance in the radial direction of the motor shaft 42. Therefore, the size $L_1$ between the axis $O_1$ and the axis $O_1$, is set to a size that is smaller than or equal to half of the size $\{(D_2-d_2)+G_1\}$ obtained by adding a diameter difference $D_2-d_2$ between the inside diameter $D_2$ of the ball bearing 54 and the outside diameter $d_2$ of the eccentric portion 42*a* and the operating clearance $G_1$ of the radial internal clearance of the ball bearing 54, that is, $\{(D_2-d_2)+G_1\}/2 \geq L_1$. That is, the size $L_1$ is set to such a size that the tooth tips 502*c* of the external teeth 50*c* contact the bottomlands 522*c* of the internal teeth 52*c* as indicated by the continuous line in FIG. 5 before the input member 50 moves from its initial state over a distance corresponding to the size that is smaller than or equal to half of the size obtained by adding the diameter difference $D_2-d_2$ between the inside diameter $D_2$ of the ball bearing 54 and the outside diameter $d_2$ of the eccentric portion 42*a* and the operating clearance $G_1$ of the radial internal clearance of the ball bearing 54.

Therefore, as the input member 50 moves in the direction in which the centrifugal force $P_1$ acts, upon reception of a load due to the centrifugal force $P_1$ that is generated on the basis of the circular motion of the input member 50, the tooth tips 502*c* of the external teeth 50*c* contact the bottomlands 522*c* of the internal teeth 52*c* of the rotation force applying member 52. At this contact position, the rotation force applying member 52 receives a radial load from the input member 50. Therefore, the bottomlands 522*c* of the internal teeth 52*c* of the rotation force applying member 52 intensively receive a load due to the centrifugal force $P_1$ from the input member 50. As a result, application of the load due to the centrifugal force $P_1$ to the ball bearing 54 (to the points of contact between the outer ring 541 and the rolling elements 542 and the points of contact between the rolling elements 542 and the inner ring 540) is suppressed.

In a state where the tooth tips 502*c* (shown in FIG. 5) of the external teeth 51*c* are in contact with the bottomlands 522*c* of the internal teeth 52*c* on the line perpendicular to the rotation axis O and the axis $O_2$, the inner ring 560 is fitted to the eccentric portion 42*b* with a clearance in the radial direction of the motor shaft 42. Therefore, the size $L_2$ between the axis $O_1$ and the axis $O_2$, is set to a size that is smaller than or equal to half of the size $\{(D_4-d_4)+G_2\}$ obtained by adding a diameter difference $D_4-d_4$ between the inside diameter $D_4$ of the ball bearing 56 and the outside diameter $d_4$ of the eccentric portion 42*b* and the operating clearance $G_2$ of the radial internal clearance of the ball bearing 56, that is, $\{(D_4-d_4)+G_2\}/2 \geq L_2$. That is, the size $L_2$ is set to such a size that the tooth tips 512*c* of the external teeth 51*c* contact the bottomlands 522*c* of the internal teeth 52*c* as indicated by the continuous line in FIG. 5 before the input member 51 moves from its initial state over a distance corresponding to the size that is smaller than or equal to half of the size obtained by adding the diameter difference $D_4-d_4$ between the inside diameter $D_4$ of the ball bearing 56 and the outside diameter $d_4$ of the eccentric portion 42*b* and the operating clearance $G_2$ of the radial internal clearance of the ball bearing 56.

Therefore, as the input member 51 moves in the direction in which the centrifugal force $P_2$ acts, upon reception of a load due to the centrifugal force $P_2$ that is generated on the basis of the circular motion of the input member 51, the tooth tips 512*c* of the external teeth 51*c* contact the bottomlands 522*c* of the internal teeth 52*c* of the rotation force applying member 52. At this contact position, the rotation force applying member 52 receives a radial load from the input member 51. Therefore, the bottomlands 522*c* of the internal teeth 52*c* of the rotation force applying member 52 intensively receive a load due to the centrifugal force $P_2$ from the input member 51. Application of the load due to the centrifugal force $P_2$ to the ball bearing 56 (to the points of contact between the outer ring 561 and the rolling elements 562 and the points of contact between the rolling elements 562 and the inner ring 560) is suppressed.

According to the above-described third embodiment, similar advantageous effects to those of the first embodiment are obtained.

Figure 9:
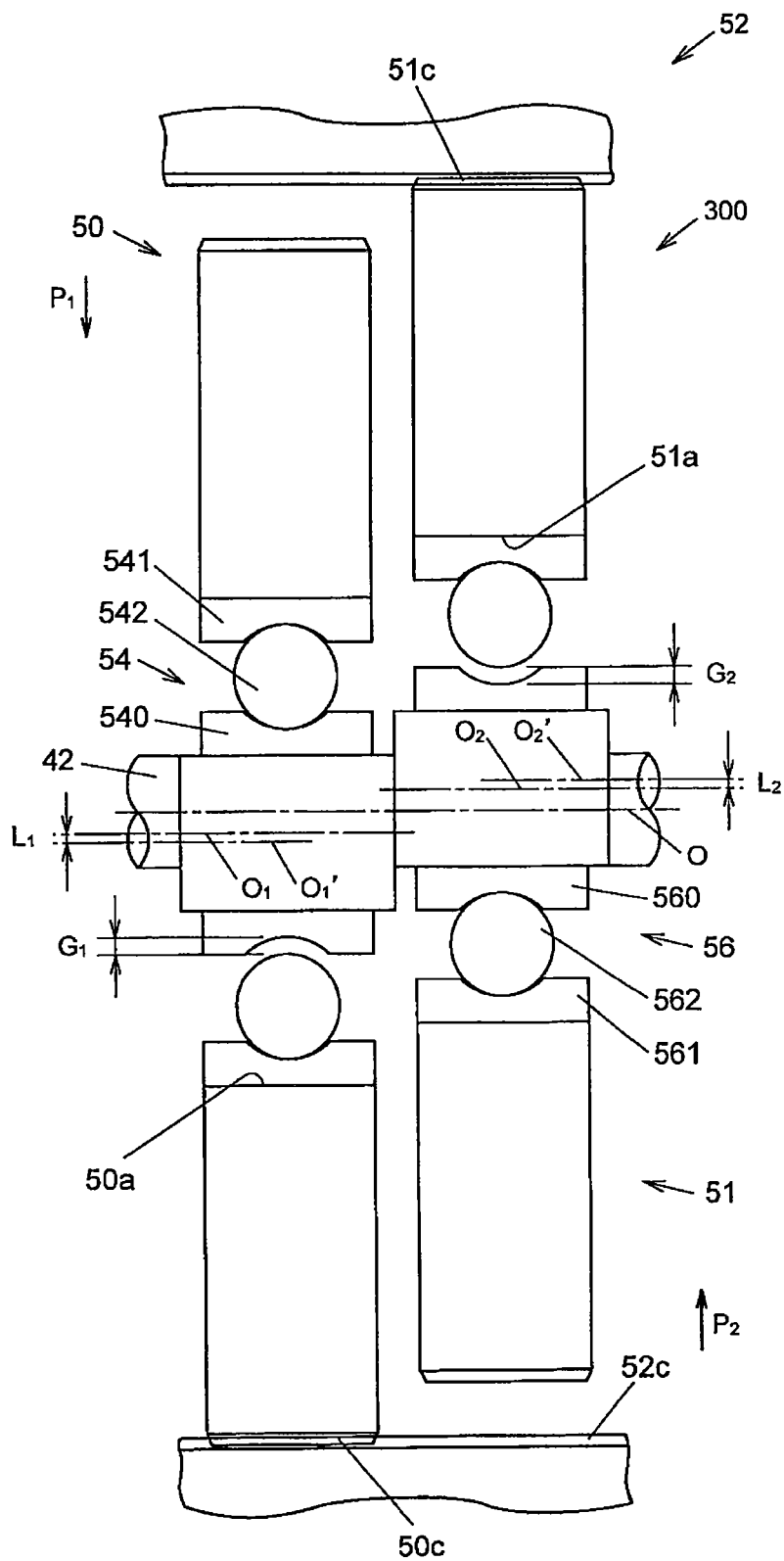
FIG. 9 is a simplified sectional view that shows a state where input members of a reduction-transmission mechanism are supported in a motor torque transmission device according to a fourth embodiment of the invention.
Figure 10:
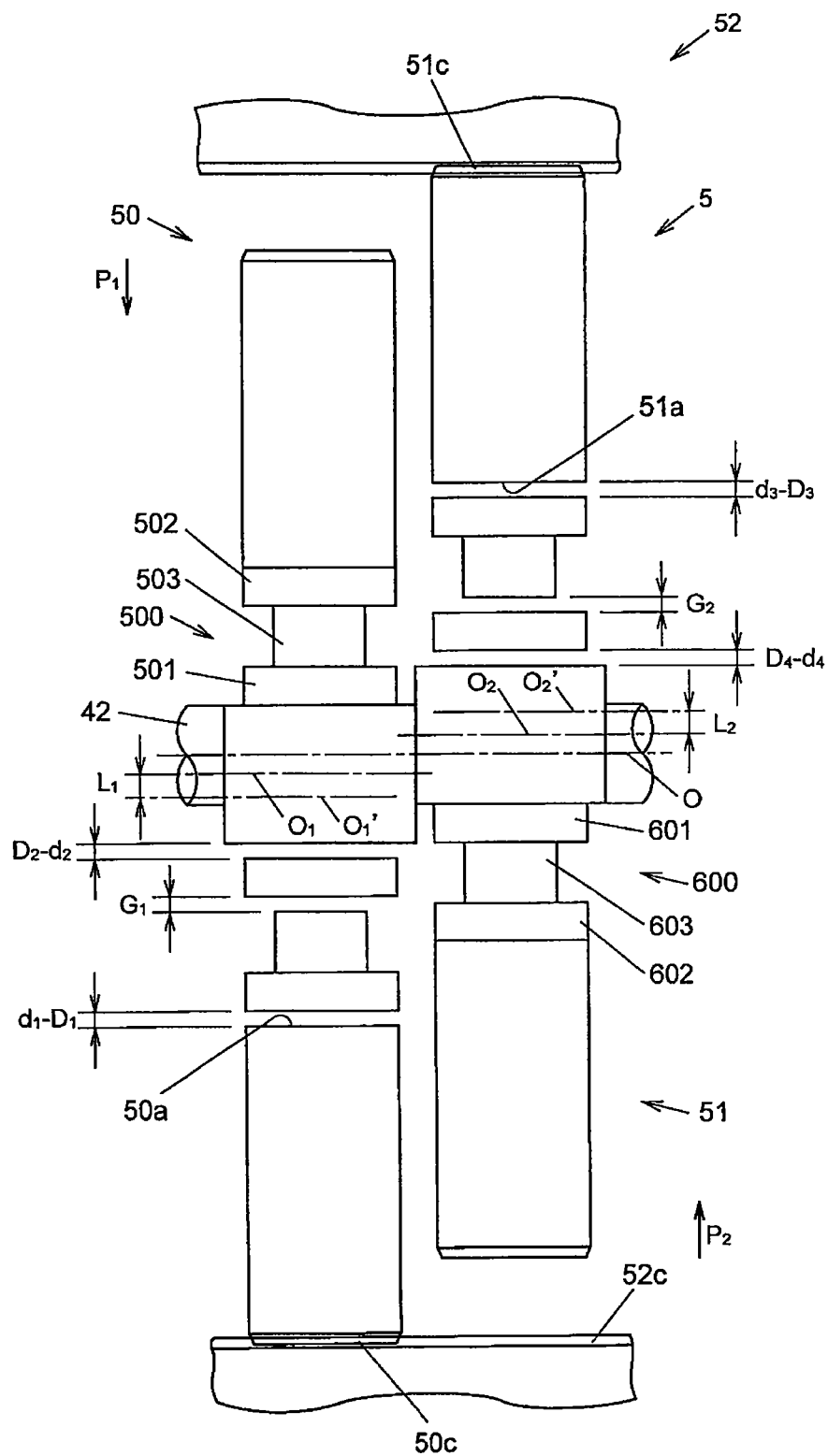
FIG. 10 is a simplified sectional view that shows the state where the input members of the reduction-transmission mechanism are supported in the motor torque transmission device in a first modified example according to the first embodiment of the invention.
Figure 11:
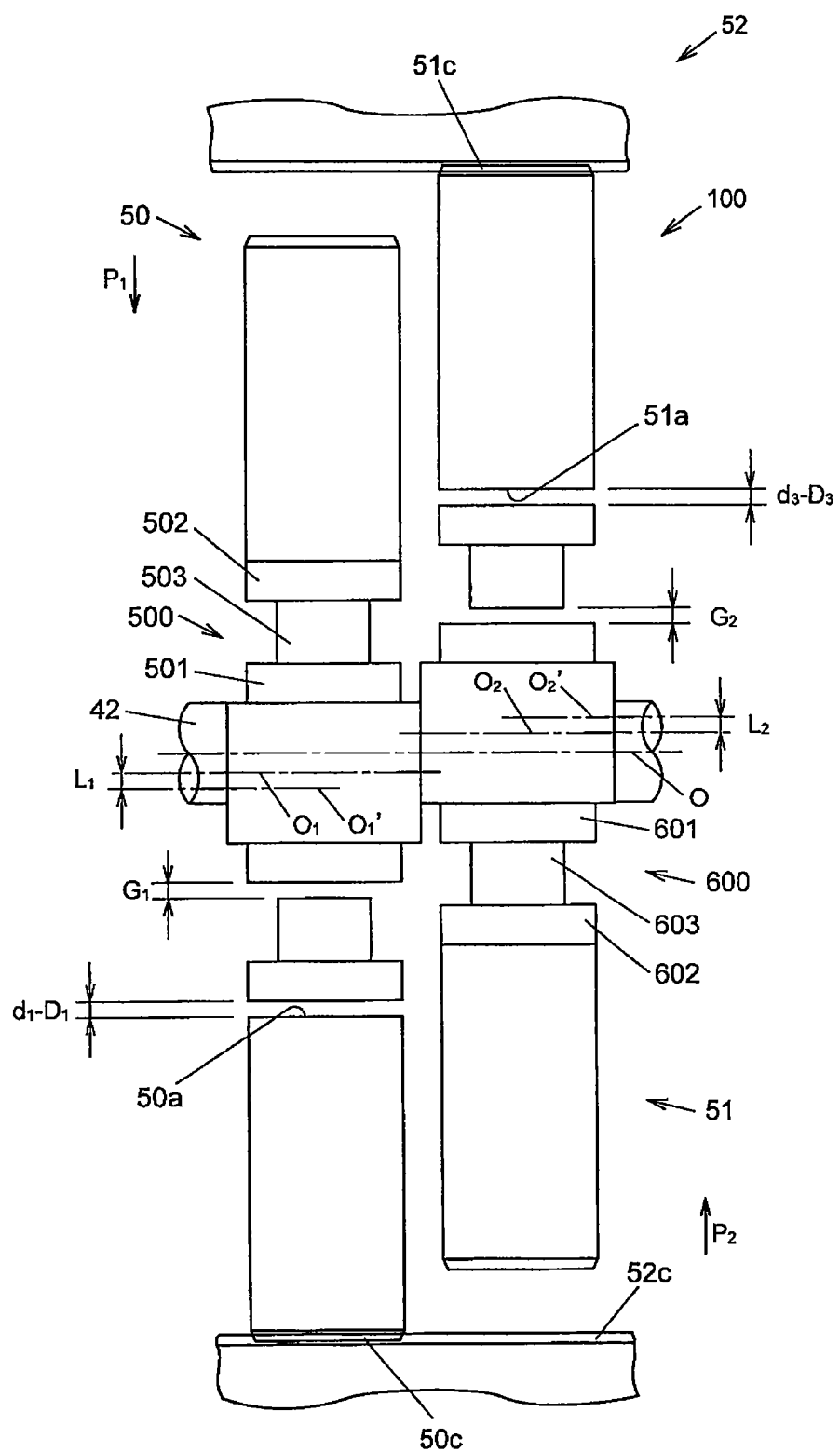
FIG. 11 is a simplified sectional view that shows the state where the input members of the reduction-transmission mechanism are supported in the motor torque transmission device in a second modified example according to the second embodiment of the invention.
Figure 12:
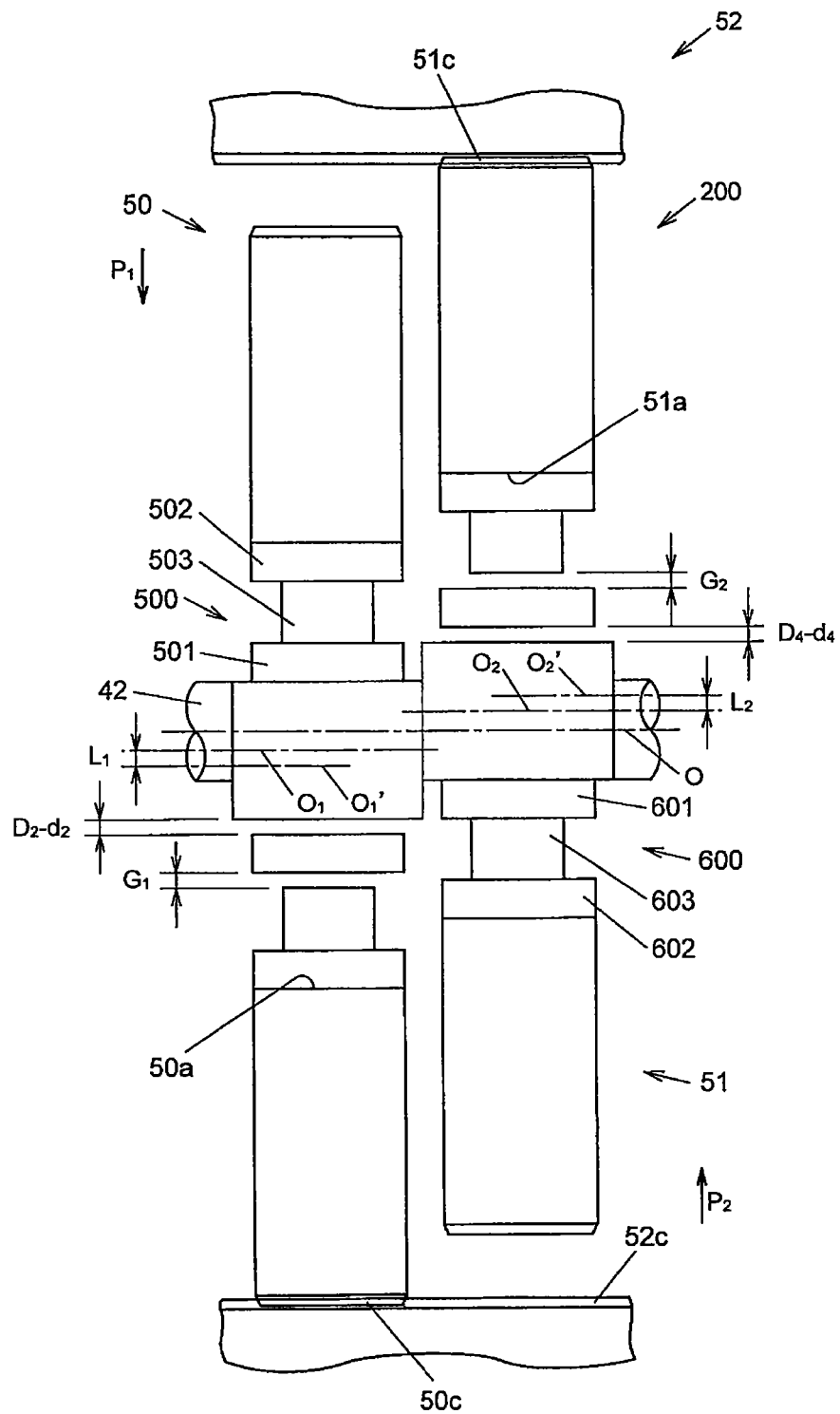
FIG. 12 is a simplified sectional view that shows the state where the input members of the reduction-transmission mechanism are supported in the motor torque transmission device in a third modified example according to the third embodiment of the invention.
Figure 13:
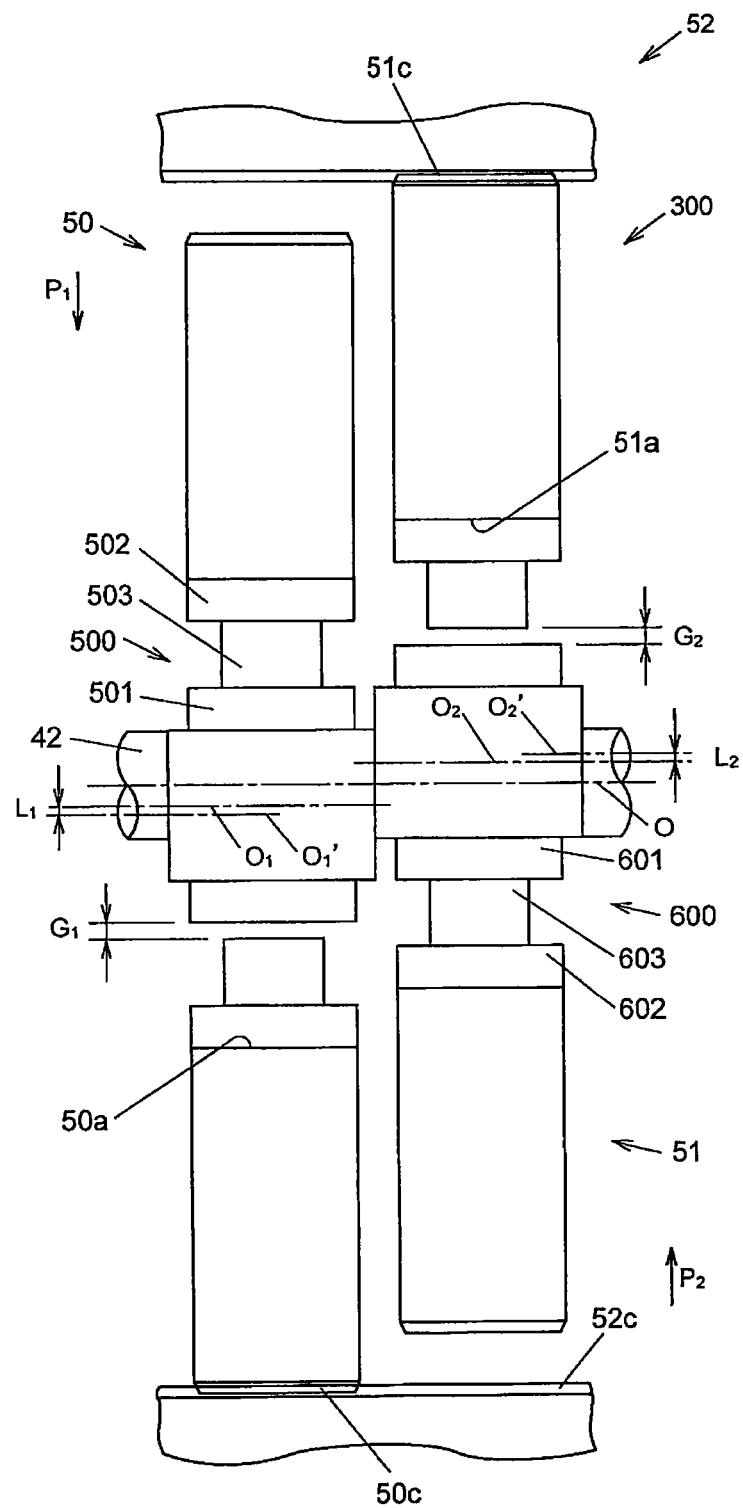
FIG. 13 is a simplified sectional view that shows the state where the input members of the reduction-transmission mechanism are supported in the motor torque transmission device in a fourth modified example according to the fourth embodiment of the invention.

Next, a reduction-transmission mechanism in a motor torque transmission device according to a fourth embodiment of the invention will be described with reference to FIG. 5 and FIG. 9. FIG. 9 shows a state where input members are supported. In FIG. 9, the components that are identical or equivalent to those in FIG. 6 are denoted by the same reference numerals as those in FIG. 6, and the detailed description is omitted.

As shown in FIG. 9, a reduction-transmission mechanism 300 (partially shown) according to the fourth embodiment of the invention is characterized in that the inner rings 540, 560 of the ball bearings 54, 56 are fitted to the respective outer peripheries of the eccentric portions 42a, 42b by interference fit, and the outer rings 541, 561 are fitted to the respective inner peripheries of the input members 50, 51, which defines the center holes 50a, 51a, by interference fit.

The size $L_1$ between the axis $O_1$ and the axis $O_{1'}$ is set to a size that is smaller than or equal to half of the operating clearance $G_1$ of the radial internal clearance of the ball bearing 54, that is, $G_1/2 \geq L_1$, in a state where the tooth tips 502c (shown in FIG. 5) of the external teeth 50c are in contact with the bottomlands 522c (shown in FIG. 5) of the internal teeth 52c on the line perpendicular to the rotation axis O and the axis $O_1$. That is, the size $L_1$ is set to such a size that the tooth tips 502c of the external teeth 50c contact the bottomlands 522c of the internal teeth 52c as indicated by the continuous line in FIG. 5 before the input member 50 moves from its initial state over a distance corresponding to the size that is smaller than or equal to half of the operating clearance $G_1$ of the radial internal clearance of the ball bearing 54.

Therefore, as the input member 50 moves in the direction in which the centrifugal force $P_1$ acts, upon reception of a load due to the centrifugal force $P_1$ that is generated on the basis of the circular motion of the input member 50, the tooth tips 502c of the external teeth 50c contact the bottomlands 522c of the internal teeth 52c of the rotation force applying member 52. At this contact position, the rotation force applying member 52 receives a radial load from the input member 50. Therefore, the bottomlands 522c of the internal teeth 52c of the rotation force applying member 52 intensively receive a load due to the centrifugal force $P_1$ from the input member 50. Thus, application of the load due to the centrifugal force $P_1$ to the ball bearing 54 (to the points of contact between the outer ring 541 and the rolling elements 542 and the points of contact between the rolling elements 542 and the inner ring 540) is suppressed.

The size $L_2$ between the axis $O_2$ and the axis $O_{2'}$ is set to a size that is smaller than or equal to half of the operating clearance $G_2$ of the radial internal clearance in the ball bearing 56, that is, $G_2/2 \geq L_2$, in a state where the tooth tips 512c (shown in FIG. 5) of the external teeth 51c are in contact with the bottomlands 522c of the internal teeth 52c on the line perpendicular to the rotation axis O and the axis $O_2$. That is, the size $L_2$ is set to such a size that the tooth tips 512c of the external teeth 51c contact the bottomlands 522c of the internal teeth 52c as indicated by the continuous line in FIG. 5 before the input member 51 moves from its initial state over a distance corresponding to the size that is smaller than or equal to half of the operating clearance $G_2$ of the radial internal clearance of the ball bearing 56.

Therefore, as the input member 51 moves in the direction in which the centrifugal force $P_2$ acts, upon reception of a load due to the centrifugal force $P_2$ that is generated on the basis of the circular motion of the input member 51, the tooth tips 512c of the external teeth 51c contact the bottomlands 522c of the internal teeth 52c of the rotation force applying member 52. At this contact position, the rotation force applying member 52 receives a radial load from the input member 51. Therefore, the bottomlands 522c of the internal teeth 52c of the rotation force applying member 52 intensively receive a load due to the centrifugal force $P_2$ from the input member 51.

Thus, application of the load due to the centrifugal force $P_2$ to the ball bearing 56 (to the points of contact between the outer ring 561 and the rolling elements 562 and the points of contact between the rolling elements 562 and the inner ring 560) is suppressed.

According to the above-described fourth embodiment, similar advantageous effects to those of the first embodiment are obtained.

Hereinafter, a motor torque transmission device according to a fifth embodiment of the invention will be described in detail with reference to the accompanying drawings.

Figure 14:
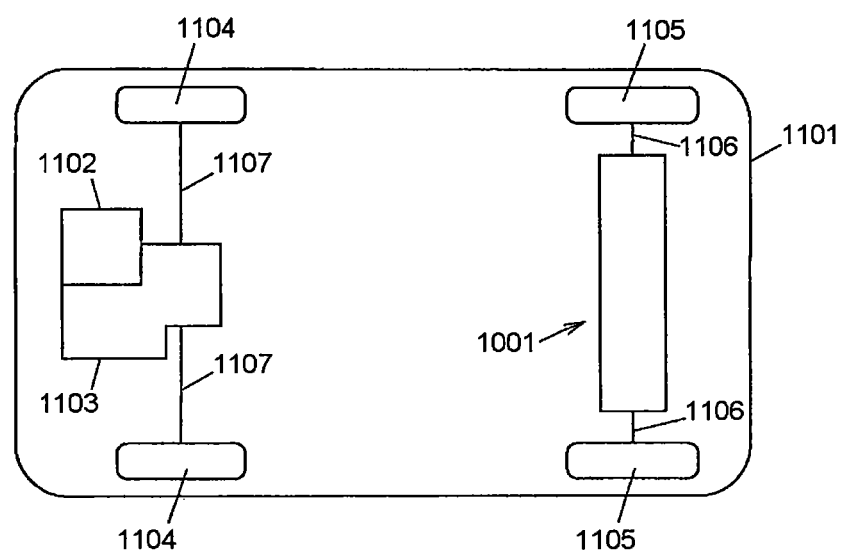
FIG. 14 is a schematic plan view for illustrating a vehicle in which a motor torque transmission device according to a fifth embodiment of the invention is mounted.

FIG. 14 schematically shows a four-wheel drive vehicle 1101. As shown in FIG. 14, the four-wheel drive vehicle 1101 includes a front wheel power system and a rear wheel power system. The four-wheel drive vehicle 1101 includes a motor torque transmission device 1001, the engine 1102, a transaxle 1103, a pair of front wheels 1104, and a pair of rear wheels 1105. The engine 1102 is used as a driving source of the front wheel power system. An electric motor is used as a driving source of the rear wheel power system.

The motor torque transmission device 1001 is arranged in the rear wheel power system of the four-wheel drive vehicle 1101, and is supported by a vehicle body (not shown) of the four-wheel drive vehicle 1101.

Figure 15:
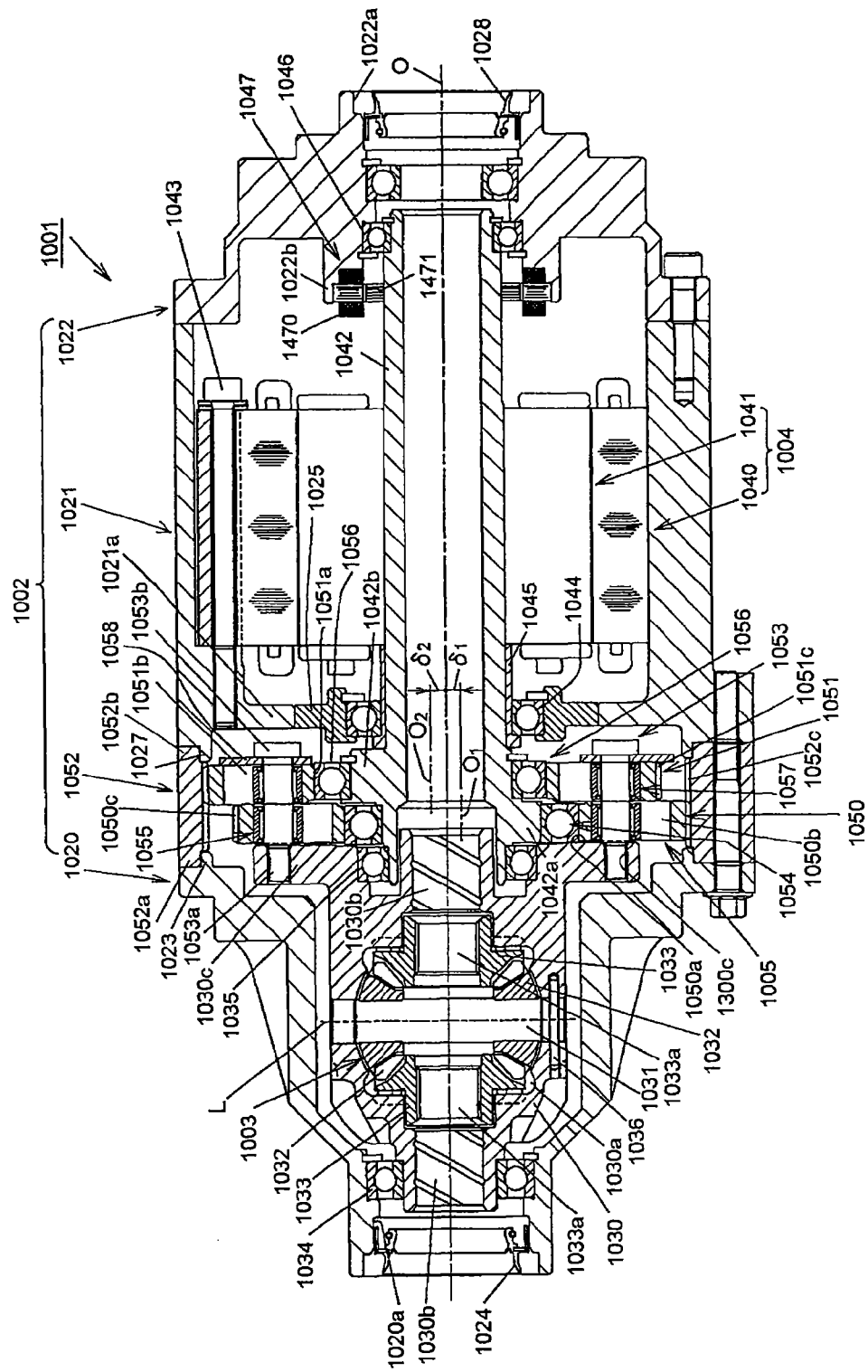
FIG. 15 is a sectional view for illustrating the motor torque transmission device according to the fifth embodiment of the invention.

The motor torque transmission device 1001 transmits driving force based on the motor torque of the electric motor 1004 (shown in FIG. 15) to the rear wheels 1105. Thus, the motor torque of the electric motor 1004 is output to rear axle shafts 1106 via a reduction-transmission mechanism 1005 and a rear differential 1003 (both are shown in FIG. 15) to drive the rear wheels 1105. The details of the motor torque transmission device 1001, and the like, will be described later.

The engine 1102 is arranged in the front wheel power system of the four-wheel drive vehicle 1101. Thus, the driving force of the engine 1102 is output to front axle shafts 1107 via the transaxle 1103 to drive the front wheels 1104.

FIG. 15 shows an overall view of the motor torque transmission device. As shown in FIG. 15, the motor torque transmission device 1001 is mainly formed of a housing 1002, the rear differential 1003, the electric motor 1004 and the reduction-transmission mechanism 1005. The central axis of the housing 1002 is an axis (a rotation axis O that may function as a first axis) of each rear axle shaft 1106 (shown in FIG. 14). The rear differential 1003 distributes driving force to the rear wheels 1105 (shown in FIG. 14). The electric motor 1004 generates motor torque to actuate the rear differential 1003. The reduction-transmission mechanism 5 reduces the speed of rotation output from the electric motor 1004 and transmits driving force to the rear differential 1003.

The housing 1002 has a rotation force applying member 1052 (described later), a first housing element 1020, a second housing element 1021 and a third housing element 1022. The housing 1002 is arranged on the vehicle body. The first housing element 1020 accommodates the rear differential 1003. The second housing element 1021 accommodates the electric motor 1004. The third housing element 1022 closes a first opening portion of the second housing element 1021 (an opening portion on the opposite side of the second housing element 1021 from a first housing element 1020-side opening portion (second opening portion)).

The first housing element 1020 is arranged at a second side (left side in FIG. 15) of the housing 1002. The entirety of the first housing element 1020 is formed of a stepped closed-end cylindrical member that is open toward the second housing element 1021. The bottom of the first housing element 1020 has a shaft insertion hole 1020a through which one of the rear axle shafts 1106 (shown in FIG. 14) is passed. An annular protrusion 1023 that protrudes toward the second housing element 1021 is formed integrally on the open end face of the first housing element 1020. The outer periphery of the protrusion 1023 has an outside diameter smaller than the maximum outside diameter of the first housing element 1020, and is formed of a cylindrical surface of which the central axis coincides with the rotation axis O. A seal member 1024 is interposed between the inner periphery of the first housing element 1020 and the outer periphery of the rear axle shaft 1106. The seal member 1024 seals the shaft insertion hole 1020*a*.

The second housing element 1021 is arranged at the middle of the housing 1002 in the axial direction. The entirety of the second housing element 1021 is formed of an open-end cylindrical member that is open toward both sides in the direction of the rotation axis O. A stepped inward flange 1021*a*, which is interposed between the electric motor 1004 and the reduction-transmission mechanism 1005, is formed integrally with the second opening portion of the second housing element 1021 (the opening portion on the first housing element 1020-side). An annular member 25, to which a race is fitted, is fitted to the inner periphery of the inward flange 1021*a*. An annular protrusion 1027, which protrudes toward the first housing element 1020, is formed integrally on the second open end face of the second housing element 1021 (the open end face on the first housing element 1020-side). The outer periphery of the protrusion 1027 has an outside diameter smaller than the maximum outside diameter of the second housing element 1021. The protrusion 1027 has substantially the same outside diameter as the outside diameter of the protrusion 1023. The outer periphery of the protrusion 1027 is formed of a cylindrical surface of which the central axis coincides with the rotation axis O.

The third housing element 1022 is arranged at the first side (right side in FIG. 15) of the housing 1002. The entirety of the third housing element 1022 is formed of a stepped closed-end cylindrical member that is open toward the second housing element 1021. The bottom of the third housing element 1022 has a shaft insertion hole 1022*a* through which the other one of the rear axle shafts 1106 is passed. A cylindrical portion 1022*b*, which protrudes toward the electric motor 1004 and to which a stator is fitted, is formed integrally with the third housing element 1022 so as to surround the inner opening of the shaft insertion hole 1022*a*. A seal member 1028 that seals the shaft insertion hole 1022*a* is interposed between the inner periphery of the third housing element 1022 and the outer periphery of the rear axle shaft 1106.

The rear differential 1003 is formed of a differential case 1030, a pinion gear shaft 1031, a pair of pinion gears 1032, and a pair of side gears 1033. The rear differential 1003 is formed of a bevel gear differential mechanism, and is arranged at the second side of the motor torque transmission device 1001.

With this configuration, the torque of the differential case 1030 is distributed from the pinion gear shaft 1031 to the side gears 1033 via the pinion gears 1032. The torque of the differential case 1030 is further transmitted from the side gears 1033 to the right and left rear wheels 1105 (shown in FIG. 14) via the rear axle shafts 1106 (shown in FIG. 14).

When there arises a difference in driving resistance between the right and left rear wheels 1105, the torque of the differential case 1030 is differentially distributed to the right and left rear wheels 1105 by the rotations of the pinion gears 1032.

The differential case 1030 is arranged on an axis different from the rotation axis O. The differential case 1030 is rotatably supported by the first housing element 1020 via a ball bearing 1034, and is rotatably supported by a motor shaft (rotary shaft) 1042 of the electric motor 1004 via a ball bearing 1035. The differential case 1030 rotates upon reception of driving force based on the motor torque of the electric motor 1004 from the reduction-transmission mechanism 1005.

The differential case 1030 has an accommodation space 1030*a* and a pair of shaft insertion holes 1030*b*. A differential mechanism unit (the pinion gear shaft 1031, the pinion gears 1032 and the side gears 1033) is accommodated in the accommodation space 1030*a*. The shaft insertion holes 1030*b* communicate with the accommodation space 1030*a*, and the right and left rear axle shafts 1106 are passed through the shaft insertion holes 1030*b*.

An annular flange 1030*c* that faces the reduction-transmission mechanism 1005 is formed integrally with the differential case 1030. The flange 1030*c* has a plurality of (six in the present embodiment) pin fitting holes 1300*c* arranged at equal intervals around the rotation axis of the differential case 1030.

The pinion gear shaft 1031 is arranged along an axis L that is perpendicular to the axis of the differential case 1030, in the accommodation space 1030*a* of the differential case 1030. The rotation of the pinion gear shaft 1031 about the axis L and the movement of the pinion gear shaft 1031 in the direction of the axis L are restricted by a pin 1036.

The pinion gears 1032 are rotatably supported by the pinion gear shaft 1031, and are accommodated in the accommodation space 1030*a* of the differential case 1030.

The side gears 1033 each have a shaft coupling hole 1033*a*. The right and left rear axle shafts 1106 (shown in FIG. 14) are coupled into the corresponding coupling holes 1033*a* by spline fitting. The side gears 1033 are accommodated in the accommodation space 1030*a* of the differential case 1030. The side gears 1033 are configured such that the gear axes are perpendicular to the gear axes of the pinion gears 1032 and the side gears 1033 are in mesh with the pinion gears 1032.

The electric motor 1004 includes a stator 1040, a rotor 1041 and the motor shaft 1042. The electric motor 1004 is coupled to the rear differential 1003 via the reduction-transmission mechanism 1005 on the rotation axis O. The stator 1040 of the electric motor 1004 is connected to an electronic control unit (ECU) (not shown). The electric motor 1004 is configured such that the stator 1040 receives a control signal from the ECU, motor torque for driving the rear differential 1003 is generated with the use to the stator 1040 and the rotor 1041, and the rotor 1041 is rotated together with the motor shaft 1042.

The stator 1040 is arranged at the outer peripheral side of the electric motor 1004, and is fitted to the inward flange 1021*a* of the second housing element 1021 with a fitting bolt 1043.

The rotor 1041 is arranged at the inner peripheral side of the electric motor 1004, and is fitted to the outer periphery of the motor shaft 1042.

The motor shaft 1042 is arranged on the rotation axis O. In addition, the second end portion of the motor shaft 1042 is rotatably supported by the inner periphery of the annular member 1025 via a ball bearing 1044 and a sleeve 1045, and the first end portion of the motor shaft 1042 is rotatably supported by the inner periphery of the third housing element 1022 via a ball bearing 1046. The entirety of the motor shaft 1042 is formed of a cylindrical shaft member through which the rear axle shafts 1106 (shown in FIG. 14) are passed.

An eccentric portion 1042*a* and an eccentric portion 1042*b*, both of which are circular in planar view, are formed integrally with the second end portion of the motor shaft 1042. The central axis of the eccentric portion 1042a is an axis $O_1$ (second axis) that is offset from the rotation axis O of the motor shaft 1042 by an eccentric amount $\delta_1$. The central axis of the eccentric portion 1042b is an axis $O_2$ that is offset from the rotation axis O by an eccentric amount $\delta_2$ ($\delta 1 = \delta_2 = \delta$). The eccentric portion 1042a and the eccentric portion 1042b are arranged so as to be next to each other along the rotation axis O and apart from each other in the circumferential direction around the rotation axis O at equal intervals (180°). That is, the eccentric portion 1042a and the eccentric portion 1042b are arranged on the outer periphery of the motor shaft 1042 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_1$ and the axis $O_2$ in the other circumferential direction around the rotation axis O are equal to each other.

A resolver 1047 is arranged at the first end portion of the motor shaft 1042. The resolver 1047 serves as a rotation angle detector, and is interposed between the outer periphery of the motor shaft 1042 and the inner periphery of the cylindrical portion 1022b. The resolver 1047 has a stator 1470 and a rotor 1471, and is accommodated inside the third housing element 1022. The stator 1470 is fitted to the inner periphery of the cylindrical portion 1022b. The rotor 1471 is fitted to the outer periphery of the motor shaft 1042.

Figure 16:
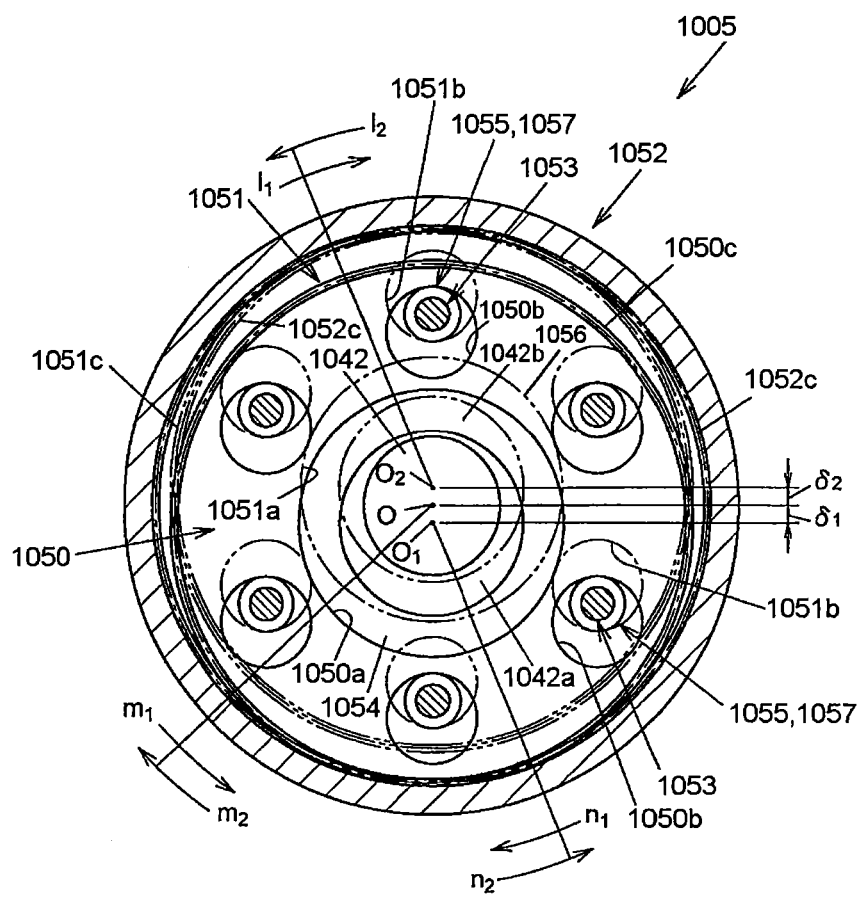
FIG. 16 is a schematic sectional view for illustrating a reduction-transmission mechanism of the motor torque transmission device according to the fifth embodiment of the invention.
Figure 17:
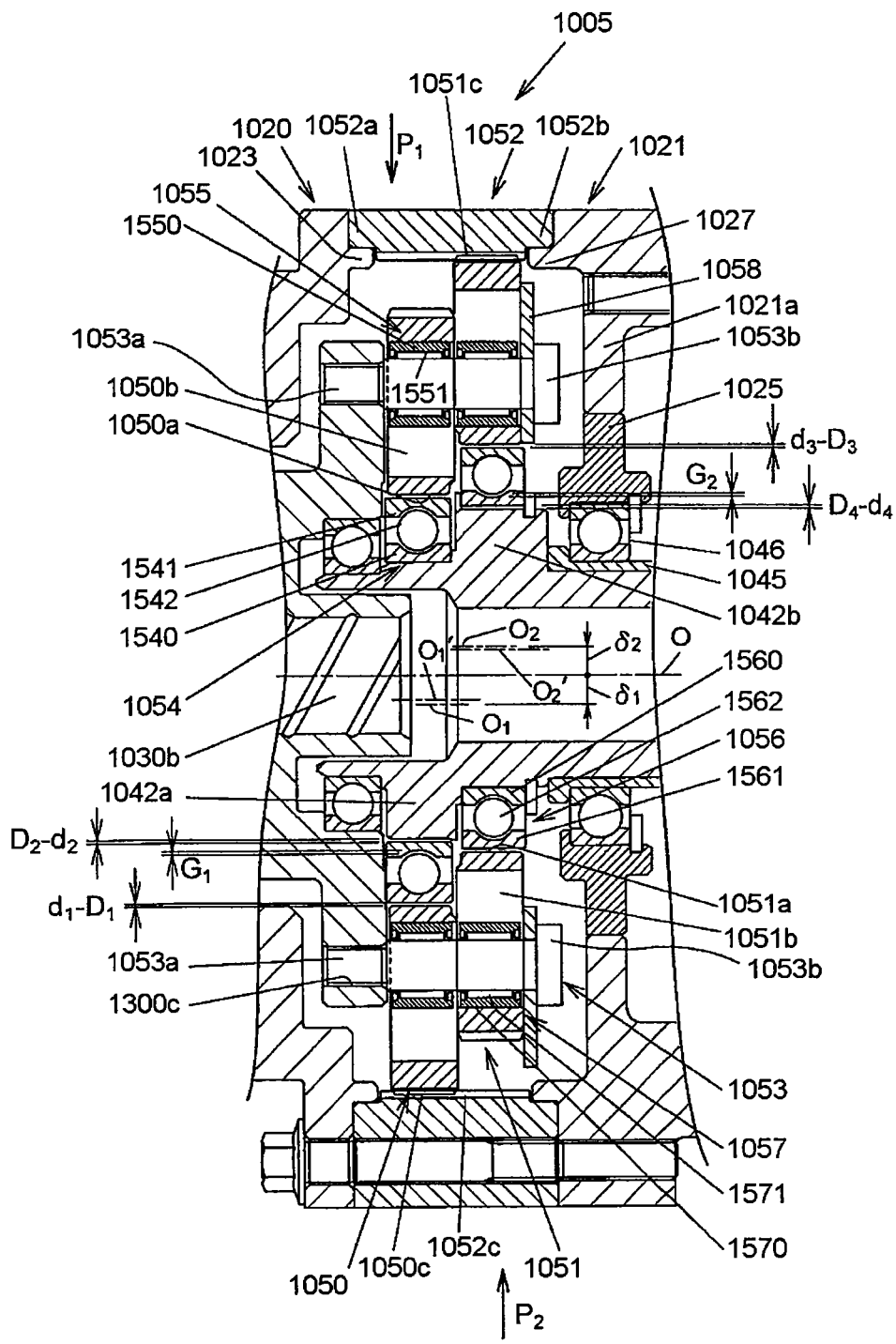
FIG. 17 is a schematic sectional view for illustrating main portions of the reduction-transmission mechanism in the motor torque transmission device according to the fifth embodiment of the invention.
Figure 18:
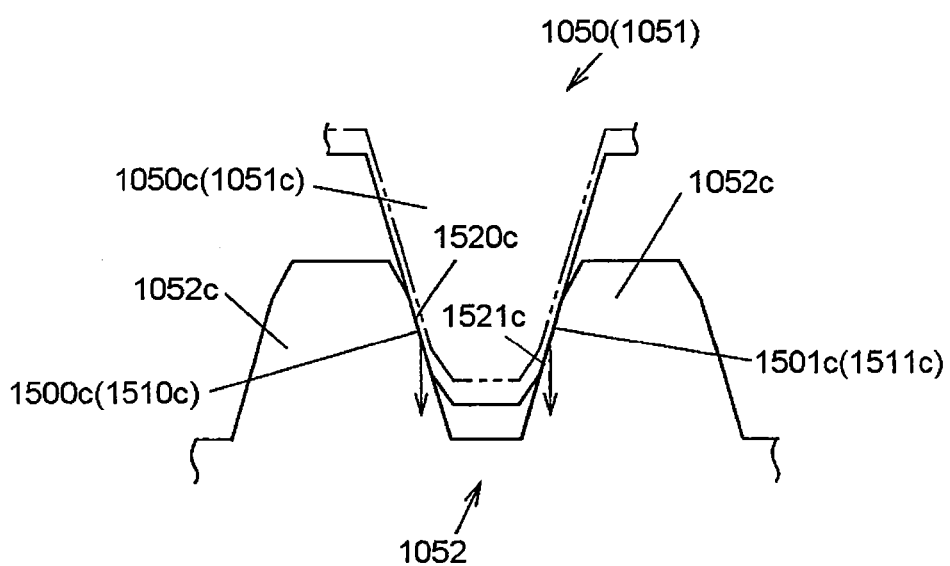
FIG. 18 is a sectional view that shows a state where one of input members is in contact with a rotation force applying member of the reduction-transmission mechanism in the motor torque transmission device according to the fifth embodiment of the invention.
Figure 19:
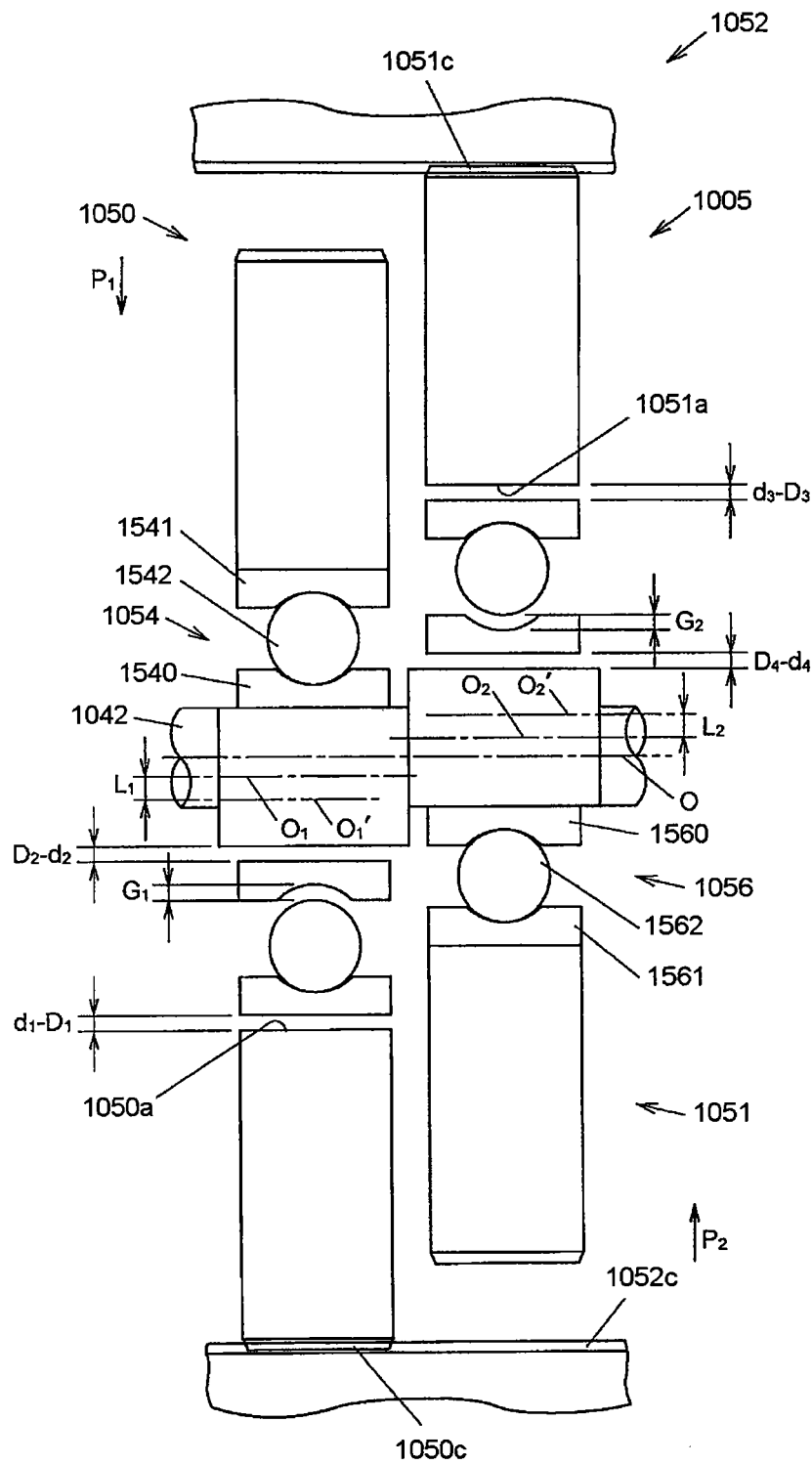
FIG. 19 is a simplified sectional view that shows a state where the input members of the reduction-transmission mechanism are supported in the motor torque transmission device according to the fifth embodiment of the invention.

FIG. 16 shows the reduction-transmission mechanism. FIG. 17 shows a clearance between each input member and a corresponding first bearing. FIG. 18 shows a state where the input member is in contact with the rotation force applying member. FIG. 19 shows a state where the input members are supported. As shown in FIG. 16 and FIG. 17, the reduction-transmission mechanism 1005 has the input members 1050, 1051, the rotation force applying member 1052 and output members 1053. The reduction-transmission mechanism 1005 is interposed between the rear differential 1003 and the electric motor 1004 (both are shown in FIG. 15). As described above, the reduction-transmission mechanism 1005 reduces the speed of rotation of the electric motor 1004 and then transmits driving force to the rear differential 1003.

As shown in FIG. 17, the input member 1050 is formed of an external gear that has a center hole 1050a of which the central axis coincides with an axis (third axis) $O_{1'}$. The input member 1050 is arranged so as to be closer to the rear differential 1003 than the input member 1051. In addition, the input member 1050 is rotatably supported by the motor shaft 1042 via a ball bearing 1054. The ball bearing 1054 may function as a first bearing, and is interposed between the inner periphery of the input member 1050, which defines the center hole 1050a, and the eccentric portion 1042a. The input member 1050 is configured to make circular motion (revolving motion about the rotation axis O) in the directions of the arrows $m_1$, $m_2$ (shown in FIG. 16) with the eccentric amount $\delta$, upon reception of motor torque from the electric motor 1004. The ball bearing 1054 includes two races, that is, an inner ring 1540 and an outer ring 1541, and rolling elements 1542. The inner ring 1540 is arranged radially inward of the outer ring 1541. The rolling elements 1542 roll between the inner ring 1540 and the outer ring 1541. The inner ring 1540 is fitted to the eccentric portion 1042a with a clearance (gap) in the radial direction of the motor shaft 1042. The outer ring 1541 is fitted to the input member 1050, which defines the center hole 1050a, with a clearance (gap) in the radial direction of the motor shaft 1042. That is, the inner ring 1540 is fitted to the outer periphery of the eccentric portion 1042a by clearance fit, and the outer ring 1541 is fitted to the inner periphery of the input member 1050, which defines the center hole 1050a, by clearance fit. Note that FIG. 17 shows a state where a centrifugal force $P_1$ acts on the input member 1050, the inner ring 1540, the outer ring 1541 and the rolling elements 1542.

The input member 1050 has a plurality of (six in the present embodiment) pin insertion holes (through-holes) 1050b that are arranged at equal intervals around the axis $O_{1'}$. The hole diameter of each pin insertion hole 1050b is set to a size that is larger than a size obtained by adding the outside diameter of a needle roller bearing 1055, which may function as a second bearing, to the outside diameter of each output member 1053. The outside diameter of each needle roller bearing 1055 is set to a value that is smaller than the outside diameter of the ball bearing 1054. External teeth 1050c having an involute tooth profile are formed on the outer periphery of the input member 1050.

As shown in FIG. 18, among both tooth flanks 1500c, 1501c (both torque transfer faces of each external tooth 1050c in the circumferential direction) of each external tooth 1050c, the torque transfer face 1500c at one side in the circumferential direction functions as a revolving force applying face and a rotation force receiving face with respect to a torque transfer face 1520c of one of adjacent two internal teeth 1052c of the rotation force applying member 1052, and the torque transfer face 1501c at the other side in the circumferential direction functions as a revolving force applying face and a rotation force receiving face with respect to a torque transfer face 1521c of the other one of the adjacent two internal teeth 1052c of the rotation force applying member 1052. The number $Z_1$ of the external teeth 1050c is set to 195 ($Z_1$=195), for example.

As shown in FIG. 18 and FIG. 19, in a state where the external tooth 1050c is fitted between the adjacent two internal teeth 1052c among the plurality of internal teeth 1052c of the rotation force applying member 1052 on the line perpendicular to the rotation axis O and the axis $O_1$, the torque transfer face 1500c of the external tooth 1050c at one side in the circumferential direction contacts the torque transfer face 1520c of one of the adjacent two internal teeth 1052c (one of the adjacent two internal teeth among the internal teeth of the rotation force applying member 1052) and the torque transfer face 1501c of the external tooth 1050c at the other side in the circumferential direction contacts the torque transfer face 1521c of the other one of the adjacent two internal teeth 1052c (the other one of the adjacent two internal teeth among the internal teeth of the rotation force applying member 1052), the outer ring 1541 is fitted to the inner periphery of the input member 1050, which defines the center hole 1050a, with a clearance in the radial direction of the motor shaft 1042, and the inner ring 1540 is fitted to the eccentric portion 1042a with a clearance in the radial direction of the motor shaft 1042. Therefore, the size $L_1$ between the axis $O_1$ and the axis $O_{1'}$ is set to a size that is smaller than or equal to half of the size $\{(d_1-D_1)+(D_2-d_2)+G_1\}$ obtained by adding a diameter difference $d_1-D_1$ between the outside diameter $D_1$ of the ball bearing 1054 and the inside diameter $d_1$ of the input member 1050, which defines the center hole 1050a, a diameter difference $D_2-d_2$ between the inside diameter $D_2$ of the ball bearing 1054 and the outside diameter $d_2$ of the eccentric portion 1042a, and the operating clearance $G_1$ of the radial internal clearance of the ball bearing 1054, that is, $\{(d_1-D_1)+(D_2-d_2)+G_1\}/2 \geq L_1$.

That is, the size $L_1$ is set to such a size that the torque transfer face 1500c of the external tooth 1050c at one side in the circumferential direction contacts the torque transfer face 1520c of the one of the adjacent two internal teeth 1052c (one of the adjacent two internal teeth of the rotation force applying member 1052) and the torque transfer face 1501c of the external tooth 1050c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1050 moves from its initial state over a distance corresponding to the size that is smaller than or equal to half of the size obtained by adding the diameter difference ($d_1-D_1$) between the outside diameter $D_1$ of the ball bearing 1054 and the inside diameter $d_1$ of the input member 1050, which defines the center hole 1050a, the diameter difference ($D_2-d_2$) between the inside diameter $D_2$ of the ball bearing 1054 and the outside diameter $d_2$ of the eccentric portion 1042a, and the operating clearance $G_1$ of the radial internal clearance of the ball bearing 1054.

Therefore, when the input member 1050 moves in the direction in which the centrifugal force $P_1$ acts, upon reception of a load due to the centrifugal force $P_1$ that is generated on the basis of the circular motion of the input member 1050, the torque transfer face 1500c of the external tooth 1050c at one side in the circumferential direction contacts the torque transfer face 1520c of the one of the adjacent two internal teeth 1052c (one of adjacent two internal teeth of the rotation force applying member 1052), and the torque transfer face 1501c of the external tooth 1050c at the other side in the circumferential direction contacts the torque transfer face 1521c of the other one of the adjacent two internal teeth 1052c (the other one of the adjacent two internal teeth of the rotation force applying member 1052). At the contact positions, the rotation force applying member 1052 receives a radial load from the input member 1050. Thus, the torque transfer faces 1520c, 1521c of the adjacent two internal teeth 1052c of the rotation force applying member 1052 intensively receive a load due to the centrifugal force $P_1$ from the input member 1050. Therefore, application of the load due to the centrifugal force $P_1$ to the ball bearing 1054 (to the points of contact between the outer ring 1541 and the rolling elements 1542 and the points of contact between the rolling elements 1542 and the inner ring 1540) is suppressed.

As shown in FIG. 17, the input member 1051 is formed of an external gear that has a center hole 1051a of which the central axis coincides with the axis (third axis) $O_2$. The input member 1051 is arranged so as to be closer to the electric motor 1004 than the input member 1050. In addition, the input member 1051 is rotatably supported by the motor shaft 1042 via a ball bearing 1056. The ball bearing 1056 may function as a first bearing, and arranged between the inner periphery of the input member 1051, which defines the center hole 1051a, and the eccentric portion 1042b. The input member 1051 is configured to make circular motion (revolving motion about the rotation axis O) in the directions of the arrows $m_1$, $m_2$ (shown in FIG. 16) with the eccentric amount δ, upon reception of motor torque from the electric motor 1004. The ball bearing 1056 includes two races (an inner ring 1560 and an outer ring 1561) and rolling elements 1562. The inner ring 1560 is arranged radially inward of the outer ring 1561. The rolling elements 1562 roll between the inner ring 1560 and the outer ring 1561. The inner ring 1560 is fitted to the eccentric portion 1042b with a clearance (gap) in the radial direction of the motor shaft 1042. The outer ring 1561 is fitted to the inner periphery of the input member 1051, which defines the center hole 1051a, with a clearance (gap) in the radial direction of the motor shaft 1042. That is, the inner ring 1560 is fitted to the outer periphery of the eccentric portion 1042b by clearance fit, and the outer ring 1561 is fitted to the inner periphery of the input member 1051, which defines the center hole 1051a, by clearance fit. Note that FIG. 17 shows a state where a centrifugal force $P_2$ acts on the input member 1051, the inner ring 1560, the outer ring 1561 and the rolling elements 1562.

The input member 1051 has a plurality of (six in the present embodiment) pin insertion holes (through-holes) 1051b that are arranged at equal intervals around the axis $O_2$. The hole diameter of each pin insertion hole 1051b is set to a size that is larger than a size obtained by adding the outside diameter of a needle roller bearing 1057, which may function as a second bearing, to the outside diameter of each output member 1053. The outside diameter of each needle roller bearing 1057 is set to a size that is smaller than the outside diameter of the ball bearing 1056. External teeth 1051c having an involute tooth profile are formed on the outer periphery of the input member 1051.

As shown in FIG. 18, among both tooth flanks 1510c, 1511c (both torque transfer faces of each external tooth 1051c in the circumferential direction) of each external tooth 1051c, the torque transfer face 1510c of the external tooth 1051 at one side in the circumferential direction functions as a revolving force applying face and a rotation force receiving face with respect to a torque transfer face 1520c of one of adjacent two internal teeth 1052c of the rotation force applying member 1052, and the torque transfer face 1511c of the external tooth 1051 at the other side in the circumferential direction functions as a revolving force applying face and a rotation force receiving face with respect to a torque transfer face 1521c of the other one of the adjacent two internal teeth 1052c of the rotation force applying member 1052. The number $Z_2$ of the external teeth 1051c is set to 195 ($Z_2$=195), for example.

As shown in FIG. 18 and FIG. 19, in a state where the external tooth 1051c is fitted between the adjacent two internal teeth 1052c among the plurality of internal teeth 1052c of the rotation force applying member 1052 on the line perpendicular to the rotation axis O and the axis $O_2$, the torque transfer face 1510c of the external tooth 1051c at one side in the circumferential direction contacts the torque transfer face 1520c of one of the adjacent two internal teeth 1052c (one of the adjacent two internal teeth among the internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth among the internal teeth of the rotation force applying member 1052), the outer ring 1561 is fitted to the inner periphery of the input member 1051, which defines the center hole 1051a, with a clearance in the radial direction of the motor shaft 1042, and the inner ring 1560 is fitted to the eccentric portion 1042b with a clearance in the radial direction of the motor shaft 1042. Therefore, the size $L_2$ between the axis $O_2$ and the axis $O_2$, is set to a size that is smaller than or equal to half of the size $\{(d_3-D_3)+(D_4-d_4)+G_2\}$ obtained by adding a diameter difference $d_3-D_3$ between the outside diameter $D_3$ of the ball bearing 1056 and the inside diameter $d_3$ of the input member 1051, which defines the center hole 1051a, a diameter difference $D_4-d_4$ between the inside diameter $D_4$ of the ball bearing 1056 and the outside diameter $d_4$ of the eccentric portion 1042a, and the operating clearance $G_2$ of the radial internal clearance of the ball bearing 1056, that is, $\{(d_3-D_3)+(D_4-d_4)+G_2\}/2 \geq L_2$.

That is, the size $L_2$ is set to such a size that the torque transfer face 1510c of the external tooth 1051c at one side in the circumferential direction contacts the torque transfer face 1520c of the one of the adjacent two internal teeth 1052c (one of the adjacent two internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1051 moves from its initial state over a distance corresponding to the size that is smaller than or equal to half of the size obtained by adding the diameter difference $(d_3-D_3)$ between the outside diameter $D_3$ of the ball bearing 1056 and the inside diameter $d_3$ of the input member 1051, which defines the center hole 1051a, the diameter difference $(D_4-d_4)$ between the inside diameter $D_4$ of the ball bearing 1056 and the outside diameter $d_4$ of the eccentric portion 1042b, and the operating clearance $G_2$ of the radial internal clearance of the ball bearing 1056.

Therefore, when the input member 1051 moves in the direction in which the centrifugal force $P_2$ acts, upon reception of a load due to the centrifugal force $P_2$ that is generated on the basis of the circular motion of the input member 1051, the torque transfer face 1510c of the external tooth 1051c at one side in the circumferential direction contacts the torque transfer face 1520c of the one of the adjacent two internal teeth 1052c (one of adjacent two internal teeth of the rotation force applying member 1052), and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052). At the contact positions, the rotation force applying member 1052 receives a radial load from the input member 1050. Thus, the torque transfer faces 1520c, 1521c of the adjacent two internal teeth 1052c of the rotation force applying member 1052 intensively receive a load due to the centrifugal force $P_2$ from the input member 1051. Therefore, application of the load due to the centrifugal force $P_2$ to the ball bearing 1056 (to the points of contact between the outer ring 1561 and the rolling elements 1562 and the points of contact between the rolling elements 1562 and the inner ring 1560) is suppressed.

As shown in FIG. 17, the rotation force applying member 1052 is formed of an internal gear of which the central axis coincides with a fourth axis (in the present embodiment, the fourth axis coincides with the rotation axis O). The rotation force applying member 1052 is interposed between the first housing element 1020 and the second housing element 1021. The entirety of the rotation force applying member 1052 is formed of an open-end cylindrical member that constitutes part of the housing 1002 and that is open toward both sides in the direction of the rotation axis O. The rotation force applying member 1052 is in mesh with the input members 1050, 1051. The rotation force applying member 1052 is configured to apply rotation force in the directions of the arrows $n_1$, $n_2$ to the input member 1050 that makes revolving motion upon reception of motor torque from the electric motor 1004, and to apply rotation force in the directions of the arrows $l_1$, $l_2$ to the input member 1051 that makes revolving motion upon reception of motor torque from the electric motor 1004.

The inner periphery of the rotation force applying member 1052 has a first fitting portion 1052a and a second fitting portion 1052b that are located at a predetermined distance in the direction of the rotation axis O. The first fitting portion 1052a is fitted to the outer periphery of the protrusion 1023. The second fitting portion 1052b is fitted to the outer periphery of the protrusion 1027. In addition, the inner periphery of the rotation force applying member 1052 has internal teeth 1052c having an involute tooth profile. The internal teeth 1052c are located between the first fitting portion 1052a and the second fitting portion 1052b, and are in mesh with the external teeth 1050c of the input member 1050 and the external teeth 1051c of the input member 1051.

As shown in FIG. 18, among both tooth flanks 1520c, 1521c (both torque transfer faces of each internal tooth 1052c in the circumferential direction) of each internal tooth 1052c, the torque transfer face 1520c of the internal tooth 1052c at one side in the circumferential direction functions as a rotation force applying face and a revolving force receiving face with respect to the torque transfer face 1500c of one of adjacent two external teeth 1050c (one of adjacent two external teeth 1050c of the input member 1050) and the torque transfer face 1510c of one of the adjacent two external teeth 1051c (one of adjacent two external teeth 1051c of the input member 1051), and the torque transfer face 1521c of the internal tooth 1052c at the other side in the circumferential direction functions as a rotation force applying face and a revolving force receiving face with respect to the torque transfer face 1501c of the other one of the adjacent two external teeth 1050c (the other one of the adjacent two external teeth 1050c of the input member 1050) and the torque transfer face 1511c of the other one of the adjacent two external teeth 1051c (the other one of the adjacent two external teeth 1051c of the input member 1051). The number $Z_3$ of the external teeth 1052c is set to 208 ($Z_3$=208), for example. Thus, the reduction gear ratio $\alpha$ of the reduction-transmission mechanism 1005 is calculated according to an equation, $\alpha=Z_2/(Z_3-Z_2)$.

As shown in FIG. 17, the output members 1053 are multiple (six, in the present embodiment) bolts each having a threaded portion 1053a at one end and a head 1053b at the other end. The threaded portions 1053a of the output members 1053 are passed through the pin insertion holes 1050b of the input member 1050 and the pin insertion holes 1051b of the input member 1051 and then fitted in the pin fitting holes 1300c of the differential case 1030. In addition, the output members 1053 are arranged so as to pass through an annular spacer 1058 interposed between each head 1053b and the input member 1051. The output members 1053 are configured to receive rotation force, applied by the rotation force applying member 1052, from the input members 1050, 1051, and then output the rotation force to the differential case 1030 as the torque of the differential case 1030.

The needle roller bearing 1055 is fitted to the outer periphery of each output member 1053 at a portion between the threaded portion 1053a and the head 1053b. The needle roller bearing 1055 is used to reduce contact resistance between each output member 1053 and the inner periphery of the input member 1050, which defines the corresponding pin insertion hole 1050b. In addition, the needle roller bearing 1057 is fitted to the outer periphery of each output member 1053 at a portion between the threaded portion 1053a and the head 1053b. The needle roller bearing 1057 is used to reduce contact resistance between each output member 1053 and the inner periphery of the input member 1051, which defines the corresponding pin insertion hole 1051b.

The needle roller bearings 1055 each a race (outer ring) 1550 and needle rollers 1551. The race 1550 is able to contact the inner periphery of the input member 1050, which defines a corresponding one of the pin insertion holes 1050b. The needle rollers 1551 roll between the race 1550 and the outer periphery of a corresponding one of the output members 1053. The needle roller bearings 1057 each have a race (outer ring) 1570 and needle rollers 1571. The race 1570 is able to contact the inner periphery of the input member 1051, which defines a corresponding one of the pin insertion holes 1051b. The needle rollers 1571 roll between the race 1570 and the outer periphery of a corresponding one of the output members 1053.

Next, the operation of the motor torque transmission device according to the present embodiment will be described with reference to FIG. 14 to FIG. 19.

In FIG. 15, when electric power is supplied to the electric motor 1004 of the motor torque transmission device 1001 to drive the electric motor 1004, the motor torque is applied to the reduction-transmission mechanism 1005 via the motor shaft 1042. Thus, the reduction-transmission mechanism 1005 is actuated.

Therefore, in the reduction-transmission mechanism 1005, the input members 1050, 1051 each make circular motion with the eccentric amount δ, for example, in the direction of the arrow $m_1$ shown in FIG. 16.

Accordingly, the input member 1050 rotates about the axis $O_1$ (the direction of the arrow $n_1$ shown in FIG. 16) while the external teeth 1050c are meshed with the internal teeth 1052c of the rotation force applying member 1052, and the input member 1051 rotates about the axis $O_2$ (the arrow $l_1$ direction shown in FIG. 16) while the external teeth 1051c are meshed with the internal teeth 1052c of the rotation force applying member 1052. In this case, due to the rotation of the input members 1050, 1051, the inner peripheries of the input member 1050, which define the pin insertion holes 1050b, contact the races 1550 of the needle roller bearings 1055, and the inner peripheries of the input member 1051, which define the pin insertion holes 1051b, contact the races 1570 of the needle roller bearings 1057.

Therefore, the revolving motions of the input members 1050, 1051 are not transmitted to the output members 1053, and only the rotating motions of the input members 1050, 1051 are transmitted to the output members 1053. Rotation force resulting from the rotating motions of the input members 1050, 1051 is output from the output members 1053 to the differential case 1030 as the torque of the differential case 1030.

In this way, the rear differential 1003 is actuated, and driving force based on the motor torque of the electric motor 1004 is distributed to the rear axle shafts 1106 shown in FIG. 14, and transmitted to the right and left rear wheels 1105.

As the motor torque transmission device 1001 operates, the centrifugal force $P_1$ acts on the input member 1050 on the basis of the circular motion of the input member 1050, and the centrifugal force $P_2$ acts on the input member 1051 on the basis of the circular motion of the input member 1051.

Accordingly, the input member 1050 moves in a direction in which the centrifugal force $P_1$ acts (for example, downward in FIG. 19), and the input member 1051 moves in a direction in which the centrifugal force $P_2$ acts (for example, upward in FIG. 19).

In this case, as shown in FIG. 17 to FIG. 19, when the input member 1050 moves in the direction in which the centrifugal force $P_1$ acts, upon reception of a load due to the centrifugal force $P_1$ that is generated on the basis of the circular motion of the input member 1050, the torque transfer face 1500c of the external tooth 1050c at one side in the circumferential direction contacts the torque transfer face 1520c of one of the adjacent two internal teeth 1052c (one of the adjacent two internal teeth of the rotation force applying member 1052) and the torque transfer face 1501c of the external tooth 1050c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1050 moves from its initial state over a distance corresponding to the size that is smaller than or equal to half of the size obtained by adding the diameter difference ($d_1$–$D_1$) between the outside diameter $D_1$ of the ball bearing 1054 and the inside diameter $d_1$ of the input member 1050, which defines the center hole 1050a, the diameter difference ($D_2$–$d_2$) between the inside diameter $D_2$ of the ball bearing 1054 and the outside diameter $d_2$ of the eccentric portion 1042a and the operating clearance $G_1$ of the radial internal clearance of the ball bearing 1054.

Therefore, the torque transfer faces 1520c, 1521c of the internal teeth 1052c intensively receive a load due to the centrifugal force $P_1$ from the input member 1050. Therefore, application of the load due to the centrifugal force $P_1$ to the ball bearing 1054 is suppressed.

Similarly, when the input member 1051 moves in the direction in which the centrifugal force $P_2$ acts, upon reception of a load due to the centrifugal force $P_2$ that is generated on the basis of the circular motion of the input member 1051, the torque transfer face 1510c of the external tooth 1051c at one side in the circumferential direction contacts the torque transfer face 1520c of one of the adjacent two internal teeth 1052c (one of the adjacent two internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1050 moves from its initial state over a distance corresponding to the size that is smaller than or equal to half of the size obtained by adding the diameter difference ($d_3$–$D_3$) between the outside diameter $D_3$ of the ball bearing 1056 and the inside diameter $d_3$ of the input member 1051, which defines the center hole 1051a, the diameter difference ($D_4$–$d_4$) between the inside diameter $D_4$ of the ball bearing 1056 and the outside diameter $d_4$ of the eccentric portion 1042b and the operating clearance $G_2$ of the radial internal clearance of the ball bearing 1056.

Therefore, the torque transfer faces 152, 1521c of the internal teeth 1052c intensively receive a load due to the centrifugal force $P_2$ from the input member 1051. Therefore, application of the load due to the centrifugal force $P_2$ to the ball bearing 1056 is suppressed.

Therefore, according to the present embodiment, it is no longer necessary to employ bearings having high durability as the ball bearings 1054, 1056.

In the above-described embodiment, the description is made on the case where the motor torque transmission device 1001 is actuated by causing the input members 1050, 1051 to make circular motion in the direction of the arrow $m_1$. However, the motor torque transmission device 1001 may be actuated in the same manner as that in the above-described embodiment even when the input members 1050, 1051 are caused to make circular motion in the direction of the arrow $m_2$ as shown in FIG. 16. In this case, the rotating motion of the input member 1050 is made in the direction of the arrow $n_2$, and the rotating motion of the input member 1051 is made in the direction of the arrow $l_2$.

According to the above-described fifth embodiment, the following advantageous effects are obtained.

(1) Application of the load due to the centrifugal force $P_1$ from the input member 1050 to the ball bearing 1054 and application of the load due to the centrifugal force $P_2$ from the input member 1051 to the ball bearing 1056 are suppressed. Therefore, it is no longer necessary to employ bearings having high durability as the ball bearings 1054, 1056. As a result, it is possible to reduce cost.

(2) Application of the load due to the centrifugal force $P_1$ to the ball bearing 1054 and application of the load due to the centrifugal force $P_2$ to the ball bearing 1056 are suppressed. Therefore, it is possible to extend the service life of each of the ball bearings 1054, 1056.

Figure 20:
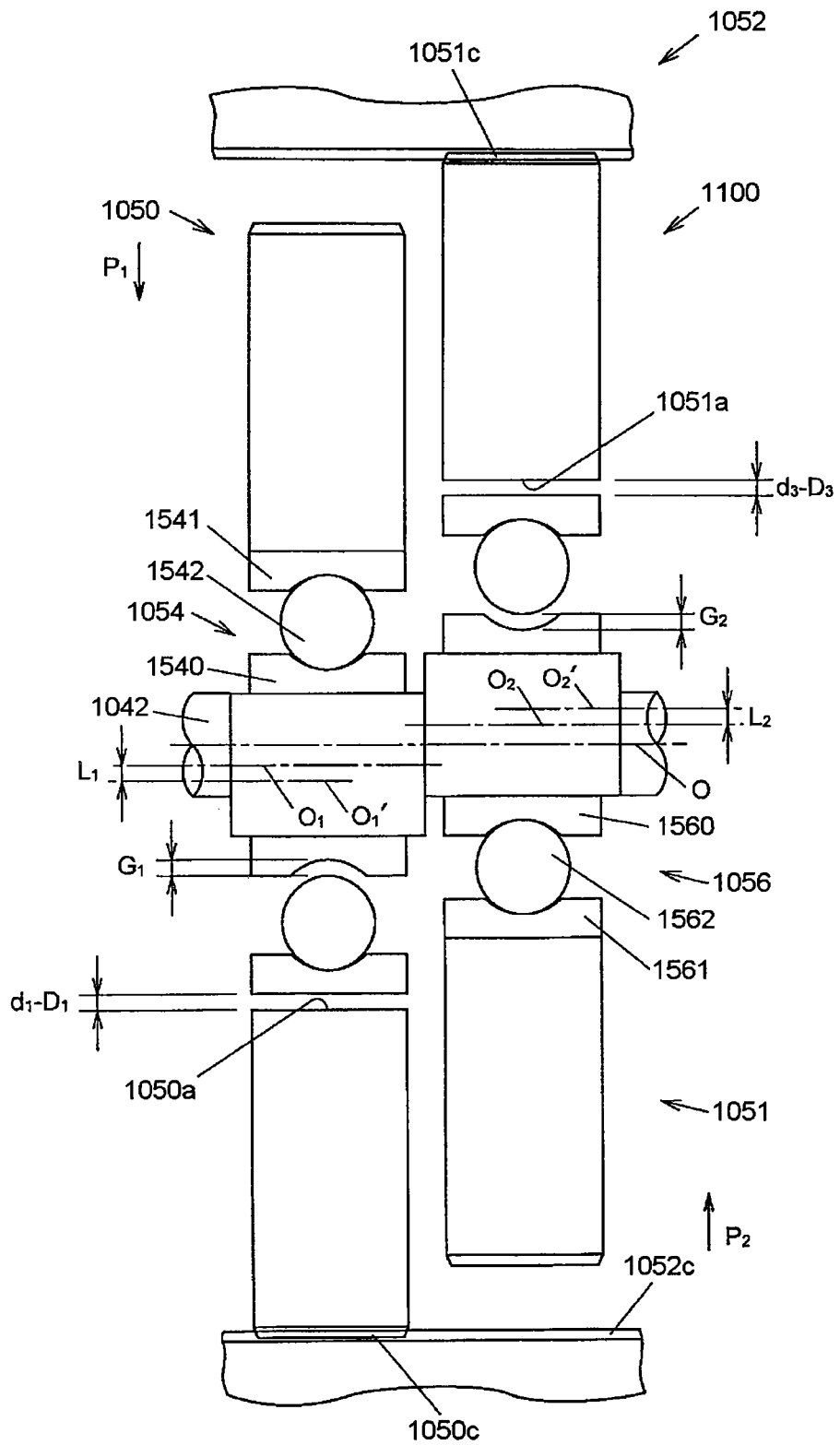
FIG. 20 is a simplified sectional view that shows a state where input members of a reduction-transmission mechanism are supported in a motor torque transmission device according to a sixth embodiment of the invention.

Next, a reduction-transmission mechanism in a motor torque transmission device according to a sixth embodiment of the invention will be described with reference to FIG. 18 and FIG. 20. FIG. 20 shows a state where input members are supported. In FIG. 20, the components that are identical or equivalent to those in FIG. 19 are denoted by the same reference numerals as those in FIG. 19, and the detailed description is omitted.

As shown in FIG. 20, a reduction-transmission mechanism 1100 (partially shown) according to the sixth embodiment of the invention is characterized in that the inner rings 1540, 1560 of the ball bearings 1054, 1056 are fitted to the outer peripheries of the eccentric portions 1042a, 1042b by interference fit, and the outer rings 1541, 1561 are fitted to the inner peripheries of the input members 1050, 1051, which define the center holes 1050a, 1051a, by clearance fit.

In a state where the external tooth 1050c is fitted between the adjacent two internal teeth 1052c among the plurality of internal teeth 1052c of the rotation force applying member 1052 on the line perpendicular to the rotation axis O and the axis $O_1$, the torque transfer face 1500c (shown in FIG. 18) of the external tooth 1050c at one side in the circumferential direction contacts the torque transfer face 1520c (shown in FIG. 18) of one of the adjacent two internal teeth 1052c (one of the adjacent two internal teeth among the internal teeth of the rotation force applying member 1052) and the torque transfer face 1501c of the external tooth 1050c at the other side in the circumferential direction contacts the torque transfer face 1521c of the other one of the adjacent two internal teeth 1052c (the other one of the adjacent two internal teeth among the internal teeth of the rotation force applying member 1052), the outer ring 1541 is fitted to the inner periphery of the input member 1050, which defines the center hole 1050a, with a clearance in the radial direction of the motor shaft 1042. Therefore, the size $L_1$ between the axis $O_1$ and the axis $O_{1'}$ is set to a size that is smaller than or equal to half of the size $\{(d_1-D_1)+G_1\}$ obtained by adding a diameter difference $d_1-D_1$ between the outside diameter $D_1$ of the ball bearing 1054 and the inside diameter $d_1$ of the input member 1050, which defines the center hole 1050a, and the operating clearance $G_1$ of the radial internal clearance of the ball bearing 1054, that is, $\{(d_1-D_1)+G_1\}/2 \geq L_1$.

That is, the size $L_1$ is set to such a size that the torque transfer face 1500c of the external tooth 1050c at one side in the circumferential direction contacts the torque transfer face 1520c of one of the adjacent two internal teeth 1052c (one of the adjacent two internal teeth of the rotation force applying member 1052) and the torque transfer face 1501c of the external tooth 1050c at the other side in the circumferential direction contacts the torque transfer face 1521c of the other one of the adjacent two internal tooth 1052c (the other one of the adjacent two internal teeth of the rotation force applying member 1052) as indicated by the continuous line in FIG. 18 before the input member 1050 moves from its initial state over a distance corresponding to the size that is smaller than or equal to half of the size obtained by adding the diameter difference $(d_1-D_1)$ between the outside diameter $D_1$ of the ball bearing 1054 and the inside diameter $d_1$ of the input member 1050, which defines the center hole 1050a, and the operating clearance $G_1$ of the radial internal clearance of the ball bearing 1054.

Therefore, when the input member 1050 moves in the direction in which the centrifugal force $P_1$ acts, upon reception of a load due to the centrifugal force $P_1$ that is generated on the basis of the circular motion of the input member 1050, the torque transfer face 1500c of the external tooth 1050c at one side in the circumferential direction contacts the torque transfer face 1520c of one of the adjacent two internal tooth 1052c (one of the adjacent two internal teeth of the rotation force applying member 1052), and the torque transfer face 1501c of the external tooth 1050c at the other side in the circumferential direction contacts the torque transfer face 1521c of the other one of the adjacent two internal teeth 1052c (the other one of the adjacent two internal teeth of the rotation force applying member 1052). At the contact positions, the rotation force applying member 1052 receives a radial load from the input member 1050. Thus, the torque transfer faces 1520c, 1521c of the internal teeth 1052c of the rotation force applying member 1052 intensively receive a load due to the centrifugal force $P_1$ from the input member 1050. Therefore, application of the load due to the centrifugal force $P_1$ to the ball bearing 1054 (to points of contact between the outer ring 1541 and the rolling elements 1542 and points of contact between the rolling elements 1542 and the inner ring 1540) is suppressed.

In a state where the external tooth 1051c is fitted between the adjacent two internal teeth 1052c among the plurality of internal teeth 1052c of the rotation force applying member 1052 on the line perpendicular to the rotation axis O and the axis $O_2$, the torque transfer face 1510c of the external tooth 1051c at one side in the circumferential direction contacts the torque transfer face 1520c of one of the adjacent two internal teeth 1052c (one of the adjacent two internal teeth among the internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth among the internal teeth of the rotation force applying member 1052), the outer ring 1561 is fitted to the inner periphery of the input member 1051, which defines the center hole 1051a, with a clearance in the radial direction of the motor shaft 1042. Therefore, the size $L_2$ between the axis $O_2$ and the axis $O_{2'}$ is set to a size that is smaller than or equal to half of the size $\{(d_3-D_3)+G_3\}$ obtained by adding a diameter difference $d_3-D_3$ between the outside diameter $D_3$ of the ball bearing 1056 and the inside diameter $d_3$ of the input member 1051, which defines the center hole 1051a, and the operating clearance $G_2$ of the radial internal clearance of the ball bearing 1056, that is, $\{(d_3-D_3)+G_3\}/2 \geq L_2$.

That is, the size $L_2$ is set to such a size that the torque transfer face 1510c of the external tooth 1051c at one side in the circumferential direction contacts the torque transfer face 1520c of one of the adjacent two internal teeth 1052c (one of the adjacent two internal teeth of the rotation force applying member 1052) and the torque transfer face 1511c of the external tooth 1051c at the other side in the circumferential direction contacts the torque transfer face 1521c of the other one of the adjacent two internal tooth 1052c (the other one of the adjacent two internal teeth of the rotation force applying member 1052) as indicated by the continuous line in FIG. 18 before the input member 1051 moves from its initial state over a distance corresponding to the size that is smaller than or equal to half of the size obtained by adding the diameter difference $(d_3-D_3)$ between the outside diameter $D_3$ of the ball bearing 1056 and the inside diameter $d_3$ of the input member 1051, which defines the center hole 1051*a*, and the operating clearance $G_2$ of the radial internal clearance of the ball bearing 1056.

Therefore, when the input member 1051 moves in the direction in which the centrifugal force $P_2$ acts, upon reception of a load due to the centrifugal force $P_2$ that is generated on the basis of the circular motion of the input member 1051, the torque transfer face 1510*c* of the external tooth 1051*c* at one side in the circumferential direction contacts the torque transfer face 1520*c* of one of the adjacent two internal tooth 1052*c* (one of the adjacent two internal teeth of the rotation force applying member 1052), and the torque transfer face 1511*c* of the external tooth 1051*c* at the other side in the circumferential direction contacts the torque transfer face 1521*c* of the other one of the adjacent two internal teeth 1052*c* (the other one of the adjacent two internal teeth of the rotation force applying member 1052). At the contact positions, the rotation force applying member 1052 receives a radial load from the input member 1051. Thus, the torque transfer faces 1520*c*, 1521*c* of the internal teeth 1052*c* of the rotation force applying member 1052 intensively receive a load due to the centrifugal force $P_2$ from the input member 1051. Therefore, application of the load due to the centrifugal force $P_2$ to the ball bearing 1056 (to points of contact between the outer ring 1561 and the rolling elements 1562 and points of contact between the rolling elements 1562 and the inner ring 1560) is suppressed.

According to the above-described sixth embodiment, similar advantageous effects to those of the fifth embodiment are obtained.

Figure 21:
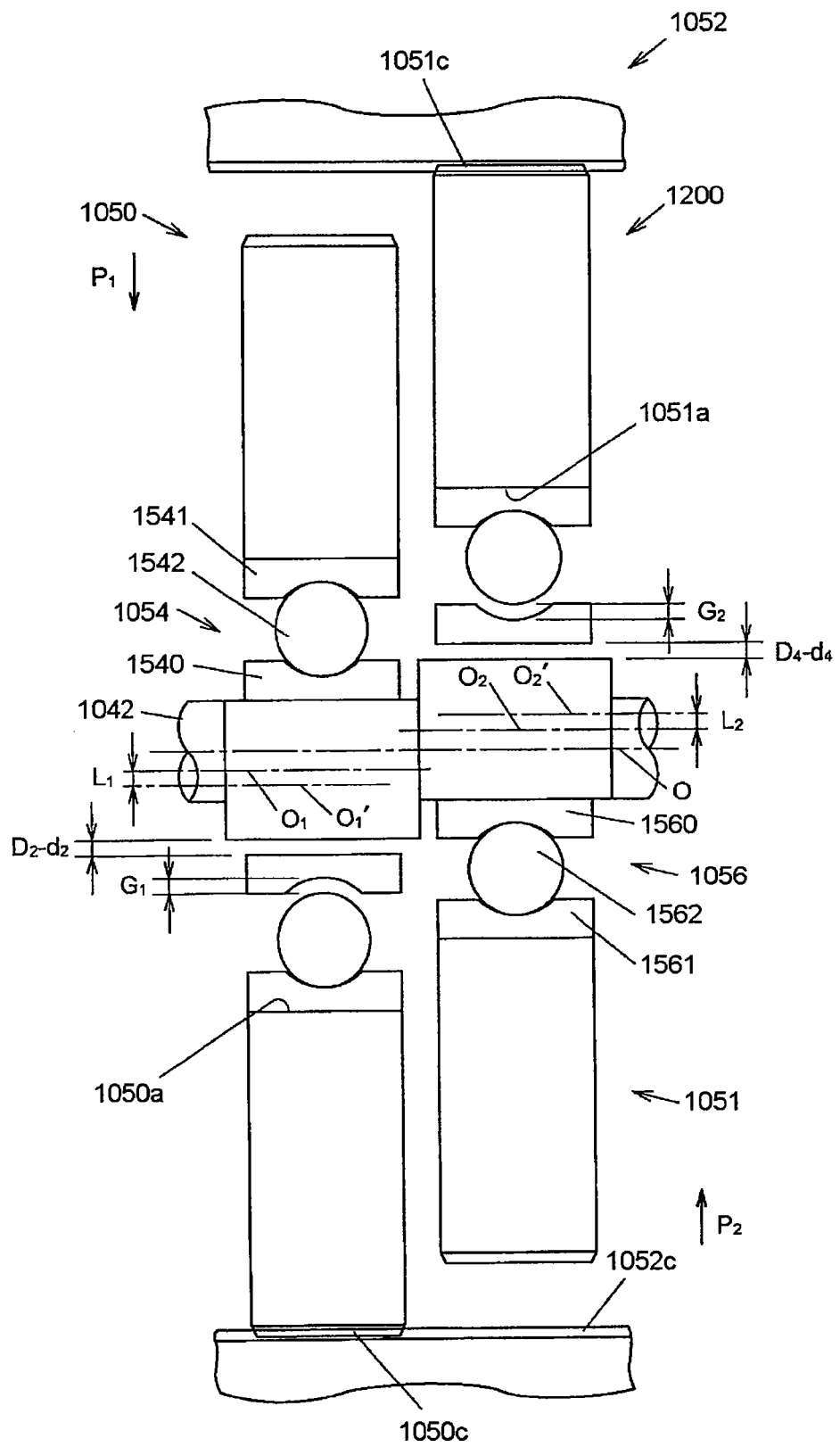
FIG. 21 is a simplified sectional view that shows a state where input members of a reduction-transmission mechanism are supported in a motor torque transmission device according to a seventh embodiment of the invention.

Next, a reduction-transmission mechanism in a motor torque transmission device according to a seventh embodiment of the invention will be described with reference to FIG. 18 and FIG. 21. FIG. 21 shows a state where input members are supported. In FIG. 21, the components that are identical or equivalent to those in FIG. 19 are denoted by the same reference numerals as those in FIG. 19, and the detailed description is omitted.

As shown in FIG. 21, a reduction-transmission mechanism 1200 (partially shown) according to the seventh embodiment of the invention is characterized in that the inner rings 1540, 1560 of the ball bearings 1054, 1056 are fitted to the outer peripheries of the eccentric portions 1042*a*, 1042*b* by clearance fit. In addition, the reduction-transmission mechanism 1200 is characterized in that the outer rings 1541, 1561 are fitted to the inner peripheries of the input members 1050, 1051, which define the center holes 1050*a*, 1051*a*, by interference fit.

In a state where the external tooth 1050*c* is fitted between the adjacent two internal teeth 1052*c* among the plurality of internal teeth 1052*c* of the rotation force applying member 1052 on the line perpendicular to the rotation axis O and the axis $O_1$, the torque transfer face 1500*c* (shown in FIG. 18) of the external tooth 1050*c* at one side in the circumferential direction contacts the torque transfer face 1520*c* (shown in FIG. 18) of one of the adjacent two internal teeth 1052*c* (one of the adjacent two internal teeth among the internal teeth of the rotation force applying member 1052) and the torque transfer face 1501*c* of the external tooth 1050*c* at the other side in the circumferential direction contacts the torque transfer face 1521*c* of the other one of the adjacent two internal teeth 1052*c* (the other one of the adjacent two internal teeth among the internal teeth of the rotation force applying member 1052), the inner ring 1540 is fitted to the eccentric portion 1042*a* with a clearance in the radial direction of the motor shaft 1042. Therefore, the size $L_1$ between the axis $O_1$ and the axis $O_{1'}$ is set to a size that is smaller than or equal to half of the size $\{(D_2-d_2)+G_1\}$ obtained by adding a diameter difference $D_2-d_2$ between the inside diameter $D_2$ of the ball bearing 1054 and the outside diameter $d_2$ of the eccentric portion 1042*a* and the operating clearance $G_1$ of the radial internal clearance of the ball bearing 1054, that is, $\{(D_2-d_2)+G_1\}/2 \geq L_1$.

That is, the size $L_1$ is set to such a size that the torque transfer face 1500*c* of the external tooth 1050*c* at one side in the circumferential direction contacts the torque transfer face 1520*c* of the one of the adjacent two internal teeth 1052*c* (one of the adjacent two internal teeth of the rotation force applying member 1052) and the torque transfer face 1501*c* of the external tooth 1050*c* at the other side in the circumferential direction contacts the torque transfer face 1521*c* of the other one of the adjacent two internal teeth 1052*c* (the other one of the adjacent two internal teeth of the rotation force applying member 1052) as indicated by the continuous line in FIG. 18 before the input member 1050 moves from its initial state over a distance corresponding to the size that is smaller than or equal to half of the size obtained by adding the diameter difference $(D_2-d_2)$ between the inside diameter $D_2$ of the ball bearing 1054 and the outside diameter $d_2$ of the eccentric portion 1042*a* and the operating clearance $G_1$ of the radial internal clearance of the ball bearing 1054.

Therefore, when the input member 1050 moves in the direction in which the centrifugal force $P_1$ acts, upon reception of a load due to the centrifugal force $P_1$ that is generated on the basis of the circular motion of the input member 1050, the torque transfer face 1500*c* of the external tooth 1050*c* at one side in the circumferential direction contacts the torque transfer face 1520*c* of one of the adjacent two internal teeth 1052*c* (one of the adjacent two internal teeth of the rotation force applying member 1052), and the torque transfer face 1501*c* of the external tooth 1050*c* at the other side in the circumferential direction contacts the torque transfer face 1521*c* of the other one of the adjacent two internal teeth 1052*c* (the other one of the adjacent two internal teeth of the rotation force applying member 1052). At the contact positions, the rotation force applying member 1052 receives a radial load from the input member 1050. Thus, the torque transfer faces 1520*c*, 1521*c* of the internal teeth 1052*c* in the rotation force applying member 1052 intensively receive a load due to the centrifugal force $P_1$ from the input member 1050. Therefore, application of the load due to the centrifugal force $P_1$ to the ball bearing 1054 (to points of contact between the outer ring 1541 and the rolling elements 1542 and points of contact between the rolling elements 1542 and the inner ring 1540) is suppressed.

In a state where the external tooth 1051*c* is fitted between the adjacent two internal teeth 1052*c* among the plurality of internal teeth 1052*c* of the rotation force applying member 1052 on the line perpendicular to the rotation axis O and the axis $O_2$, the torque transfer face 1510*c* of the external tooth 1051*c* at one side in the circumferential direction contacts the torque transfer face 1520*c* of one of the adjacent two internal teeth 1052*c* (one of the adjacent two internal teeth among the internal teeth of the rotation force applying member 1052) and the torque transfer face 1511*c* of the external tooth 1051*c* at the other side in the circumferential direction contacts the torque transfer face 1521*c* of the other one of the adjacent two internal teeth 1052*c* (the other one of the adjacent two internal teeth among the internal teeth of the rotation force applying member 1052), the inner ring 1560 is fitted to the eccentric portion 1042*b* with a clearance in the radial direction of the motor shaft 1042. Therefore, the size $L_2$ between the axis $O_2$ and the axis $O_{2'}$ is set to a size that is smaller than or equal to half of the size $\{(D_4-d_4)+G_2\}$ obtained by adding a diameter difference $D_4-d_4$ between the inside diameter $D_4$ of the ball bearing 1056 and the outside diameter $d_4$ of the eccentric portion 1042a and the operating clearance $G_2$ of the radial internal clearance of the ball bearing 1056, that is, $\{(D_4-d_4)+G_2\}/2 \geq L_2$.

That is, the size $L_2$ is set to such a size that the torque transfer face 1510c of the external tooth 1051c at one side in the circumferential direction contacts the torque transfer face 1520c of the one of the adjacent two internal teeth 1052c (one of the adjacent two internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1050 moves from its initial state over a distance corresponding to the size that is smaller than or equal to half of the size obtained by adding the diameter difference $(D_4-d_4)$ between the inside diameter $D_4$ of the ball bearing 1056 and the outside diameter $d_4$ of the eccentric portion 1042b and the operating clearance $G_2$ of the radial internal clearance of the ball bearing 1056.

Therefore, when the input member 1051 moves in the direction in which the centrifugal force $P_2$ acts, upon reception of a load due to the centrifugal force $P_2$ that is generated on the basis of the circular motion of the input member 1051, the torque transfer face 1510c of the external tooth 1051c at one side in the circumferential direction contacts the torque transfer face 1520c of one of the adjacent two internal teeth 1052c (one of the adjacent two internal teeth of the rotation force applying member 1052), and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052). At the contact positions, the rotation force applying member 1052 receives a radial load from the input member 1051. Thus, the torque transfer faces 1520c, 1521c of the adjacent two internal teeth 1052c in the rotation force applying member 1052 intensively receive a load due to the centrifugal force $P_2$ from the input member 1051. Therefore, application of the load due to the centrifugal force $P_2$ to the ball bearing 1056 (to points of contact between the outer ring 1561 and the rolling elements 1562 and points of contact between the rolling elements 1562 and the inner ring 1560) is suppressed.

According to the above-described seventh embodiment, similar advantageous effects to those of the fifth embodiment are obtained.

Figure 22:
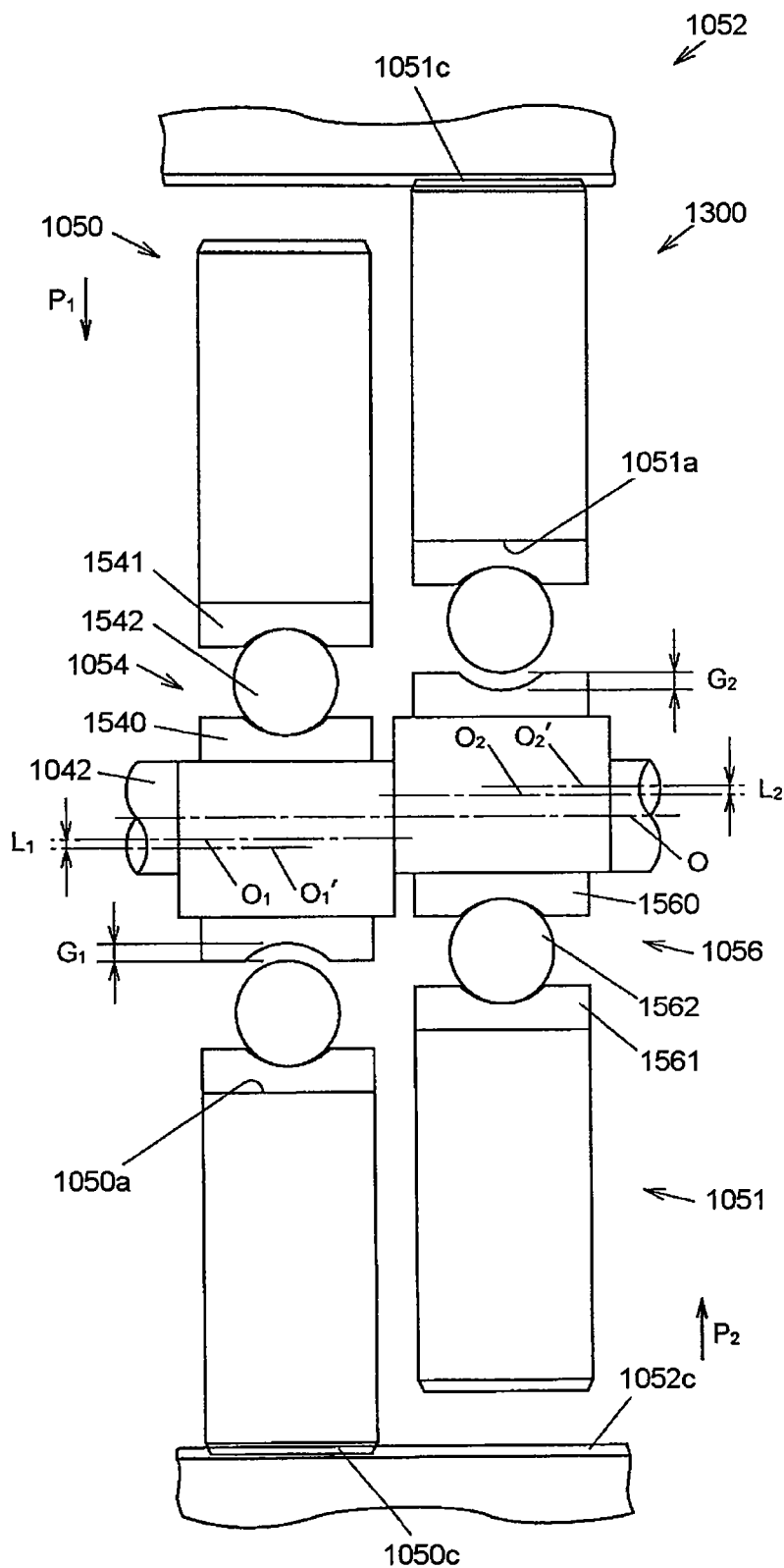
FIG. 22 is a simplified sectional view that shows a state where input members of a reduction-transmission mechanism are supported in a motor torque transmission device according to an eighth embodiment of the invention.
Figure 23:
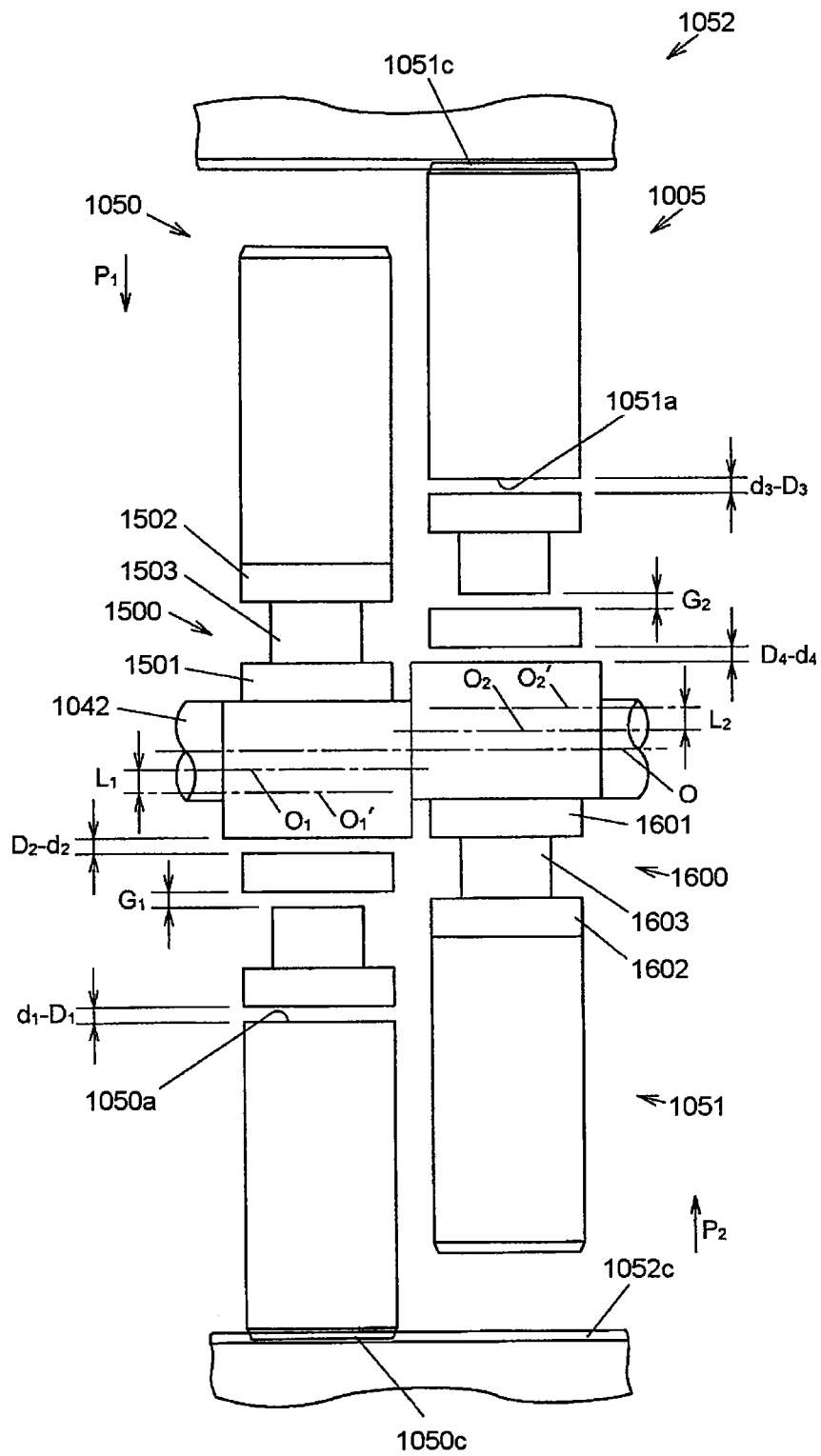
FIG. 23 is a simplified sectional view that shows the state where the input members of the reduction-transmission mechanism are supported in the motor torque transmission device in a fifth modified example according to the fifth embodiment of the invention.
Figure 24:
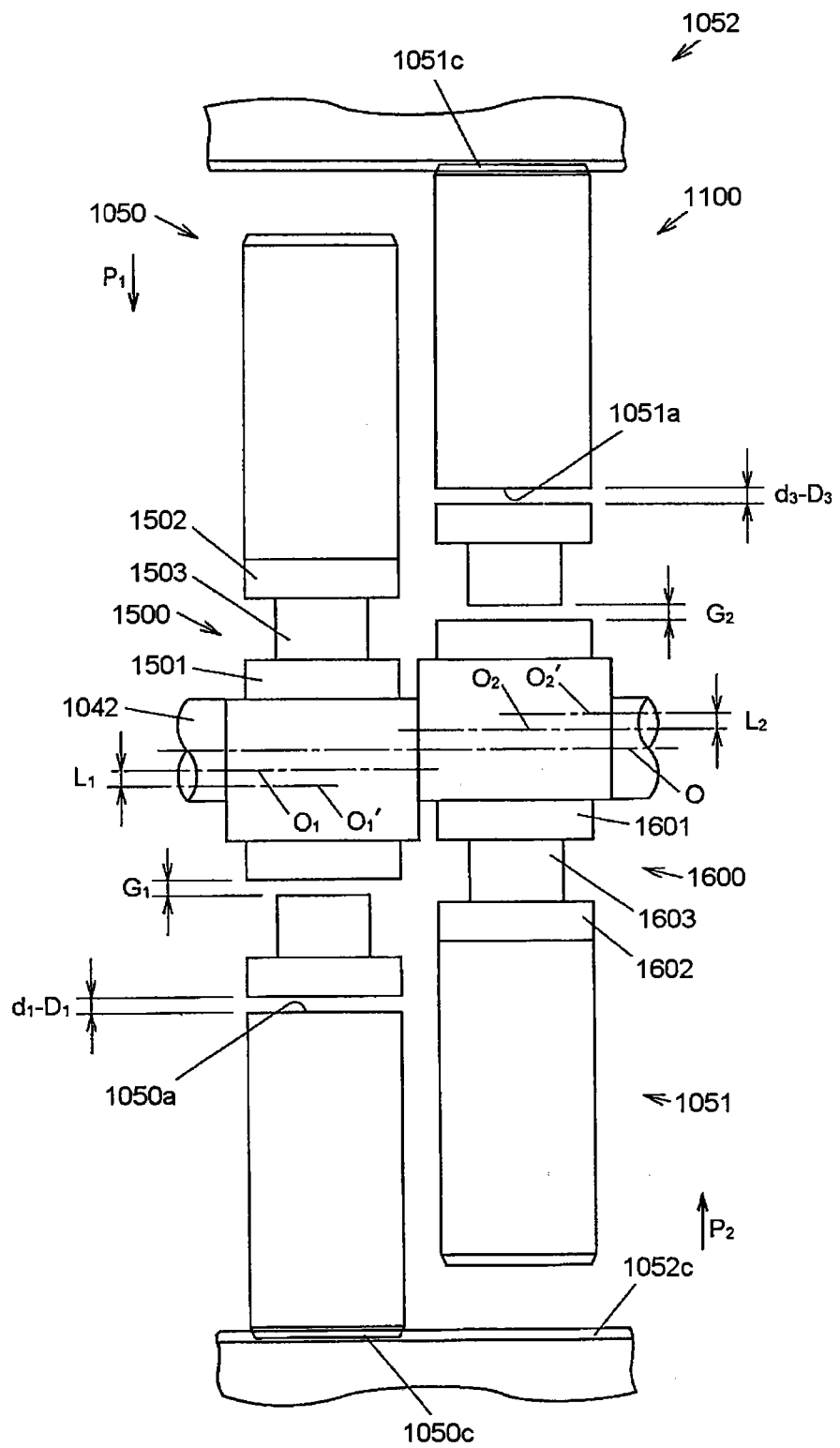
FIG. 24 is a simplified sectional view that shows the state where the input members of the reduction-transmission mechanism are supported in the motor torque transmission device in a sixth modified example according to the sixth embodiment of the invention.
Figure 25:
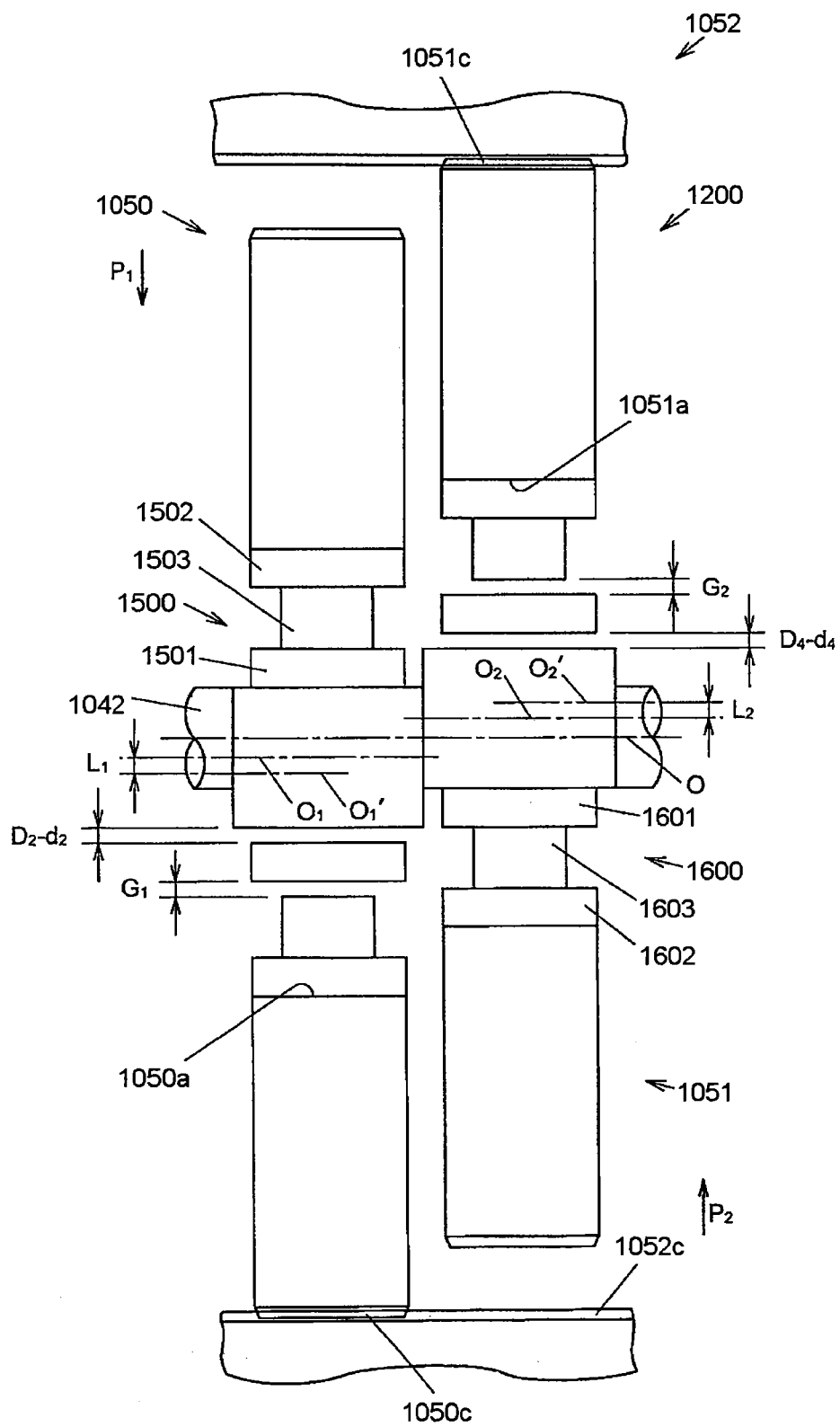
FIG. 25 is a simplified sectional view that shows the state where the input members of the reduction-transmission mechanism are supported in the motor torque transmission device in a seventh modified example according to the seventh embodiment of the invention.
Figure 26:
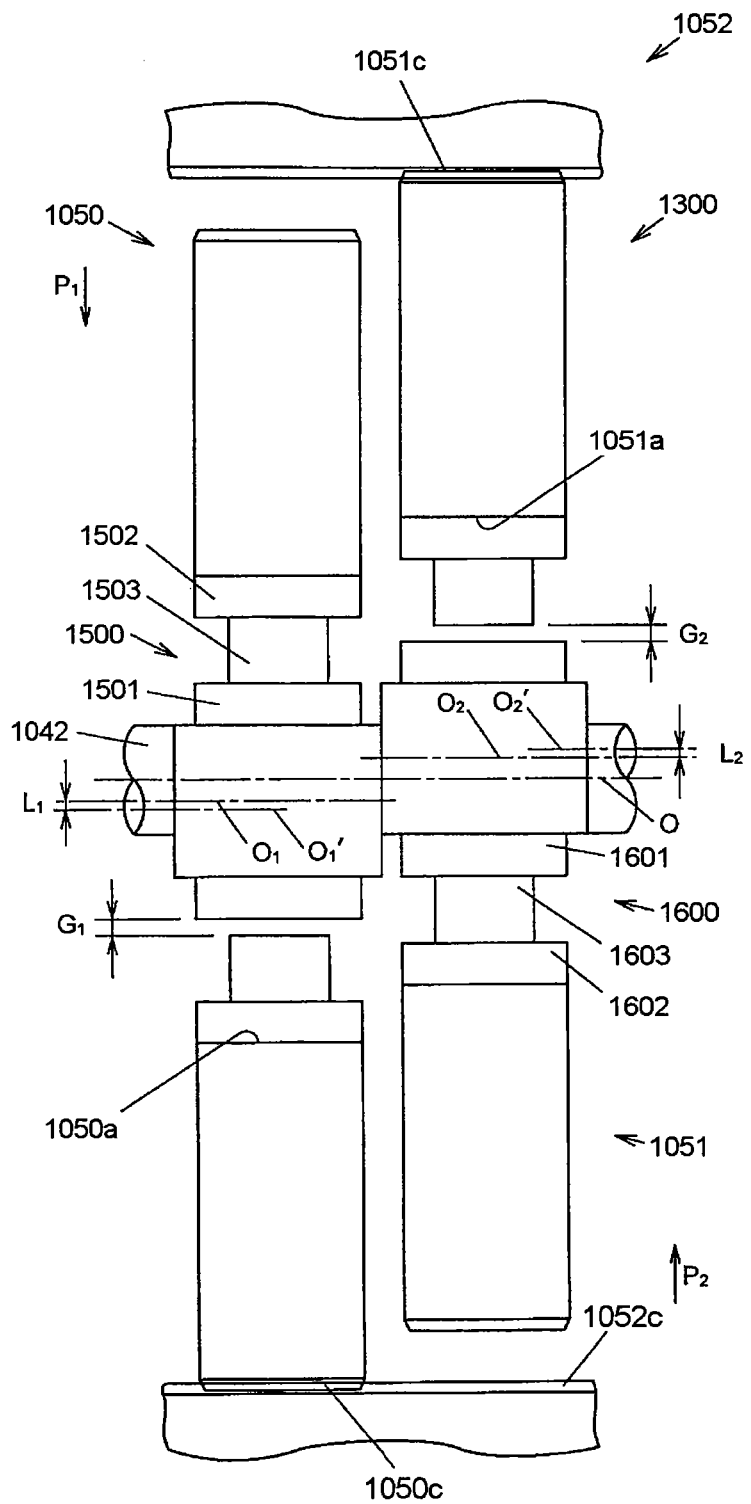
FIG. 26 is a simplified sectional view that shows the state where the input members of the reduction-transmission mechanism are supported in the motor torque transmission device in an eighth modified example according to the eighth embodiment of the invention.

Next, a reduction-transmission mechanism in a motor torque transmission device according to an eighth embodiment of the invention will be described with reference to FIG. 18 and FIG. 22. FIG. 22 shows a state where input members are supported. In FIG. 22, the components that are identical or equivalent to those in FIG. 19 are denoted by the same reference numerals as those in FIG. 19, and the detailed description is omitted.

As shown in FIG. 22, a reduction-transmission mechanism 1300 (partially shown) according to the eighth embodiment of the invention is characterized in that the inner rings 1540, 1560 of the ball bearings 1054, 1056 are fitted to the outer peripheries of the eccentric portions 1042a, 1042b by interference fit. In addition, the reduction-transmission mechanism 1300 is characterized in that the outer rings 1541, 1561 are fitted to the inner peripheries of the input members 1050, 1051, which define the center holes 1050a, 1051a, by interference fit.

In a state where the external tooth 1050c is fitted between the adjacent two internal teeth 1052c among the plurality of internal teeth 1052c of the rotation force applying member 1052 on the line perpendicular to the rotation axis O and the axis $O_1$, the torque transfer face 1500c (shown in FIG. 18) of the external tooth 1050c at one side in the circumferential direction contacts the torque transfer face 1520c (shown in FIG. 18) of one of the adjacent two internal teeth 1052c (one of the adjacent two internal teeth among the internal teeth of the rotation force applying member 1052) and the torque transfer face 1501c of the external tooth 1050c at the other side in the circumferential direction contacts the torque transfer face 1521c of the other one of the adjacent two internal teeth 1052c (the other one of the adjacent two internal teeth among the internal teeth of the rotation force applying member 1052), the size $L_1$ between the axis $O_1$ and the axis $O_1$, is set to a size that is smaller than or equal to half of the operating clearance $G_1$ of the radial internal clearance of the ball bearing 1054, that is, $G_1/2 \geq L_1$.

That is, the size $L_1$ is set to such a size that the torque transfer face 1500c of the external tooth 1050c at one side in the circumferential direction contacts the torque transfer face 1520c of one of the adjacent two internal teeth 1052c (one of the adjacent two internal teeth of the rotation force applying member 1052) and the torque transfer face 1501c of the external tooth 1050c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1050 moves from its initial state over a distance corresponding to the size that is smaller than or equal to half of the operating clearance $G_1$ of the radial internal clearance of the ball bearing 1054.

Therefore, when the input member 1050 moves in the direction in which the centrifugal force $P_1$ acts, upon reception of a load due to the centrifugal force $P_1$ that is generated on the basis of the circular motion of the input member 1050, the torque transfer face 1500c of the external tooth 1050c at one side in the circumferential direction contacts the torque transfer face 1520c of one of the adjacent two internal teeth 1052c (one of the adjacent two internal teeth of the rotation force applying member 1052), and the torque transfer face 1501c of the external tooth 1050c at the other side in the circumferential direction contacts the torque transfer face 1521c of the other one of the adjacent two internal teeth 1052c (the other one of the adjacent two internal teeth of the rotation force applying member 1052). At the contact positions, the rotation force applying member 1052 receives a radial load from the input member 1050. Thus, the torque transfer faces 1520c, 1521c of the internal teeth 1052c of the rotation force applying member 1052 intensively receive a load due to the centrifugal force $P_1$ from the input member 1050. Therefore, application of the load due to the centrifugal force $P_1$ to the ball bearing 1054 (to points of contact between the outer ring 1541 and the rolling elements 1542 and points of contact between the rolling elements 1542 and the inner ring 1540) is suppressed.

In a state where the external tooth 1051c is fitted between the adjacent two internal teeth 1052c among the plurality of internal teeth 1052c of the rotation force applying member 1052 on the line perpendicular to the rotation axis O and the axis $O_2$, the torque transfer face 1510c of the external tooth 1051c at one side in the circumferential direction contacts the torque transfer face 1520c of one of the adjacent two internal teeth 1052c (one of the adjacent two internal teeth among the internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth among the internal teeth of the rotation force applying member 1052), the size $L_2$ between the axis $O_2$ and the axis $O_{2'}$ is set to a size that is smaller than or equal to half of the operating clearance $G_2$ of the radial internal clearance of the ball bearing 1056, that is, $G_2/2 \geq L_2$.

That is, the size $L_2$ is set to such a size that the torque transfer face 1510c of the external tooth 1051c at one side in the circumferential direction contacts the torque transfer face 1520c of one of the adjacent two internal teeth 1052c (one of the adjacent two internal teeth of the rotation force applying member 1052) and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052) as indicated by the continuous line in FIG. 18 before the input member 1051 moves from its initial state over a distance corresponding to the size that is smaller than or equal to half of the operating clearance $G_2$ of the radial internal clearance of the ball bearing 1056.

Therefore, when the input member 1051 moves in the direction in which the centrifugal force $P_2$ acts, upon reception of a load due to the centrifugal force $P_2$ that is generated on the basis of the circular motion of the input member 1051, the torque transfer face 1510c of the external tooth 1051c at one side in the circumferential direction contacts the torque transfer face 1520c of one of the adjacent two internal teeth 1052c (one of the adjacent two internal teeth of the rotation force applying member 1052), and the torque transfer face 1511c of the external tooth 1051c at the other side in the circumferential direction contacts the torque transfer face 1521c of the other one of the adjacent two internal teeth 1052c (the other one of the adjacent two internal teeth of the rotation force applying member 1052). At the contact positions, the rotation force applying member 1052 receives a radial load from the input member 1051. Thus, the torque transfer faces 1520c, 1521c of the internal teeth 1052c of the rotation force applying member 1052 intensively receive a load due to the centrifugal force $P_2$ from the input member 1051. Therefore, application of the load due to the centrifugal force $P_2$ to the ball bearing 1056 (to points of contact between the outer ring 1561 and the rolling elements 1562 and points of contact between the rolling elements 1562 and the inner ring 1560) is suppressed.

According to the above-described eighth embodiment, similar advantageous effects to those of the fifth embodiment are obtained.

As described above, the speed reduction mechanism according to the invention and the motor torque transmission device that includes the speed reduction mechanism are described on the basis of the above embodiments. However, the invention is not limited to the above embodiments. The invention may be implemented in various other embodiments without departing from the scope of the invention. For example, the following modifications may be made.

(1) In the above-described first to fourth embodiments, the eccentric portion 42a and the eccentric portion 42b are arranged on the outer periphery of the motor shaft 42 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_1$ and the axis $O_2$ in the other circumferential direction around the rotation axis O are equal to each other, and the pair of input members 50, 51 are arranged on the portions that are formed on the motor shaft 42 of the electric motor 4 so as to be apart from each other in the circumferential direction around the axis (rotation axis O) of the motor shaft 42 at equal intervals (180°). However, the invention is not limited to this configuration, and the number of the input members may be appropriately changed.

That is, when the number of the input members is n (n≥3), the axis of the first eccentric portion, the axis of the second eccentric portion, . . . , and the axis of the nth eccentric portion are sequentially arranged in one direction around the axis of the motor shaft, on an imaginary plane perpendicular to the axis of the electric motor (motor shaft). Then, the eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion, . . . , and the nth eccentric portion is set to 360°/n. Furthermore, the n input members are arranged on the motor shaft at portions that are apart from each other at intervals of 360°/n around the axis of the motor shaft.

For example, when the number of the input members is three, the axis of the first eccentric portion, the axis of the second eccentric portion and the axis of the third eccentric portion are sequentially arranged in one direction around the axis of the motor shaft, on an imaginary plane perpendicular to the axis of the motor shaft. The eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion and the third eccentric portion is set to 120°. Furthermore, the three input members are arranged on the motor shaft at portions that are apart from each other at intervals of 120° around the axis of the motor shaft.

(2) In the above-described first to fourth embodiments, the description is made on the case where the invention is applied to the four-wheel drive vehicle 101 that uses the engine 102 and the electric motor 4 as the driving sources. However, the invention is not limited to this configuration. The invention may also be applied to an electric vehicle, which is a four-wheel drive vehicle or a two-wheel drive vehicle, using only an electric motor as a driving source. In addition, the invention may also be applied to a four-wheel drive vehicle having first drive shafts that are driven by an engine and an electric motor and second drive shafts that are driven by an electric motor as in the case of the above-described embodiments.

(3) In the above-described first to fourth embodiments, the description is made on the case where the ball bearings 54, 56 that are deep groove ball bearings are used as first bearings between the inner peripheries of the input members 50, 51, which define the center holes 50a, 51a, and the outer peripheries of the eccentric portions 42a, 42b such that the input members 50, 51 are rotatably supported on the eccentric portions 42a, 42b. However, the invention is not limited to this configuration, and ball bearings or roller bearings, other than deep groove ball bearings, may be used as first bearings instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like. In addition, the first bearing according to the invention may be a plain bearing instead of a rolling bearing.

For example, as shown in FIG. 10 to FIG. 13, when a cylindrical roller bearing 500 (an inner ring 501, an outer ring 502, and rolling elements 503) and a cylindrical roller bearing 600 (an inner ring 601, an outer ring 602, and rolling elements 603) are used as first bearings, the input member 50 is rotatably supported by the eccentric portion 42a via the cylindrical roller bearing 500, and the input member 51 is rotatably supported by the eccentric portion 42b via the cylindrical roller bearing 600. In this case, FIG. 10, FIG. 11, FIG. 12 and FIG. 13 correspond to FIG. 6, FIG. 7, FIG. 8 and FIG. 9, respectively. In FIG. 10 to FIG. 13, the cylindrical roller bearing 500 instead of the ball bearing 54 described in the above embodiments is interposed between the inner periphery of the input member 50, which defines the center hole 50a, and the outer periphery of the eccentric portion 42a, and the cylindrical roller bearing 600 instead of the ball bearing 56 described in the above embodiments is interposed between the inner periphery of the input member 51, which defines the center hole 51a, and the outer periphery of the eccentric portion 42b.

(4) In the above first to fourth embodiments, the description is made on the case where each needle roller bearing 55 that serves as a second bearing and that is able to contact the inner periphery of the input member 50, which defines a corresponding one of the pin insertion holes 50b, is fitted to the outer periphery of each of the output members 53 at a portion between the threaded portion 53a and the head 53b, and each needle roller bearing 57 that serves as a second bearing and that is able to contact the inner periphery of the input member 51, which defines a corresponding one of the pin insertion holes 51b, is fitted to the outer periphery of each of the output members 53 at a portion between the threaded portion 53a and the head 53b. However, the invention is not limited to this configuration. A roller bearing other than a needle roller bearing or a ball bearing may be used instead of the needle roller bearing. Such a ball bearing or a roller bearing may be, for example, a deep groove ball bearing, an angular contact ball bearing, a cylindrical roller bearing, a long cylindrical roller bearing, a tapered roller bearing, a spherical roller bearing, or the like. In addition, the second bearing according to the invention may be a plain bearing instead of a rolling bearing.

(5) In the above-described first to fourth embodiments, the description is made on the example in which, when the input members 50, 51 are arranged at equal intervals around the rotation axis O of the motor shaft 42, that is, when the rotation axis (first axis) O of the motor shaft 42 coincides with the axis (fourth axis) of the rotation force applying member 52, the size between the second axis $O_1$ and the third axis $O1'$ on the line perpendicular to the rotation axis O and the second axis $O_1$ and the size between the second axis $O_2$ and the third axis $O_{2'}$ on the line perpendicular to the rotation axis O and the second axis $O_2$ each are set to a predetermined size. However, the invention is not limited to this configuration. Even when a single input member is arranged around the motor shaft or a plurality of input members are arranged at unequal intervals around the rotation axis of the motor shaft, that is, even when the first axis does not coincide with the fourth axis, it is possible to implement the invention as in the above-described embodiments by setting the size between the second axis and the third axis on the line perpendicular to the second axis and the fourth axis to a predetermined size (the size that is smaller than or equal to half of the size obtained by adding the diameter difference between the outside diameter of the bearing and the inside diameter of the input member, which defines the center hole, the diameter difference between the inside diameter of the bearing and the outside diameter of the eccentric portion and the operating clearance of the radial internal clearance of the bearing).

(6) In the above-described first to fourth embodiments, the description is made on the case where, in a state where the tooth tips 502c of the external teeth 50c of the input member 50 (external gear) are in contact with the bottomlands 522c of the internal teeth 52c of the rotation force applying member 52 (internal gear) and the tooth tips 512c of the external teeth 51c of the input member 51 (external gear) are in contact with the bottomlands 522c of the internal teeth 52c of the rotation force applying member 52, the size between the second axis $O_1$ and the third axis $O_{2'}$ and the size between the second axis $O_2$ and the third axis $O_{2'}$ each are set to a predetermined size. However, the invention is not limited to this configuration. It is possible to set the size between the second axis and the third axis to a predetermined size (a size that is smaller than or equal to half of a size obtained by adding the diameter difference between the outside diameter of the bearing and the inside diameter of the input member, which defines the center hole, the diameter difference between the inside diameter of the bearing and the outside diameter of the eccentric portion and the operating clearance of the internal clearance of the bearing) in a state where the bottomlands of the external teeth of the external gears are in contact with the corresponding tooth tips of the internal teeth of the internal gear.

(7) In the above-described fifth to eighth embodiments, the eccentric portion 1042a and the eccentric portion 1042b are arranged on the outer periphery of the motor shaft 1042 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_1$ and the axis $O_2$ in the other circumferential direction around the rotation axis O are equal to each other. The above description is made on the case where the input members 1050, 1051 are arranged on the portions that are formed on the motor shaft 1042 of the electric motor 1004 so as to be apart from each other in the circumferential direction around the axis (rotation axis O) of the motor shaft 1042 at equal intervals (180°). However, the invention is not limited to this configuration; the number of the input members may be appropriately changed.

That is, when the number of the input members is n (n≥3), the axis of the first eccentric portion, the axis of the second eccentric portion, . . . , and the axis of the nth eccentric portion are sequentially arranged in one direction around the axis of the motor shaft, on an imaginary plane perpendicular to the axis of the electric motor (motor shaft). Then, the eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion, . . . , and the nth eccentric portion is set to 360°/n. Furthermore, the n input members are arranged on the motor shaft at portions that are apart from each other at intervals of 360°/n around the axis of the motor shaft.

For example, when the number of the input members is three, the axis of the first eccentric portion, the axis of the second eccentric portion and the axis of the third eccentric portion are sequentially arranged in one direction around the axis of the motor shaft, on an imaginary plane perpendicular to the axis of the motor shaft. The eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion and the third eccentric portion is set to 120°. Furthermore, the three input members are arranged on the motor shaft at portions that are apart from each other at intervals of 120° around the axis of the motor shaft.

(8) In the above-described fifth to eighth embodiments, the description is made on the case where the invention is applied to the four-wheel drive vehicle 1101 that uses the engine 1102 and the electric motor 1004 as the driving sources. However, the invention is not limited to this configuration. The invention may also be applied to an electric vehicle, which is a four-wheel drive vehicle or a two-wheel drive vehicle, using only an electric motor as a driving source. In addition, the invention may also be applied to a four-wheel drive vehicle having first drive shafts that are driven by an engine and an electric motor and second drive shafts that are driven by an electric motor as in the case of the above embodiments.

(9) In the above-described fifth to eighth embodiments, the description is made on the case where the ball bearings 1054, 1056 that are deep groove ball bearings are used as first bearings arranged between the inner peripheries of the input members 1050, 1051, which define the center holes 1050*a* and 1051*a*, and the outer peripheries of the eccentric portions 1042*a*, 1042*b* such that the input members 1050, 1051 are rotatably supported on the eccentric portions 1042*a*, 1042*b*. However, the invention is not limited to this configuration; ball bearings or roller bearings, other than deep groove ball bearings, may be used as first bearings instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like. In addition, the first bearing according to the invention may be a plain bearing instead of a rolling bearing.

For example, as shown in FIG. 23 to FIG. 26, when a cylindrical roller bearing 1500 (an inner ring 1501, an outer ring 1502, and rolling elements 1503) and a cylindrical roller bearing 1600 (an inner ring 1601, an outer ring 1602, and rolling elements 1603) are used as the first bearings, the input member 1050 is rotatably supported by the eccentric portion 1042*a* via the cylindrical roller bearing 1500, and the input member 1051 is rotatably supported by the eccentric portion 1042*b* via the cylindrical roller bearing 1600. In this case, FIG. 23, FIG. 24, FIG. 25 and FIG. 26 correspond to FIG. 19, FIG. 20, FIG. 21 and FIG. 22, respectively. In FIG. 23 to FIG. 26, the cylindrical roller bearing 1500 instead of the ball bearing 1054 described in the above embodiments is interposed between the inner periphery of the input member 1050, which defines the center hole 1050*a*, and the outer periphery of the eccentric portion 1042*a*, and the cylindrical roller bearing 1600 instead of the ball bearing 1056 described in the above embodiments is interposed between the inner periphery of the input portion 1051, which defines the center hole 1051*a*, and the outer periphery of the eccentric portion 1042*b*.

(10) In the above fifth to eighth embodiments, the description is made on the case where each needle roller bearing 1055 that serves as a second bearing and that is able to contact the inner periphery of the input member 1050, which defines a corresponding one of the pin insertion holes 1050*b*, is fitted to the outer periphery of each of the output members 1053 at a portion between the threaded portion 1053*a* and the head 1053*b*, and each needle roller bearing 1057 that serves as a second bearing and that is able to contact the inner periphery of the input member 1051, which defines a corresponding one of the pin insertion holes 1051*b*, is fitted to the outer periphery of each of the output members 1053 at a portion between the threaded portion 1053*a* and the head 1053*b*. However, the invention is not limited to this configuration. A roller bearing other than a needle roller bearing or a ball bearing may be used instead of the needle roller bearing. Such a ball bearing or a roller bearing may be, for example, a deep groove ball bearing, an angular contact ball bearing, a cylindrical roller bearing, a long cylindrical roller bearing, a tapered roller bearing, a spherical roller bearing, or the like. In addition, the second bearing according to the invention may be a plain bearing instead of a rolling bearing.

(11) In the above-described fifth to eighth embodiments, the description is made on the example in which, when the input members 1050, 1051 are arranged at equal intervals around the rotation axis O of the motor shaft 1042, that is, when the rotation axis (first axis) O of the motor shaft 1042 coincides with the axis (fourth axis) of the rotation force applying member 1052, the size between the second axis $O_1$ and the third axis $O_{1'}$ and the size between the second axis $O_2$ and the third axis $O_{2'}$ each are set to a predetermined size. However, the invention is not limited to this configuration. Even when a single input member is arranged around the motor shaft or a plurality of input members are arranged at unequal intervals around the rotation axis of the motor shaft, that is, even when the first axis does not coincide with the fourth axis, it is possible to implement the invention as in the above-described embodiments by setting the size between the second axis and the third axis to a predetermined size (the size that is smaller than or equal to half of the size obtained by adding the diameter difference between the outside diameter of the bearing and the inside diameter of the input member, which defines the center hole, the diameter difference between the inside diameter of the bearing and the outside diameter of the eccentric portion and the operating clearance of the radial internal clearance of the bearing).

Figure 27:
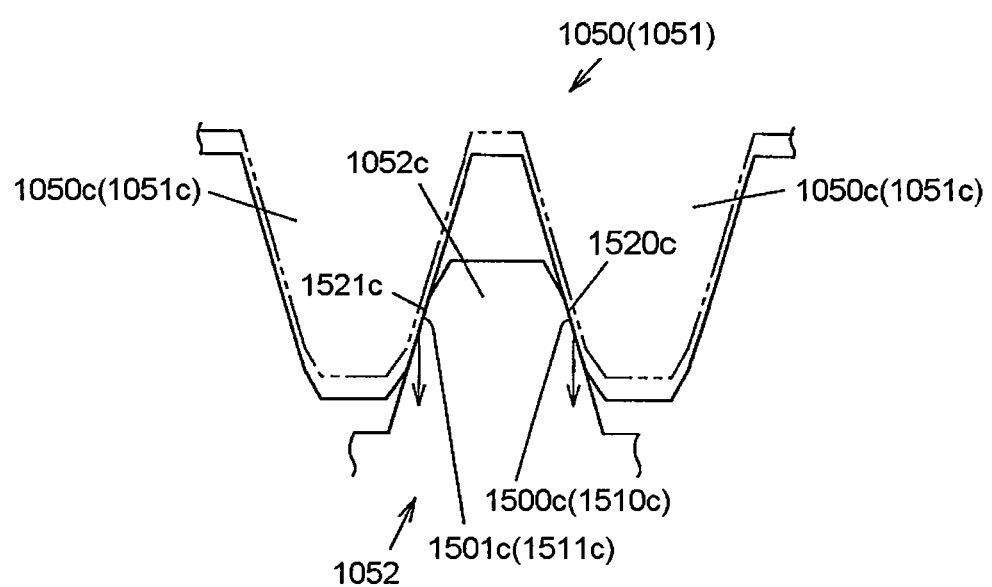
FIG. 27 is a sectional view that shows the state where one of the input members is in contact with the rotation force applying member of the reduction-transmission mechanism in the motor torque transmission device in a modified example according to the fifth to eighth embodiments of the invention.

(12) In the above-described fifth to eighth embodiments, the description is made on the case where, in a state where the external tooth 1050*c* of the input member 1050 is fitted between adjacent two of the internal teeth 1052*c* of the rotation force applying member 1052, the torque transfer face 1500*c* of the external tooth 1050*c* at one side in the circumferential direction contacts the torque transfer face 1520*c* of one of the adjacent two internal teeth 1052*c*, the torque transfer face 1501*c* of the external tooth 1050*c* at the other side in the circumferential direction contacts the torque transfer face 1521*c* of the other one of the adjacent two internal teeth 1052*c*, the external tooth 1051*c* of the input member 1051 is fitted between adjacent two of the internal teeth 1052*c* of the rotation force applying member 1052, the torque transfer face 1510*c* of the external tooth 1051*c* at one side in the circumferential direction contacts the torque transfer face 1520*c* of one of the adjacent two internal teeth 1052*c* and the torque transfer face 1511*c* of the external tooth 1051*c* at the other side in the circumferential direction contacts the torque transfer face 1521*c* of the other one of the adjacent two internal teeth 1052*c*, the size $L_1$ and the size $L_2$ each are set to a predetermined size. However, the invention is not limited to this configuration. Each of the size $L_1$ and the size $L_2$ may be set to a predetermined size in the following state. That is, as shown in FIG. 27, the size $L_1$ (for example, shown in FIG. 19) is set to a predetermined size in a state where the internal tooth 1052c of the rotation force applying member 1052 is fitted between adjacent two of the external teeth 1050c of the input member 1050, the torque transfer face 1520c of the internal tooth 1052c at one side in the circumferential direction contacts the torque transfer face 1500c of one of the adjacent two external teeth 1050c and the torque transfer face 1521c of the internal tooth 1052c at the other side in the circumferential direction contacts the torque transfer face 1501c of the other one of the adjacent two external teeth 1050c. In addition, as shown in FIG. 27, the size $L_2$ (for example, shown in FIG. 19) is set to a predetermined size in a state where the internal tooth 1052c of the rotation force applying member 1052 is fitted between adjacent two of the external teeth 1051c of the input member 1051, the torque transfer face 1520c of the internal tooth 1052c at one side in the circumferential direction contacts the torque transfer face 1510c of one of the adjacent two external teeth 1051c and the torque transfer face 1521c of the internal tooth 1052c at the other side in the circumferential direction contacts the torque transfer face 1511c of the other one of the adjacent two external teeth 1051c.

According to the invention, it is possible to reduce cost and extend the life of each bearing.

What is claimed is:

1. A speed reduction mechanism, comprising:
   a rotary shaft that rotates about a first axis, and that has an eccentric portion of which a central axis is a second axis that is offset from the first axis;
   an input member that is arranged radially outward of the rotary shaft, and that is formed of an external gear having a center hole of which a central axis is a third axis and a plurality of through-holes arranged at equal intervals around the third axis, having a pitch circle of which a central axis coincides with the third axis, and provided with a bearing interposed between an inner periphery of the input member, which defines the center hole, and an outer periphery of the eccentric portion;
   a rotation force applying member that is in mesh with the input member and that is formed of an internal gear having teeth the number of which is larger than the number of teeth of the external gear and having a pitch circle of which a central axis is a fourth axis; and
   a plurality of output members that receive rotation force applied to the input member by the rotation force applying member and output the rotation force, and that are passed through the respective through-holes, wherein
   when the bearing includes an inner ring and the inner ring is fitted to the eccentric portion with an interference fit in the radial direction of the rotary shaft,
   in any one of a state where tooth tips of the external gear contact bottomlands of the internal gear on a line perpendicular to the second axis and the fourth axis,
   a state where bottomlands of the external gear contact tooth tips of the internal gear on the line perpendicular to the second axis and the fourth axis,
   a state where each of at least one of external teeth of the external gear is fitted between adjacent two of a plurality of internal teeth of the internal gear on the line perpendicular to the second axis and the fourth axis, a torque transfer face of the external tooth at one side in a circumferential direction contacts a torque transfer face of one of the two adjacent internal teeth, and a torque transfer face of the external tooth at the other side in the circumferential direction contacts a torque transfer face of the other one of the two adjacent internal teeth, and
   a state where each of at least one of the internal teeth of the internal gear is fitted between adjacent two of the external teeth of the external gear on the line perpendicular to the second axis and the fourth axis, a torque transfer face of the internal tooth at one side in the circumferential direction contacts a torque transfer face of one of the two adjacent external teeth, and a torque transfer face of the internal tooth at the other side in the circumferential direction contacts a torque transfer face of the other one of the two adjacent external teeth,
   a size between the second axis and the third axis is set to a size that is smaller than or equal to half of an operating clearance of an internal clearance of the bearing.

2. A motor torque transmission device comprising:
   an electric motor that generates motor torque; and
   a reduction-transmission mechanism that reduces a speed of rotation of the electric motor and transmits driving force to a driving force transmission target, wherein
   the reduction-transmission mechanism is the speed reduction mechanism according to claim 1.

3. The motor torque transmission device according to claim 1, wherein the reduction-transmission mechanism transmits the driving force to a differential mechanism that serves as the driving force transmission target.

* * * * *